US011316712B2

United States Patent
Zhan et al.

(10) Patent No.: US 11,316,712 B2
(45) Date of Patent: Apr. 26, 2022

(54) CANOPEN-BASED DATA TRANSMISSION GATEWAY CHANGEOVER METHOD, SYSTEM AND APPARATUS THEREOF

(71) Applicant: BYD COMPANY LIMITED, Shenzhen (CN)

(72) Inventors: Xiaohui Zhan, Shenzhen (CN); Wenxiao Zeng, Shenzhen (CN); Long Zhao, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 335 days.

(21) Appl. No.: 16/625,348

(22) PCT Filed: Jun. 20, 2018

(86) PCT No.: PCT/CN2018/092049
§ 371 (c)(1),
(2) Date: Dec. 20, 2019

(87) PCT Pub. No.: WO2018/233644
PCT Pub. Date: Dec. 27, 2018

(65) Prior Publication Data
US 2021/0367808 A1 Nov. 25, 2021

(30) Foreign Application Priority Data
Jun. 21, 2017 (CN) .......................... 201710475925.5

(51) Int. Cl.
*H04L 12/40* (2006.01)
*H04L 12/26* (2006.01)
(Continued)

(52) U.S. Cl.
CPC .. *H04L 12/40176* (2013.01); *H04L 12/40071* (2013.01); *H04L 12/40097* (2013.01);
(Continued)

(58) Field of Classification Search
CPC ......... H04L 12/40176; H04L 12/40071; H04L 12/40097; H04L 12/46; H04L 43/10; H04L 2012/40215; H04L 2012/40273
See application file for complete search history.

(56) References Cited

U.S. PATENT DOCUMENTS 6,625,750 B1 * 9/2003 Duso ................... G06F 11/2028
714/11
2011/0029687 A1 2/2011 Kirrmann et al.
(Continued)

FOREIGN PATENT DOCUMENTS

CN 102724065 A 10/2012
CN 106452870 A 2/2017
(Continued)

OTHER PUBLICATIONS

The World Intellectual Property Organization (WIPO) International Search Report for PCT/CN2018/092049 dated Sep. 4, 2018 5 Pages.
(Continued)

Primary Examiner — Luat Phung
(74) Attorney, Agent, or Firm — Anova Law Group, PLLC

(57) ABSTRACT

A CANopen-based data transmission gateway changeover method includes: making an active gateway go alive, and mutually monitoring heartbeat packet status together with a standby gateway over an active-standby gateway communications network; keeping the active gateway alive and recording a breakdown of the standby gateway if no heartbeat packet of the standby gateway is detected within a preset heartbeat period and a heartbeat packet of the active gateway is successfully transmitted on the active-standby gateway communications network; requesting the standby gateway to go alive if the heartbeat packet of the active gateway fails to be transmitted on the active-standby gateway communications network; stopping requesting the
(Continued)

standby gateway in a first in-vehicle communications network to go alive, and requesting the standby gateway to go alive; and keeping the active gateway alive and recording a breakdown of the standby gateway if still no response is received from the standby gateway.

20 Claims, 31 Drawing Sheets

(51) Int. Cl.
*H04L 12/46* (2006.01)
*H04L 43/10* (2022.01)

(52) U.S. Cl.
CPC .............. *H04L 12/46* (2013.01); *H04L 43/10* (2013.01); *H04L 2012/40215* (2013.01); *H04L 2012/40273* (2013.01)

(56) References Cited

U.S. PATENT DOCUMENTS

2016/0210209 A1* 7/2016 Verkaik ............... G06F 11/2033
2017/0339005 A1* 11/2017 Yuan ....................... H04L 29/08

FOREIGN PATENT DOCUMENTS

| EP | 1085721 A2 | 3/2001 |
| EP | 1085722 A2 | 3/2001 |
| JP | 2011211485 A | 10/2011 |
| WO | 2002069104 A2 | 9/2002 |

OTHER PUBLICATIONS

Ligong Li et al, Design and Implementation of Urban Rail Vehicle Network Control System Based on CANopen Protocol, Railway Locomotive and Motor Car, No. 3, Mar. 31, 2014.

* cited by examiner

US 11,316,712 B2

CANOPEN-BASED DATA TRANSMISSION GATEWAY CHANGEOVER METHOD, SYSTEM AND APPARATUS THEREOF

CROSS-REFERENCE TO RELATED APPLICATIONS

This application is a national phase entry under 35 U.S.C. § 371 of International Application No. PCT/CN2018/092049, filed on Jun. 20, 2018, which claims priority to Chinese Patent Application No. 201710475925.5, filed by BYD Company Limited on Jun. 21, 2017 and entitled "CANOPEN-BASED DATA TRANSMISSION GATEWAY CHANGEOVER METHOD, SYSTEM AND APPARATUS THEREOF", content of all of which is incorporated herein by reference in its entirety.

FIELD

The present disclosure relates to the field of vehicle communications technologies and, in particular, to a CANopen-based data transmission gateway changeover method, a system and an apparatus thereof.

BACKGROUND

Currently, one technology that is widely applied to a train communications network is a Train Communications Network (TCN) bus technology. A TCN covers four types of buses: multifunction vehicle bus (MVB), wire train bus (WTB), Ethernet bus, and controller area network (CAN) fieldbus. In the design requirements for the four types of buses MVB, WTB, Ethernet, and CAN, a common requirement is network redundancy design. Network redundancy means that each communications network has a standby network. To be specific, each node on the network is connected in a dual-line mode, that is, through a line A and a line B. When the network is faulty, communication can be implemented by using the standby network, thereby ensuring smooth exchange of data of all products on the network and high availability of an operating environment of the communications network in a train.

Generally, if data exchange is performed by using a CAN bus in the design of a train communications network, the design is mostly based on CANopen (a high-level communications protocol based on a CAN bus, which is a fieldbus that is commonly used in industrial control currently). The CANopen is defined as a standardized application layer protocol that is designed based on a CAN bus. The CANopen protocol supports a complete network management mechanism for traditional CANs, to support network redundancy design. Currently, all CANopen-based network redundancy designs require setting of two gateways in a network, of which one is an active gateway and the other is a standby gateway. When the active gateway operates normally, the standby gateway is in a silent state. That is, only one active master node exists in the network. A switchover between an active gateway and a standby gateway is implemented depending on whether a heartbeat packet of the active gateway is dropped. When detecting a fault of the network, the active gateway stops transmitting the heartbeat packet. The standby gateway starts working when it fails to receive the heartbeat packet of the active gateway.

SUMMARY

The present disclosure is directed to resolve one of the foregoing technical problems at least to some extent.

Therefore, a first objective of the present disclosure is to provide a CANopen-based data transmission gateway changeover method. In this method, coordination is performed based on different operating states of an active gateway and a standby gateway, thereby effectively ensuring normal communication even when a network is in an abnormal state, and avoiding abnormal network communication caused by occurrence of a network fault in both an active node and a standby node.

A second objective of the present disclosure is to provide another CANopen-based data transmission gateway changeover method.

A third objective of the present disclosure is to provide an active gateway.

A fourth objective of the present disclosure is to provide a standby gateway.

A fifth objective of the present disclosure is to provide a CANopen-based data transmission gateway changeover system.

A sixth objective of the present disclosure is to provide a computer device.

A seventh objective of the present disclosure is to provide another computer device.

An eighth objective of the present disclosure is to provide a storage medium.

A ninth objective of the present disclosure is to provide another storage medium.

To fulfill the foregoing objectives, an embodiment in a first aspect of the present disclosure provides a CANopen-based data transmission gateway changeover method, including: powering on an active gateway to go alive, and mutually monitoring heartbeat packet status together with a standby gateway over an active-standby gateway communications network; keeping the active gateway alive and recording a breakdown of the standby gateway if no heartbeat packet of the standby gateway is detected within a preset heartbeat period and a heartbeat packet of the active gateway is successfully transmitted on the active-standby gateway communications network; requesting, by the active gateway over any in-vehicle communications network, the standby gateway to go alive if the heartbeat packet of the active gateway fails to be transmitted on the active-standby gateway communications network; stopping requesting, by the active gateway, the standby gateway in a first in-vehicle communications network to go alive and also requesting, over another in-vehicle communications network, the standby gateway to go alive if no response is received from the standby gateway on the first in-vehicle communications network; and keeping the active gateway alive and recording a breakdown of the standby gateway if still no response is received from the standby gateway on a second in-vehicle communications network.

To fulfill the foregoing objectives, an embodiment in a second aspect of the present disclosure provides another CANopen-based data transmission gateway changeover method, including: determining, if no heartbeat packet of the active gateway is detected on the active-standby gateway communications network within a preset heartbeat period when the standby gateway is powered on and in a stop state, whether a heartbeat packet of the standby gateway is successfully transmitted on the active-standby gateway communications network; keeping the standby gateway alive if the heartbeat packet of the standby gateway is successfully transmitted; and if the heartbeat packet of the standby gateway fails to be transmitted but the heartbeat packet of the active gateway is detected on the first in-vehicle communications network and a second in-vehicle communications network or the heartbeat packet of the standby gateway is received normally, deciding a current state of the standby gateway based on a result of determining a responsive state of the standby gateway that is requested in the heartbeat packet of the active gateway.

To fulfill the foregoing objectives, an embodiment in a third aspect of the present disclosure provides an active gateway, including: a monitoring module, configured to mutually monitor heartbeat packet status together with a standby gateway over an active-standby gateway communications network when the active gateway is powered on to go alive; a first processing module, configured to keep alive and record a breakdown of the standby gateway when no heartbeat packet of the standby gateway is detected within a preset heartbeat period and a heartbeat packet of the active gateway is successfully transmitted on the active-standby gateway communications network; a requesting module, configured to request, over any in-vehicle communications network, the standby gateway to go alive when the heartbeat packet of the active gateway fails to be transmitted on the active-standby gateway communications network, where the requesting module is further configured to stop requesting the standby gateway in a first in-vehicle communications network to go alive and also request, over another in-vehicle communications network, the standby gateway to go alive when no response is received from the standby gateway on the first in-vehicle communications network; and the first processing module is further configured to keep alive and record a breakdown of the standby gateway when still no response is received from the standby gateway on a second in-vehicle communications network.

To fulfill the foregoing objectives, an embodiment in a fourth aspect of the present disclosure provides a standby gateway, including: a seventh determining module, configured to determine, if no heartbeat packet of the active gateway is detected on the active-standby gateway communications network within a preset heartbeat period when the standby gateway is powered on and in a stop state, whether a heartbeat packet of the standby gateway is successfully transmitted on the active-standby gateway communications network; a second processing module, configured to control the standby gateway to keep alive when the heartbeat packet of the standby gateway is successfully transmitted; and a deciding module, configured to: when the heartbeat packet of the standby gateway fails to be transmitted but the heartbeat packet of the active gateway is detected on the first in-vehicle communications network and a second in-vehicle communications network or the heartbeat packet of the standby gateway is received normally, decide a current state of the standby gateway based on a result of determining a responsive state of the standby gateway that is requested in the heartbeat packet of the active gateway.

To fulfill the foregoing objectives, an embodiment in a fifth aspect of the present disclosure provides a CANopen-based data transmission gateway changeover system, including: the active gateway according to an embodiment in the third aspect of the present disclosure, the standby gateway according to an embodiment in the fourth aspect of the present disclosure, an active-standby gateway communications network, and an inter-vehicle communications network.

To fulfill the foregoing objectives, an embodiment in a sixth aspect of the present disclosure provides a computer device, including a memory, a processor, and a computer program that is stored in the memory and executable in the processor. When executing the computer program, the processor implements the CANopen-based data transmission gateway changeover method according to the embodiment in the first aspect of the present disclosure.

To fulfill the foregoing objectives, an embodiment in a seventh aspect of the present disclosure provides a computer device, including a memory, a processor, and a computer program that is stored in the memory and executable in the processor. When executing the computer program, the processor implements the CANopen-based data transmission gateway changeover method according to the embodiment in the second aspect of the present disclosure.

To fulfill the foregoing objectives, an embodiment in an eighth aspect of the present disclosure provides a storage medium for storing an application. The application is configured to execute the CANopen-based data transmission gateway changeover method according to the embodiment in the first aspect of the present disclosure.

To fulfill the foregoing objectives, an embodiment in a ninth aspect of the present disclosure provides a storage medium for storing an application. The application is configured to execute the CANopen-based data transmission gateway changeover method according to the embodiment in the second aspect of the present disclosure.

The technical solutions provided in the embodiments of the present disclosure have the following beneficial technical effects:

Coordination is performed based on different operating states of an active gateway and a standby gateway, thereby effectively ensuring normal communication even when a network is in an abnormal state, and avoiding abnormal network communication caused by occurrence of a network fault in both an active node and a standby node.

Other aspects and advantages of the present disclosure will be given in the following description, some of which will become apparent from the following description or may be learned from practices of the present disclosure.

BRIEF DESCRIPTION OF THE DRAWINGS

Other aspects and advantages of the present disclosure will be given in the following description, some of which will become apparent from the following description or may be learned from practices of the present disclosure.

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions.

A CANopen-based data transmission gateway changeover method, a system and an apparatus thereof according to embodiments of the present disclosure are described below with reference to accompanying drawings.

Understandably, a policy in the prior art is to set up an active gateway and a standby gateway in a network, all network data are transmitted on both the active gateway and the standby gateway, but only one active master node exists in the network. To be specific, when the active gateway is in normal operation, the standby gateway is in a silent state. A switchover between an active gateway and a standby gateway is implemented depending only on whether a heartbeat packet of the active gateway is dropped. When detecting a fault of its network, the active gateway stops transmitting the heartbeat packet. The standby gateway starts working when it fails to receive the heartbeat packet of the active gateway.

Figure 1:
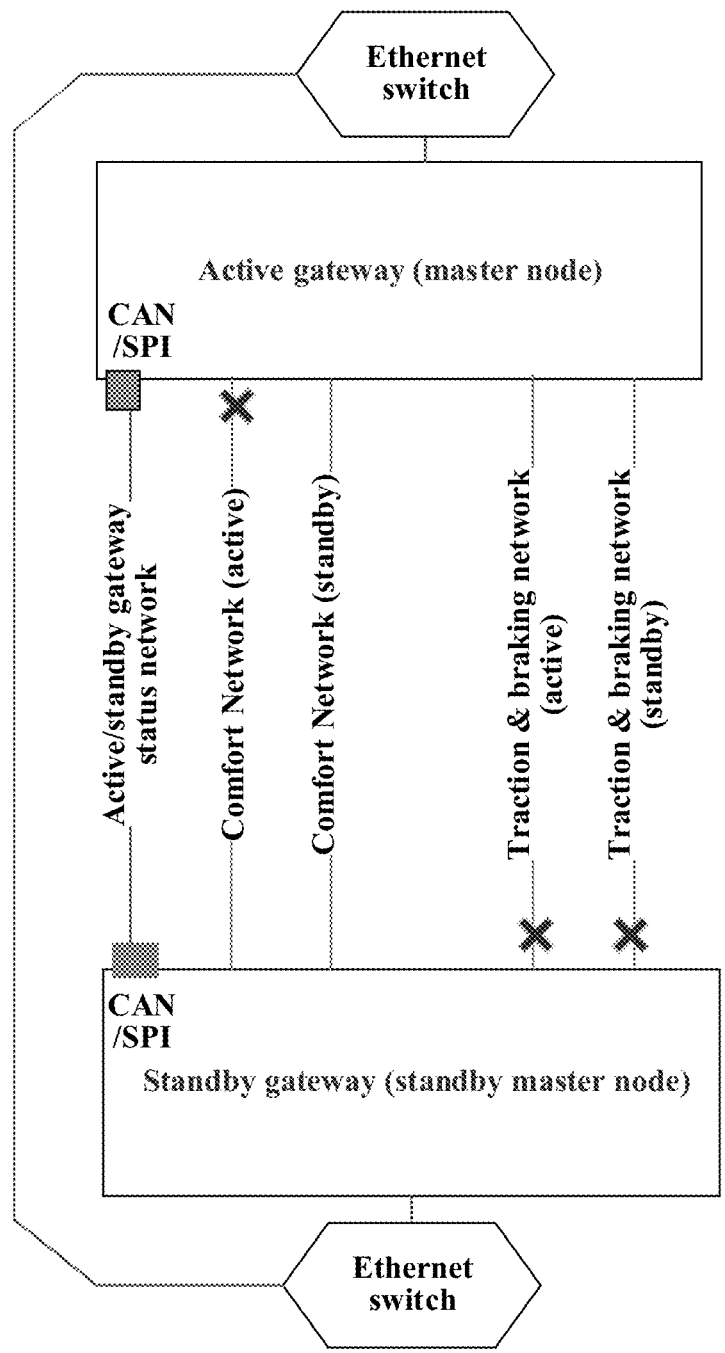
FIG. 1 is a schematic architectural diagram of a train network according to an embodiment of the present disclosure.

However, this solution is only applicable where one master node in a network has a network fault, and keeps normal network communication by switching services from the active gateway to the standby gateway. A major defect of this solution is ignorance a circumstance in which both the active gateway and the standby gateway have a network fault, so that this solution is limited to some extent. As shown in FIG. 1, when a comfort network of the active gateway is faulty and a traction & braking network of the standby gateway is faulty, normal network communication cannot be maintained by simply switching services from the active gateway to the standby gateway because only the active gateway or the standby gateway can keep alive. This will result in disrupted operation of an entire train and reduce redundancy effects significantly, without effectuating tenets of redundancy.

To resolve the technical problem in the prior art in which communication fails when both an active gateway and a standby gateway have a network fault and cannot communicate normally, the present disclosure provides a design scheme of changing over an active gateway of a train on the basis of a network redundancy design structure of existing trains. This design scheme requires that the active gateway and the standby gateway should coordinate based on different operating states, to ensure normal communication even when the network is faulty, and effectively avoid failure of network communication that occurs when both the active gateway and the standby gateway have a network fault. In addition, this design scheme improves practical effects of redundancy design, properly avoids disrupted operation of the entire train caused by network faults of the train, and ensures normal communication between network nodes even in some abnormal circumstances. It should be understood that the train network data transmission method in the present disclosure is performed based on a CANopen protocol. The CANopen protocol requires that one node in the network should act as an active master node to manage initialization and startup of other slave nodes and supervise, reset or shut down other slave nodes or the like.

To better clarify the CANopen-based data transmission gateway changeover method in the present disclosure, the method applied on an active gateway side is described below with reference to specific embodiments. In the following embodiments, "alive" means a live state, and "stop" means stopping operation.

Figure 2:
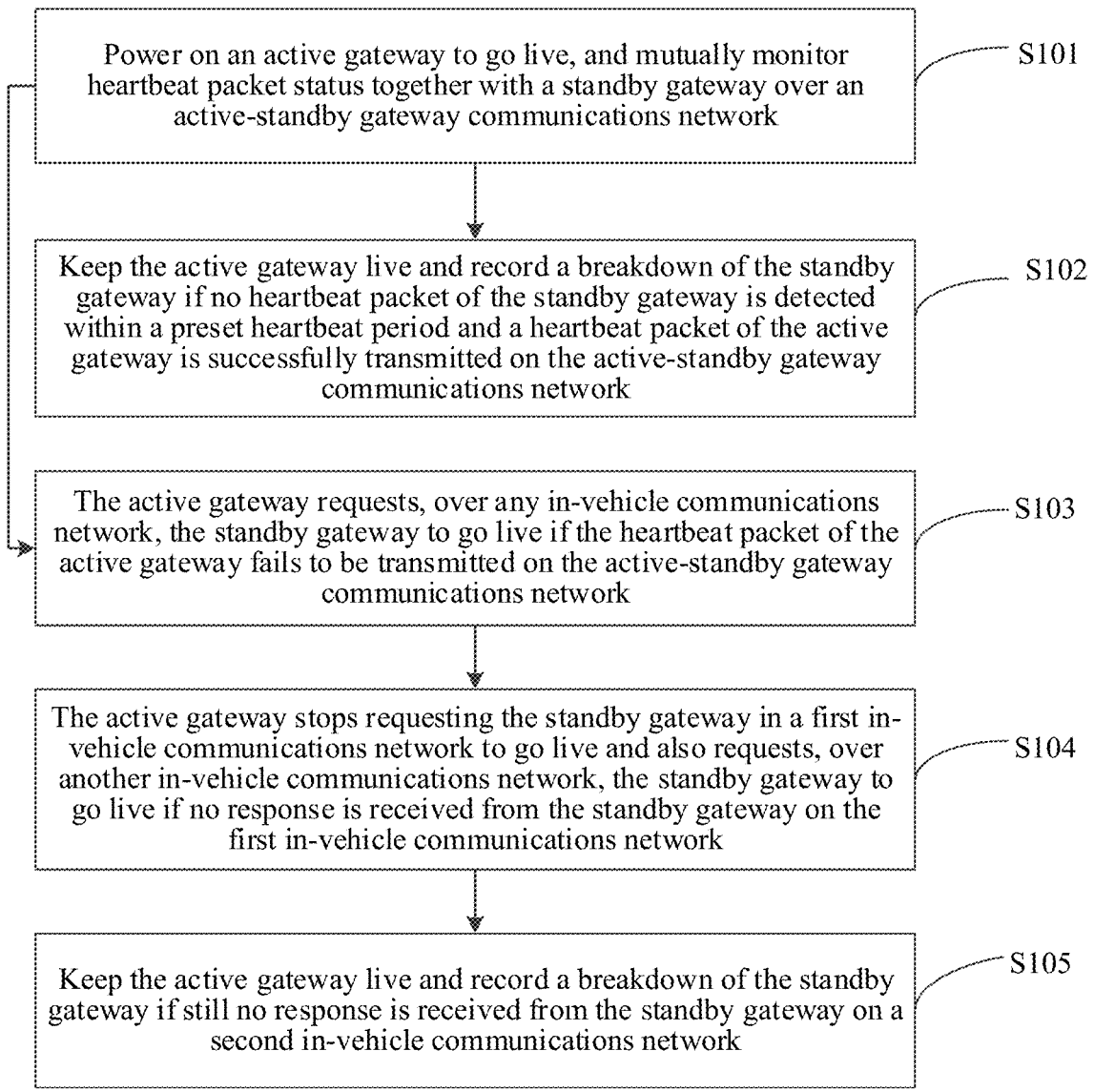
FIG. 2 is a flowchart of a CANopen-based data transmission gateway changeover method according to a first embodiment of the present disclosure.

FIG. 2 is a flowchart of a CANopen-based data transmission gateway changeover method according to a first embodiment of the present disclosure. As shown in FIG. 2, the method includes the following steps.

S101. Power on an active gateway to go alive or online, and mutually monitor heartbeat packet status together with a standby gateway over an active-standby gateway communications network.

It should be noted that, for various operating states of the active gateway in the embodiments of the present disclosure, reference may be made to Table 1 below; for various operating states of the standby gateway, reference may be made to Table 2 below; for the operating states of the active gateway and the standby gateway, reference may be made to Table 3. Tables 1 to 3 may be referenced in description of the operating states of the active gateway and the standby gateway in the following embodiments.

TABLE 1

| | | | Active gateway | | | |
|---|---|---|---|---|---|---|
| Node-ID | ID | Packet type | Transmission type | Real time or not | Time to trigger an event timer | Byte length |
| — | 0x071h | Heartbeat packet of an active gateway | Event driven | N/A | 100 ms | 1 |

| Byte | Location | Length | Signal | Signal value | Receiving node | Description |
|---|---|---|---|---|---|---|
| 1 | 1.0 | 1 | Receiving status of data from an external network of a compartment | 0x0: Normal 0x1: Faulty | Standby gateway | 0x00 indicates normal receiving of data from all networks |
| | 1.1 | 1 | Receiving status of data from an internal network of a compartment - traction & braking network | 0x0: Normal 0x1: Faulty | | |
| | 1.2 | 1 | Receiving status of data from an internal network of a compartment - comfort network | 0x0: Normal 0x1: Faulty | | |
| | 1.3~1.7 | 5 | Reserved | Reserved (0 by default) | | |
| 2 | 2.0-2.7 | 8 | Operating state | 0x00: disabled; 0x01: alive; 0x02: stop; 0x03: abnormity-1; 0x04: abnormity-2; 0x05: abnormity-3; 0x06: abnormity-4; 0x07: abnormity-5; 0x08: abnormity-6; 0x09: abnormity-7; 0x0A: abnormity-8; 0x0B: abnormity-9; 0x0C: abnormity-10; 0x0D: abnormity-10; 0x0E: abnormity-11; 0x0F: abnormity-12; 0x10: abnormity-13; 0x11: abnormity-14; 0x12: abnormity-15; Remaining signals: Reserved | Standby gateway | |

TABLE 1-continued

| | | | | Active gateway | | |
|---|---|---|---|---|---|---|
| 3 | 3.0'3.7 | 2 | Responsive operation requested to be performed by the standby gateway | 0x00: disabled; 0x01: alive; 0x02: stop; 0x03: abnormity-1; 0x04: abnormity-2; 0x05: abnormity-3; 0x06: abnormity-4; 0x07: abnormity-5; 0x08: abnormity-6; 0x09: abnormity-7; 0x0A: abnormity-8; 0x0B: abnormity-9; 0x0C: abnormity-10; 0x0D: abnormity-10; 0x0E: abnormity-11; 0x0F: abnormity-12; 0x10: abnormity-13; 0x11: abnormity-14; 0x12: abnormity-15; Remaining signals: Reserved | Standby gateway | |

TABLE 2

| | | | Standby gateway | | | |
|---|---|---|---|---|---|---|
| Node-ID | ID | Packet type | Transmission type | Real time or not | Time to trigger an event timer | Byte length |
| — | 0x072h | Heartbeat packet of a standby gateway | Event driven | N/A | 100 ms | 1 |

| Byte | Location | Length | Signal | Signal value | Receiving node | Description |
|---|---|---|---|---|---|---|
| 1 | 1.0 | 1 | Receiving status of data from an external network of a compartment | 0x0: Normal 0x1: Faulty | Active gateway | 0x00 indicates normal receiving of data from all networks |
| | 1.1 | 1 | Receiving status of data from an internal network of a compartment - traction & braking network | 0x0: Normal 0x1: Faulty | | |
| | 1.2 | 1 | Receiving status of data from an internal network of a compartment - comfort network | 0x0: Normal 0x1: Faulty | | |
| | 1.3~1.7 | 5 | Reserved | Reserved (0 by default) | | |
| 2 | 2.0-2.7 | 8 | Operating state | 0x00: disabled; 0x01: alive; 0x02: stop; 0x03: abnormity-1; 0x04: abnormity-2; 0x05: abnormity-3; 0x06: abnormity-4; 0x07: abnormity-5; 0x08: abnormity-6; 0x09: abnormity-7; 0x0A: abnormity-8; 0x0B: abnormity-9; 0x0C: abnormity-10; | Active gateway | |

TABLE 2-continued

Standby gateway

| | | | | 0x0D: abnormity-10;<br>0x0E: abnormity-11;<br>0x0F: abnormity-12;<br>0x10: abnormity-13;<br>0x11: abnormity-14;<br>0x12: abnormity-15;<br>Remaining signals:<br>Reserved | |
|---|---|---|---|---|---|
| 3 | 3.0'3.7 | 8 | Responsive operation requested to be performed by the active gateway | 0x00: disabled;<br>0x01: alive;<br>0x02: stop;<br>0x03: abnormity-1;<br>0x04: abnormity-2;<br>0x05: abnormity-3;<br>0x06: abnormity-4;<br>0x07: abnormity-5;<br>0x08: abnormity-6;<br>0x09: abnormity-7;<br>0x0A: abnormity-8;<br>0x0B: abnormity-9;<br>0x0C: abnormity-10;<br>0x0D: abnormity-10;<br>0x0E: abnormity-11;<br>0x0F: abnormity-12;<br>0x10: abnormity-13;<br>0x11: abnormity-14;<br>0x12: abnormity-15;<br>Remaining signals:<br>Reserved | Active gateway |

TABLE 3

| State type | State description |
|---|---|
| alive | Execute a protocol requirement, and forward relevant data if any; and act as a network administrator and transmit master node-specific packets such as synchronization packets and timestamps. |
| stop | Stop forwarding relevant data, stay in a silent state, and monitor heartbeat packet status of the active gateway or the standby gateway from an active-standby gateway communications network, a traction & braking network, and a comfort network separately. |
| abnormity-1 | The active gateway acts as a network administrator of the traction & braking network and the comfort network, and transmits the master node-specific packets such as synchronization packets and timestamps to the two networks simultaneously.<br>How to forward data of an internal network in a compartment:<br>forwarding of data of the traction & braking network and the comfort network is implemented by the active gateway.<br>How to forward data of an inter-compartment network:<br>data of the traction & braking network is collected by the standby gateway and forwarded onto the Ethernet; and<br>data of the comfort network is collected by the active gateway and forwarded to the traction & braking network, and then forwarded out by the standby gateway over the Ethernet. |
| abnormity-2 | The active gateway acts as a network administrator of the traction & braking network and the comfort network, and transmits the master node-specific packets such as synchronization packets and timestamps.<br>How to forward data of an internal network in a compartment:<br>Forwarding of data of the traction & braking network and the comfort network is implemented by the active gateway.<br>How to forward data of an inter-compartment network:<br>data of the comfort network is collected by the standby gateway and forwarded onto the Ethernet; and<br>data of the traction & braking network is collected by the active gateway and forwarded to the comfort network, and then forwarded out by the standby gateway over the Ethernet. |
| abnormity-3 | The active gateway acts as a network administrator of the comfort network, and transmits the master node-specific packets such as synchronization packets and timestamps on the comfort network; and<br>the standby gateway acts as a network administrator of the traction & braking network, and transmits the master node-specific packets such as synchronization packets and timestamps on the traction & braking network.<br>How to forward data of an internal network in a compartment:<br>the active gateway forwards data of the comfort network, which is needed by the traction & braking network, to the active-standby gateway communications network first, and the standby gateway receives the data and then forwards it to the traction & braking network; and<br>The standby gateway forwards data of the traction & braking network, which is needed by the comfort network, to the active-standby gateway communications network first, and the active gateway receives the data and then forwards it to the comfort network.<br>How to forward data of an inter-compartment network:<br>the active gateway forwards data of the comfort network to the Ethernet;<br>and the standby gateway forwards data of the traction & braking network to the Ethernet. |
| abnormity-4 | The active gateway acts as a network administrator of the comfort network, and transmits the master node-specific packets such as synchronization packets and timestamps on the comfort network; and |

TABLE 3-continued

| State type | State description |
|---|---|
|  | the standby gateway acts as a network administrator of the traction & braking network, and transmits the master node-specific packets such as synchronization packets and timestamps on the traction & braking network.<br>How to forward data of an internal network in a compartment:<br>the active gateway forwards data of the comfort network, which is needed by the traction & braking network, to the active-standby gateway communications network first, and the standby gateway receives the data and then forwards it to the traction & braking network; and<br>the standby gateway forwards data of the traction & braking network, which is needed by the comfort network, to the active-standby gateway communications network first, and the active gateway receives the data and then forwards it to the comfort network.<br>How to forward data of an inter-compartment network:<br>the active gateway forwards data of the comfort network to the Ethernet; and<br>the standby gateway forwards data of the traction & braking network to the active-standby gateway communications network first, and the active gateway receives the data and then forwards it to the Ethernet. |
| abnormity-5 | The active gateway acts as a network administrator of the comfort network, and transmits the master node-specific packets such as synchronization packets and timestamps on the comfort network; and the standby gateway acts as a network administrator of the traction & braking network, and transmits the master node-specific packets such as synchronization packets and timestamps on the traction & braking network.<br>How to forward data of an internal network in a compartment:<br>the active gateway forwards data of the comfort network, which is needed by the traction & braking network, to the active-standby gateway communications network first, and the standby gateway receives the data and then forwards it to the traction & braking network; and<br>the standby gateway forwards data of the traction & braking network, which is needed by the comfort network, to the active-standby gateway communications network first, and the active gateway receives the data and then forwards it to the comfort network.<br>How to forward data of an inter-compartment network:<br>the active gateway forwards data of the comfort network to the active-standby gateway communications network first, and the standby gateway forwards the data to the Ethernet; and<br>the standby gateway forwards data of the traction & braking network to the Ethernet. |
| abnormity-6 | The active gateway acts as a network administrator of the comfort network, and transmits the master node-specific packets such as synchronization packets and timestamps on the comfort network; and the standby gateway acts as a network administrator of the traction & braking network, and transmits the master node-specific packets such as synchronization packets and timestamps on the traction & braking network.<br>How to forward data of an internal network in a compartment:<br>the active gateway forwards data of the comfort network, which is needed by the traction & braking network, to the active-standby gateway communications network first, and the standby gateway receives the data and then forwards it to the traction & braking network; and<br>the standby gateway forwards data of the traction & braking network, which is needed by the comfort network, to the active-standby gateway communications network first, and the active gateway receives the data and then forwards it to the comfort network.<br>How to forward data of an inter-compartment network:<br>in a breakdown state. |
| abnormity-7 | The active gateway acts as a network administrator of the comfort network, and transmits the master node-specific packets such as synchronization packets and timestamps on the comfort network.<br>How to forward data of an internal network in a compartment: in a breakdown state.<br>How to forward data of an inter-compartment network:<br>the active gateway forwards data of the comfort network to the active-standby gateway communications network first, and the standby gateway receives the data and then forwards it to the Ethernet. |
| abnormity-8 | The standby gateway acts as a network administrator of the traction & braking network and the comfort network, and transmits the master node-specific packets such as synchronization packets and timestamps on the comfort network.<br>How to forward data of an internal network in a compartment:<br>forwarding of data between the traction & braking network and the comfort network is implemented by the standby gateway.<br>How to forward data of an inter-compartment network:<br>the active gateway forwards data of the comfort network to the Ethernet; and<br>the standby gateway forwards data of the traction & braking network to the comfort network first, and the active gateway receives the data and then forwards it to the Ethernet. |
| abnormity-9 | The standby gateway acts as a network administrator of the traction & braking network and the comfort network, and transmits the master node-specific packets such as synchronization packets and timestamps on the comfort network.<br>How to forward data of an internal network in a compartment:<br>forwarding of data of the traction & braking network and the comfort network is implemented by the standby gateway.<br>How to forward data of an inter-compartment network:<br>data of the traction & braking network is collected by the active gateway and forwarded to the Ethernet; and<br>data of the comfort network is collected by the standby gateway and forwarded to the traction & braking network, and then forwarded out by the active gateway over the Ethernet. |
| abnormity-10 | The active gateway acts as a network administrator of the traction & braking network, and transmits the master node-specific packets such as synchronization packets and timestamps on comfort network; and<br>The standby gateway acts as a network administrator of the comfort network, and transmits the master node-specific packets such as synchronization packets and timestamps on the traction & braking network.<br>How to forward data of an internal network in a compartment:<br>the active gateway forwards data of the traction & braking network, which is needed by the comfort network, to the active-standby gateway communications network first, and the standby gateway receives the data and then forwards it to the comfort network;<br>and the standby gateway forwards data of the comfort network, which is needed by the traction & braking network, to the active-standby gateway communications network first, and the active gateway receives the data and then forwards it to the traction & braking network.<br>How to forward data of an inter-compartment network:<br>the active gateway forwards data of the traction & braking network to the Ethernet;<br>and the standby gateway forwards data of the comfort network to the Ethernet. |
| abnormity-11 | The active gateway acts as a network administrator of the traction & braking network, and transmits the master node-specific packets such as synchronization packets and timestamps on comfort network; and |

TABLE 3-continued

| State type | State description |
|---|---|
| | The standby gateway acts as a network administrator of the comfort network, and transmits the master node-specific packets such as synchronization packets and timestamps on the traction & braking network.<br>How to forward data of an internal network in a compartment:<br>the active gateway forwards data of the traction & braking network, which is needed by the comfort network, to the active-standby gateway communications network first, and the standby gateway receives the data and then forwards it to the comfort network;<br>The standby gateway forwards data of the comfort network, which is needed by the traction & braking network, to the active-standby gateway communications network first, and the active gateway receives the data and then forwards it to the traction & braking network;<br>How to forward data of an inter-compartment network:<br>The active gateway forwards data of the traction & braking network to the Ethernet; and<br>The standby gateway forwards data of the comfort network to the active-standby gateway communications network first, and the active gateway forwards the data to the Ethernet. |
| abnormity-12 | The active gateway acts as a network administrator of the comfort network, and transmits the master node-specific packets such as synchronization packets and timestamps on the comfort network; and<br>The standby gateway acts as a network administrator of the traction & braking network, and transmits the master node-specific packets such as synchronization packets and timestamps on the traction & braking network.<br>How to forward data of an internal network in a compartment:<br>the active gateway forwards data of the traction & braking network, which is needed by the comfort network, to the active-standby gateway communications network first, and the standby gateway receives the data and then forwards it to the comfort network;<br>and the standby gateway forwards data of the comfort network, which is needed by the traction & braking network, to the active-standby gateway communications network first, and the active gateway receives the data and then forwards it to the traction & braking network.<br>How to forward data of an inter-compartment network:<br>in a breakdown state. |
| abnormity-13 | The standby gateway acts as a network administrator of the traction & braking network and the comfort network, and transmits the master node-specific packets such as synchronization packets and timestamps on the comfort network.<br>How to forward data of an internal network in a compartment:<br>forwarding of data between the traction & braking network and the comfort network is implemented by the standby gateway.<br>How to forward data of an inter-compartment network:<br>the standby gateway forwards data of the comfort network and the traction & braking network to the active-standby gateway communications network first, and the active gateway receives the data and then forwards it to the Ethernet. |
| abnormity-14 | The standby gateway acts as a network administrator of the comfort network, and transmits the master node-specific packets such as synchronization packets and timestamps on the comfort network.<br>How to forward data of an internal network in a compartment: in a breakdown state.<br>How to forward data of an inter-compartment network:<br>the standby gateway forwards data of the comfort network to the active-standby gateway communications network first, and the active gateway receives the data and then forwards it to the Ethernet. |
| abnormity-15 | The standby gateway acts as a network administrator of the traction & braking network, and transmits the master node-specific packets such as synchronization packets and timestamps on comfort network.<br>How to forward data of an internal network in a compartment: in a breakdown state.<br>How to forward data of an inter-compartment network:<br>the standby gateway forwards data of the traction & braking network to the active-standby gateway communications network first, and the active gateway receives the data and then forwards it to the Ethernet. |

Specifically, if the active gateway is powered on to go alive, that is, get into the alive state described in Table 3, the active-standby gateway communications network and the standby gateway mutually monitor heartbeat packet status, and keep alive no matter whether the heartbeat packet of the standby gateway can be received.

S102. Keep the active gateway alive and record a breakdown of the standby gateway if no heartbeat packet of the standby gateway is detected within a preset heartbeat period and a heartbeat packet of the active gateway is successfully transmitted on the active-standby gateway communications network.

S103. The active gateway requests, over any in-vehicle communications network, the standby gateway to go alive if the heartbeat packet of the active gateway fails to be transmitted on the active-standby gateway communications network.

S104. The active gateway stops requesting the standby gateway in a first in-vehicle communications network to go alive and also requests, over another in-vehicle communications network, the standby gateway to go alive if no response is received from the standby gateway on the first in-vehicle communications network.

S105. Keep the active gateway alive and record a breakdown of the standby gateway if still no response is received from the standby gateway on a second in-vehicle communications network.

The preset heartbeat period may be set as required in a specific application scenario, and is not limited herein.

It should be understood that, the in-vehicle communications network in this embodiment of the present disclosure may include a first in-vehicle communications network and a second in-vehicle communications network. The first in-vehicle communications network may be a traction & braking network or the like, and the second in-vehicle communications network may be a comfort network or the like. For convenience of description, in this embodiment of the present disclosure, the method is primarily described by using a traction & braking network or the like as a first in-vehicle communications network and using a comfort network as a second communications network.

Specifically, the active gateway keeps alive and a breakdown of the standby gateway is recorded if no heartbeat packet of the standby gateway is detected within a preset heartbeat period and a heartbeat packet of the active gateway is successfully transmitted on the active-standby gateway communications network. If the heartbeat packet of the active gateway fails to be transmitted on the active-standby gateway communications network, the active gateway requests, over a traction & braking network, the standby gateway to go alive. If no response is received from the standby gateway on the traction & braking network, the active gateway will stop requesting the standby gateway in the traction & braking network to go alive, and also request, over a comfort network, the standby gateway to go alive. If still no response is received from the standby gateway on the comfort network, the active gateway keeps alive and records a breakdown of the standby gateway.

Figure 3:
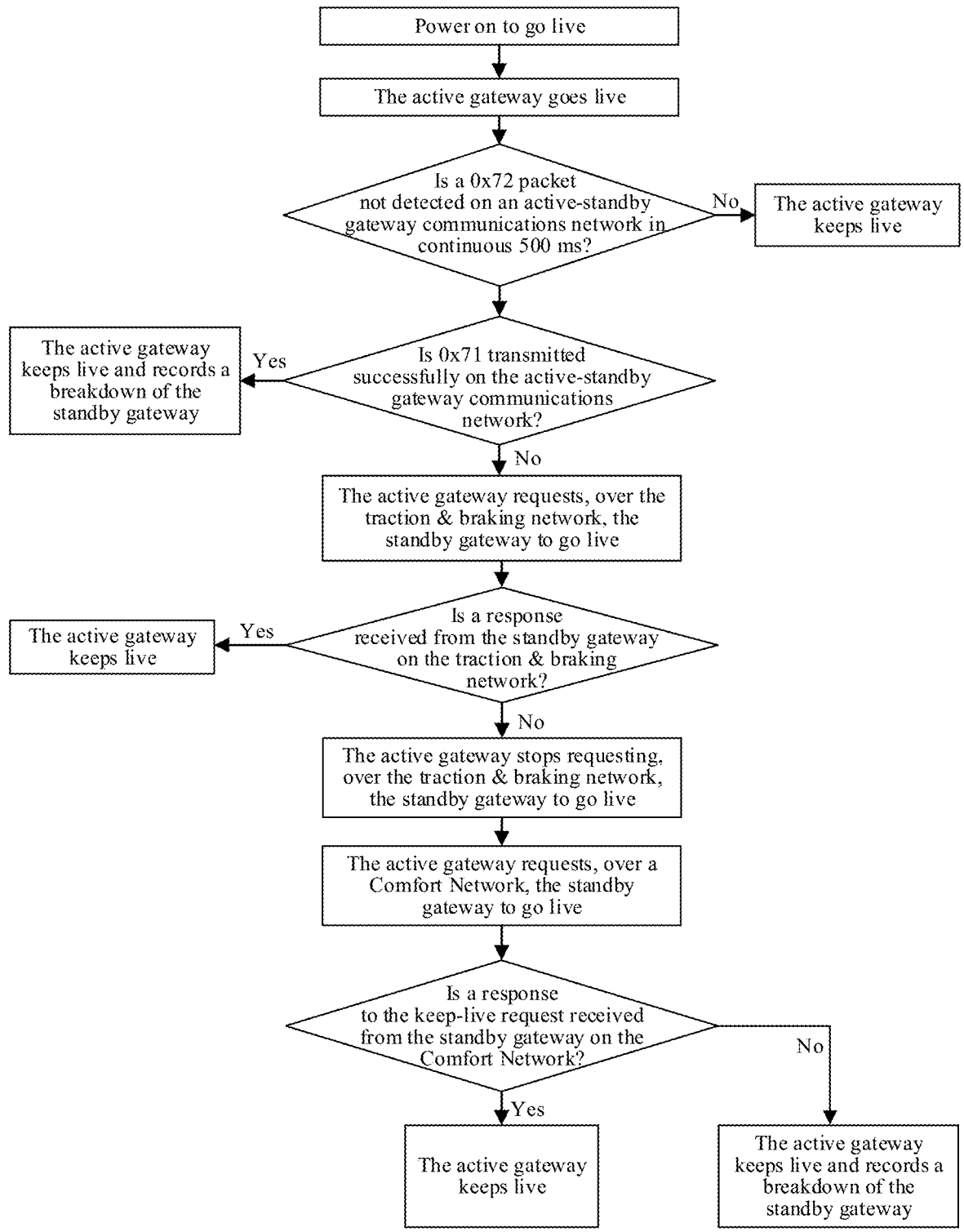
FIG. 3 is a processing flowchart of normal communication of all networks according to an embodiment of the present disclosure.

For example, as shown in FIG. 3, when the preset heartbeat period is 500 ms, if no heartbeat packet of the standby gateway is detected on the active-standby gateway communications network in continuous 500 ms, and if the heartbeat packet of the active gateway is successfully transmitted on the active-standby gateway communications network, then the active gateway keeps alive and records a breakdown of the standby gateway. If the heartbeat packet of the active gateway fails to be transmitted on the active-standby gateway communications network, the active gateway requests, over the traction & braking network, the standby gateway to go alive. If no response is received from the standby gateway on the traction & braking network, the active gateway will stop requesting the standby gateway in the traction & braking network to go alive, and also request, over a comfort network, the standby gateway to go alive. If still no response is received from the standby gateway on the comfort network, the active gateway keeps alive and records a breakdown of the standby gateway.

Accordingly, in the CANopen-based data transmission gateway changeover method provided in this embodiment of the present disclosure, the active gateway is powered on to go alive, and mutually monitors the heartbeat packet status together with the standby gateway over the active-standby gateway communications network. If no heartbeat packet of the standby gateway is detected in the preset heartbeat period, and if the heartbeat packet of the active gateway is successfully transmitted on the active-standby gateway communications network, then the active gateway keeps alive and records a breakdown of the standby gateway. If the heartbeat packet of the active gateway fails to be transmitted on the active-standby gateway communications network, the active gateway requests, over any in-vehicle communications network, the standby gateway to go alive. If no response is received from the standby gateway on the first in-vehicle communications network, the active gateway stops requesting the standby gateway in the first in-vehicle communications network to go alive, and also requests, over another in-vehicle communications network, the standby gateway to go alive. If still no response is received from the standby gateway on the second in-vehicle communications network, the active gateway keeps alive and records a breakdown of the standby gateway. In this way, coordination is performed based on different operating states of an active gateway and a standby gateway, thereby effectively ensuring normal communication even when a network is in an abnormal state, and avoiding abnormal network communication caused by occurrence of a network fault in both an active node and a standby node.

Understandably, the foregoing embodiment is applied to only a scenario in which both the in-vehicle communications network and the inter-vehicle communications network are in normal communication (071 byte1=00). In practical application, scenarios are diverse. To better clarify the CANopen-based data transmission gateway changeover method provided in an embodiment of the present disclosure, the following describes an implementation process of the method with reference to a plurality of different scenarios.

It should be understood that, as mentioned above, the in-vehicle communications network in this embodiment of the present disclosure may include a first in-vehicle communications network and a second in-vehicle communications network. The first in-vehicle communications network may be a traction & braking network or the like, and the second in-vehicle communications network may be a comfort network or the like. The in-vehicle communications network may be an Ethernet. For convenience of description, in this embodiment of the present disclosure, the method is primarily described by using a traction & braking network or the like as a first in-vehicle communications network, using a comfort network as a second communications network, and using an Ethernet as an in-vehicle communications network.

Figure 4:
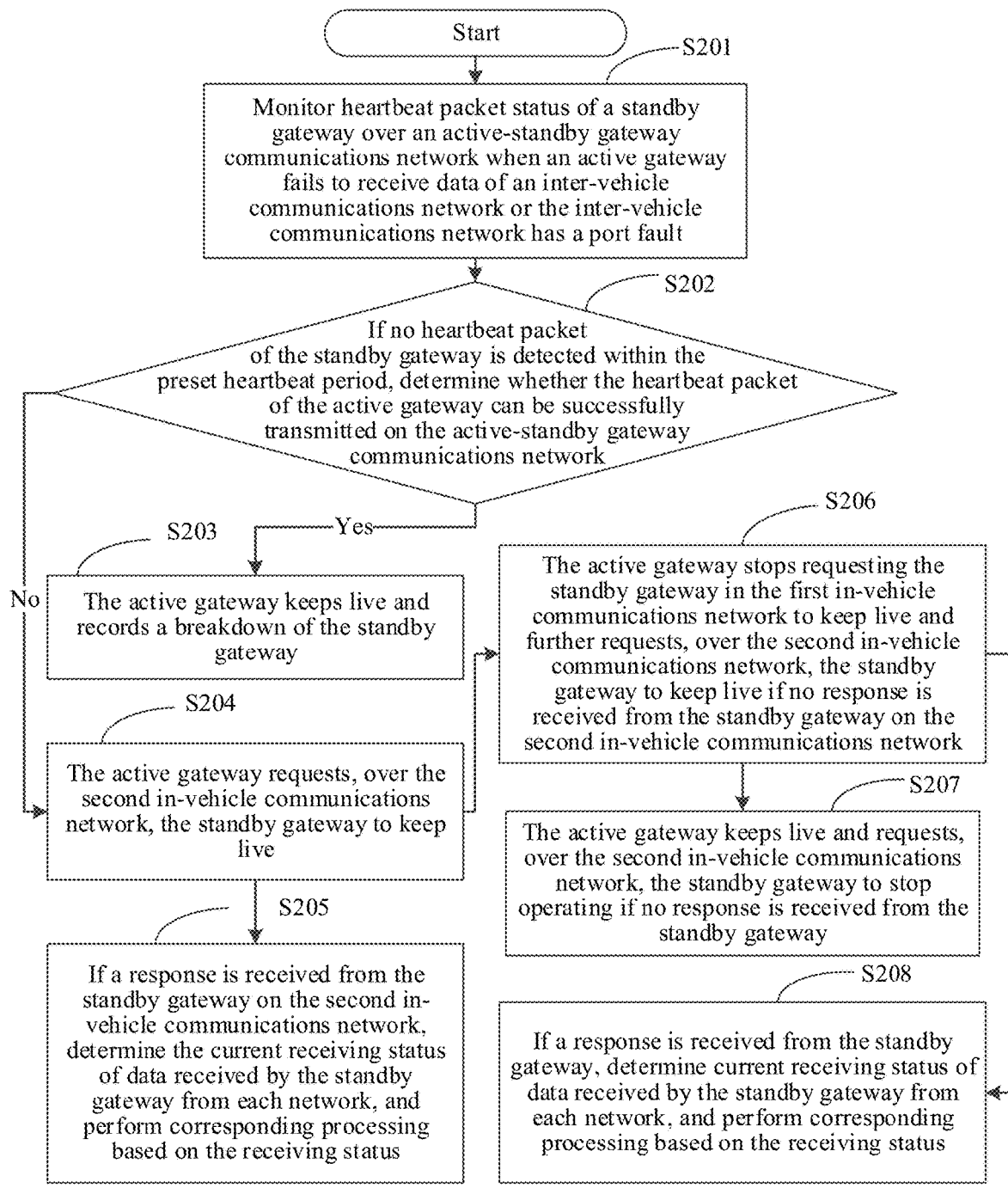
FIG. 4 is a flowchart of a CANopen-based data transmission gateway changeover method according to a second embodiment of the present disclosure.

Scenario 1: Only data of the in-vehicle communications network (Ethernet) fails to be received (071 byte1=01):

FIG. 4 is a flowchart of a CANopen-based data transmission gateway changeover method according to a second embodiment of the present disclosure. As shown in FIG. 4, the method further includes the following steps.

S201. Monitor heartbeat packet status of a standby gateway over an active-standby gateway communications network when an active gateway fails to receive data of an in-vehicle communications network or the in-vehicle communications network has a port fault.

In an embodiment of the present invention, if a heartbeat packet is received from the standby gateway normally, the active gateway determines current receiving status of data received by the standby gateway from each network, and performs corresponding processing based on the receiving status.

In this embodiment, if it is detected that data from all the three networks are received normally, the active gateway stops operating, and requests, over an active-standby gateway communications network, the standby gateway to go alive. If it is detected that receiving of data from an external network of a compartment is abnormal, the active gateway keeps alive. If it is detected that only the receiving of data from a traction & braking network is abnormal, the active gateway requests, over the active-standby gateway communications network, the standby gateway to go alive. Then the standby gateway goes live, and attempts to perform redundant network switching. If the switching succeeds, the active gateway stops operating, and requests, over the active-standby gateway communications network, the standby gateway to keep alive. If the switching fails, the standby gateway switches to an abnormity-2 state, and requests, over the active-standby gateway communications network, the active gateway to get into the abnormity-2 state.

If it is detected that only the receiving of data from the comfort network is abnormal, the active gateway stops operating, and the standby gateway goes alive and attempts to perform redundant network switching. If the switching succeeds, the active gateway stops operating, and requests, over the active-standby gateway communications network, the standby gateway to keep alive. If the switching fails, the standby gateway switches to an abnormity-1 state, and requests, over the active-standby gateway communications network, the active gateway to get into the abnormity-1 state. If it is detected that the receiving of data from both the traction & braking network and the comfort network is abnormal, the standby gateway keeps alive, and attempts to perform redundant network switching, and determines current status of the active gateway and the standby gateway based on a result of determining whether the two attempts of switching to the standby networks succeed.

In this way, if the switching succeeds, the active gateway stops operating, and requests, over the active-standby gateway communications network, the standby gateway to go alive. If the switching fails, the active gateway consecutively determines whether the switching to the standby network of the traction & braking network and the standby network of the comfort network succeed. If the switching to the standby network of the traction & braking network succeeds, the standby gateway switches to an abnormity-1 state, and requests, over the active-standby gateway communications network, the active gateway to get into the abnormity-1 state. If the switching to the standby network of the comfort network succeeds, the standby gateway switches to an abnormity-2 state, and requests, over the active-standby gateway communications network, the active gateway to get into the abnormity-2 state. If the switching to neither of the standby networks succeeds, the active gateway keeps alive, and requests, over the active-standby gateway communications network, the standby gateway to stop operating.

S202. If no heartbeat packet of the standby gateway is detected within the preset heartbeat period, determine whether the heartbeat packet of the active gateway can be successfully transmitted on the active-standby gateway communications network.

Specifically, when the active gateway fails to receive Ethernet data or an Ethernet port is faulty, the active gateway monitors heartbeat packet status of the standby gateway over the active-standby communications network. For example, if no heartbeat packet of the standby gateway is detected in continuous 500 ms, the active gateway determines whether the heartbeat packet of the active gateway on the active-standby gateway communications network can be transmitted successfully.

S203. Keep the active gateway alive and record a breakdown of the standby gateway if the heartbeat packet of the active gateway is successfully transmitted.

S204. If the transmission fails, the active gateway requests, over the second in-vehicle communications network, the standby gateway to keep alive.

Specifically, the active gateway keeps alive and a breakdown of the standby gateway is recorded if the heartbeat packet of the active gateway is successfully transmitted. If the transmission fails, the active gateway requests, over the comfort network, the standby gateway to keep alive. In this case, if a response to the keep-alive request is received from the standby gateway on the comfort network, current receiving status of data received by the standby gateway from each network is determined.

S205. If a response is received from the standby gateway on the second in-vehicle communications network, determine the current receiving status of data received by the standby gateway from each network, and perform corresponding processing based on the receiving status.

In this example, if the receiving of data from all the three networks is normal, the active gateway stops operating, and the active gateway transmits an active gateway stop heartbeat packet over the traction & braking network. If it is detected that the receiving of data from only an external network of a compartment is abnormal, the active gateway keeps alive, and requests, over the traction & braking network, the standby gateway to stop operating. If it is detected that the receiving of data from only the comfort network is abnormal, the standby gateway keeps alive, and attempts to perform redundant network switching so that communication services are switched over to a standby network of the comfort network. If the switching succeeds, the active gateway stops operating, and transmits an active gateway stop heartbeat packet over the active-standby gateway communications network. If the switching fails, the standby gateway switches to an abnormity-1 state shown in Table 3, and requests, over the traction & braking network, the active gateway to get into the abnormity-1 state. If it is detected that the receiving of data from both the external network of the compartment and the comfort network is abnormal, the active gateway keeps alive, and requests, over the traction & braking network, the standby gateway to stop operating.

S206. The active gateway stops requesting the standby gateway in the first in-vehicle communications network to keep alive and further requests, over the second in-vehicle communications network, the standby gateway to keep alive if no response is received from the standby gateway on the second in-vehicle communications network.

S207. The active gateway keeps alive and requests, over the second in-vehicle communications network, the standby gateway to stop operating if no response is received from the standby gateway.

S208. If a response is received from the standby gateway, determine current receiving status of data received by the standby gateway from each network, and perform corresponding processing based on the receiving status.

If no response to the keep-alive request is received from the standby gateway on the comfort network, the active gateway stops requesting the standby gateway in the traction & braking network to keep alive, and requests, over the comfort network, the standby gateway to keep alive. The active gateway keeps alive and requests, over the comfort network, the standby gateway to stop operating if no response to the keep-alive request is received from the standby gateway. If a response to the keep-alive request is received from the standby gateway, current receiving status of data received by the standby gateway from each network is determined.

In this example, if the receiving of data from all the three networks is normal, the active gateway stops operating, and the active gateway transmits an active gateway stop heartbeat packet over the comfort network. If it is detected that the receiving of data from only the external network of the compartment is abnormal, the active gateway keeps alive, and requests, over the comfort network, the standby gateway to stop operating. If it is detected that the receiving of data from only the traction & braking network is abnormal, the standby gateway keeps alive, and attempts to perform redundant network switching and uses the traction & braking network. If the switching succeeds, the active gateway stops operating, and transmits an active gateway stop heartbeat packet over the comfort network. If the switching fails, the standby gateway switches to an abnormity-2 state, and requests, over the comfort network, the active gateway to get into the abnormity-2 state. If it is detected that the receiving of data from both the external network of the compartment and the traction & braking network is abnormal, the active gateway keeps alive, and requests, over the comfort network, the standby gateway to stop operating.

Figure 5A:
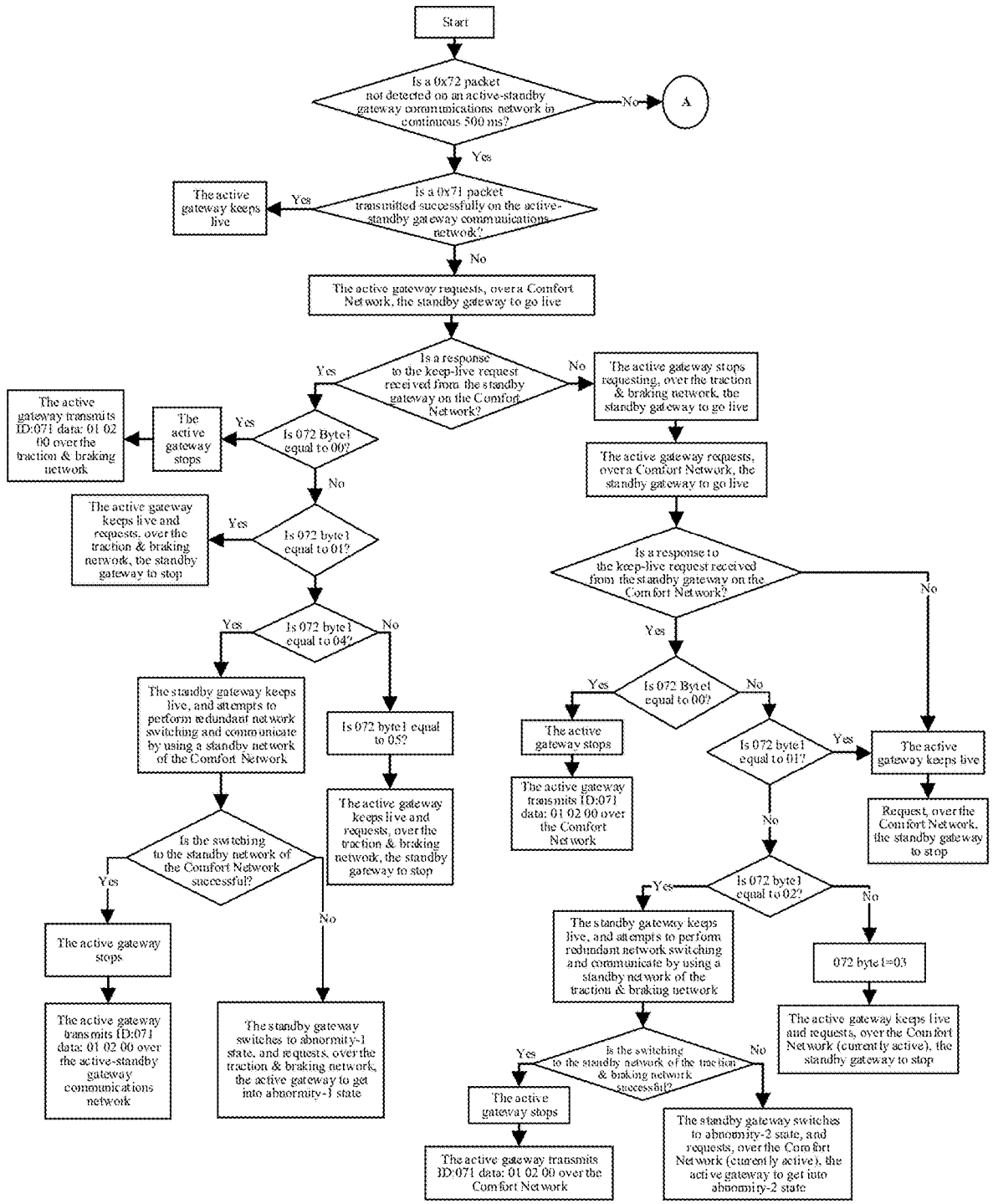
FIG. 5A is a processing flowchart according to an embodiment of the present disclosure where only Ethernet data fails to be received.
Figure 5B:
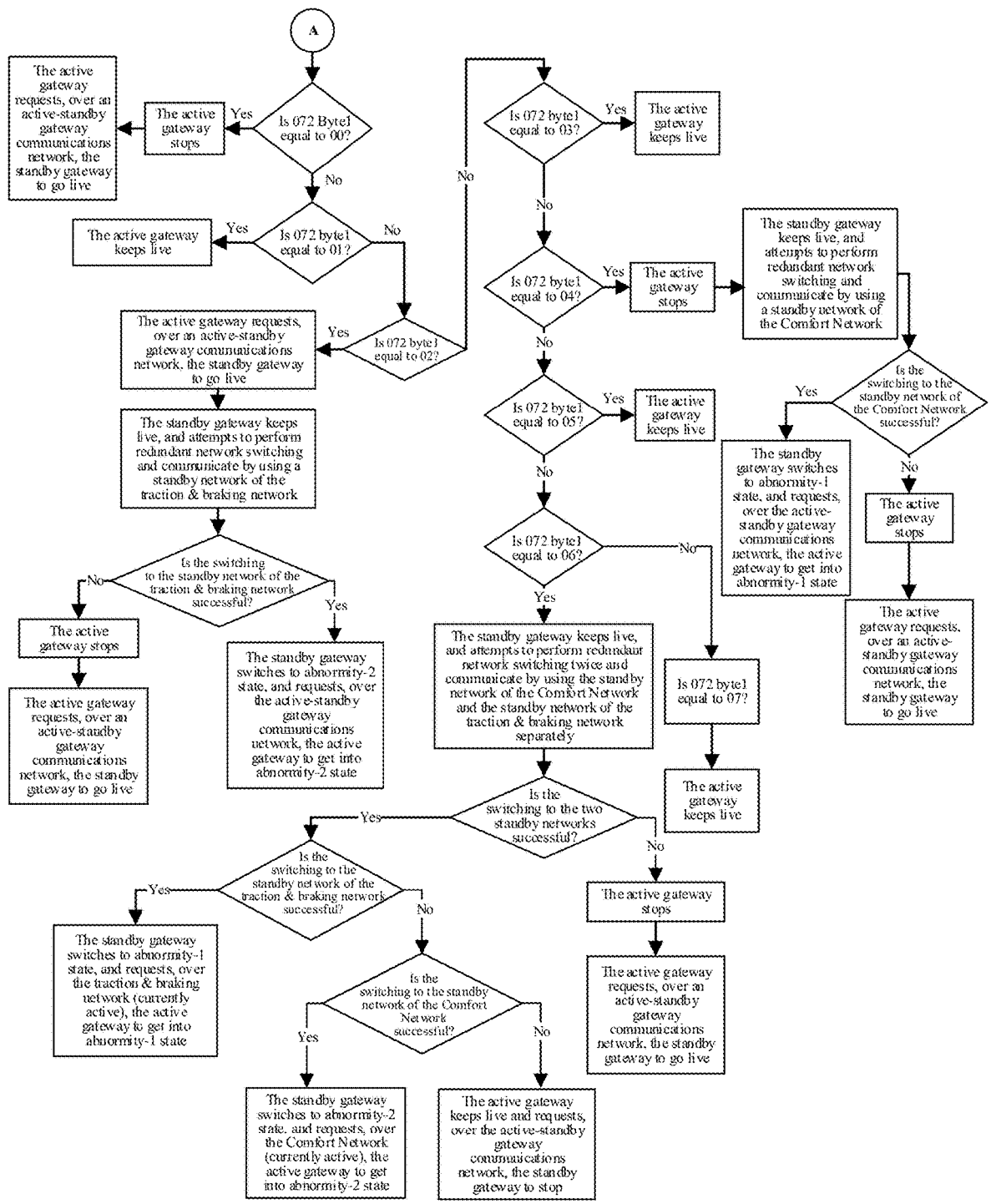
FIG. 5B is a processing flowchart of a branch A in FIG. 5A according to an embodiment of the present disclosure.

In order for a person skilled in the art to better understand an embodiment process in scenario 1, reference may be made to the processing flowchart in FIG. 5A and FIG. 5B in which only Ethernet data fails to be received, where FIG. 5B is a flowchart of a branch A shown in FIG. 5A.

Figure 6:
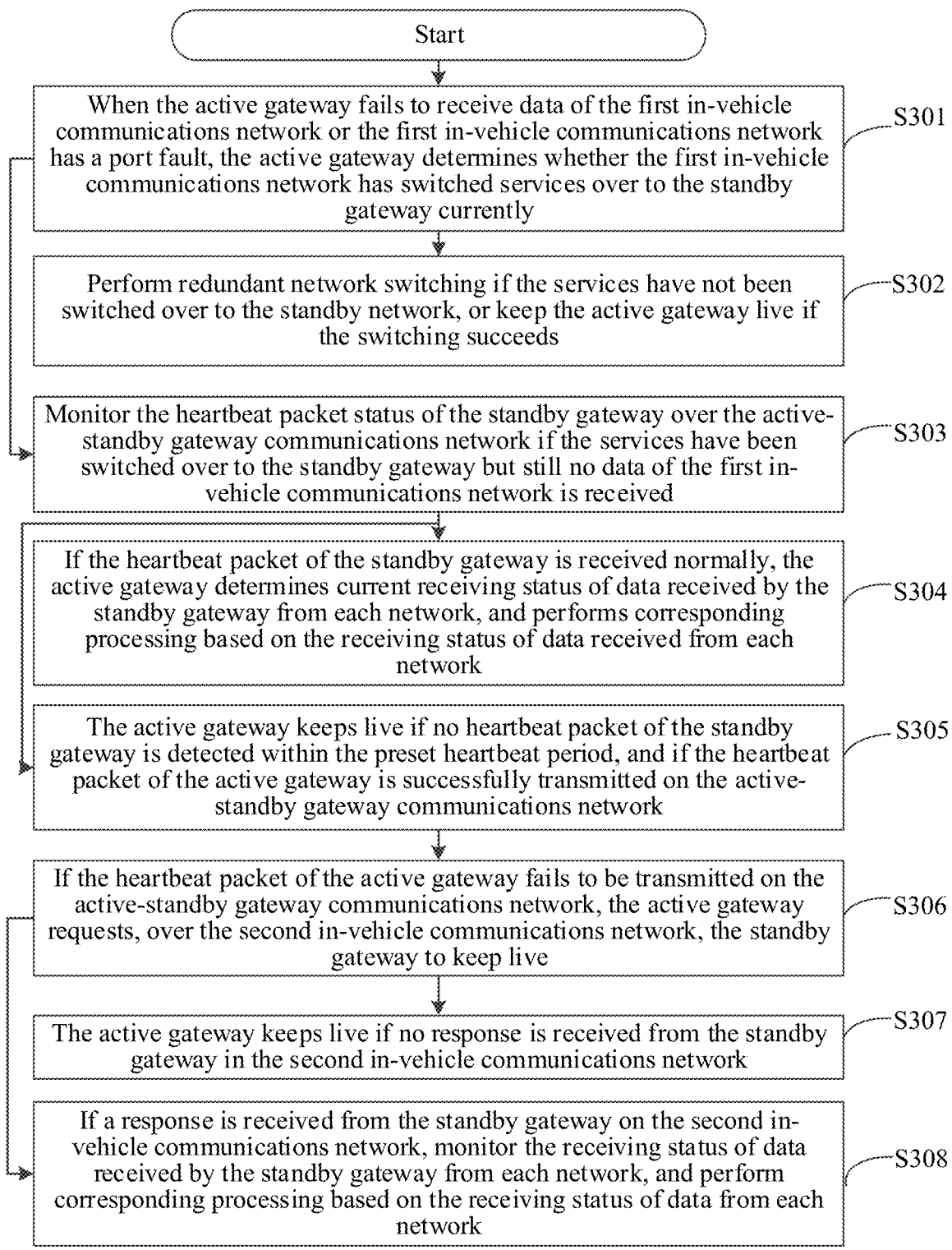
FIG. 6 is a flowchart of a CANopen-based data transmission gateway changeover method according to a third embodiment of the present disclosure.

Scenario 2: Only data of the first in-vehicle communications network (traction & braking network) fails to be received (071 byte1=02):

FIG. 6 is a flowchart of a CANopen-based data transmission gateway changeover method according to a third embodiment of the present disclosure. As shown in FIG. 6, the method further includes the following steps.

S301. When the active gateway fails to receive data of the first in-vehicle communications network or the first in-vehicle communications network has a port fault, the active gateway determines whether the first in-vehicle communications network has switched services over to the standby gateway currently.

Specifically, when the active gateway fails to receive data of the traction & braking network or the traction & braking network has a port fault, the active gateway first determines whether the traction & braking network has switched services over to a standby network currently.

S302. Perform redundant network switching if the services have not been switched over to the standby network, or keep the active gateway alive if the switching succeeds.

S303. Monitor the heartbeat packet status of the standby gateway over the active-standby gateway communications network if the services have been switched over to the standby gateway but still no data of the first in-vehicle communications network is received.

Specifically, if the services have not been switched over to the standby gateway, the active gateway performs redundant network switching; if the switching succeeds, the active gateway keeps alive. If the services have been switched over to the standby network but still no data of the traction & braking network is received, the active gateway monitors the heartbeat packet status of the standby gateway over the active-standby gateway communications network.

S304. If the heartbeat packet of the standby gateway is received normally, the active gateway determines current receiving status of data received by the standby gateway from each network, and performs corresponding processing based on the receiving status of data received from each network.

Specifically, if the heartbeat packet of the standby gateway is received normally, the active gateway determines the current receiving status of data received by the standby gateway from each network. Each different receiving state decides a specific operating state of the active gateway and the standby gateway.

In this example, the active gateway keeps alive if no heartbeat packet of the standby gateway is detected in continuous 500 ms, and if the heartbeat packet of the active gateway is successfully transmitted on the active-standby gateway communications network. If the transmission fails, the active gateway transmits an active gateway heartbeat packet 071:02 01 02 over the comfort network to request the standby gateway to keep alive. The active gateway keeps alive if no response is received from the standby gateway in the comfort network. If a response 072:** 01 00 is received, the active gateway monitors the receiving status of data received by the standby gateway from each network. Each different receiving state decides a specific operating state of the active gateway and the standby gateway.

(1) If it is detected that the data from the three networks is received normally, the active gateway stops operating and requests, over the active-standby gateway communications network, the standby gateway to keep alive.

(2) If it is detected that the receiving of data from only the external network of the compartment is abnormal, the active gateway switches to an abnormity-8 state.

(3) If it is detected that the receiving of data from only the traction & braking network is abnormal, the active gateway stops operating and requests, over the active-standby gateway communications network, the standby gateway to keep alive. The standby gateway goes alive, and attempts to perform redundant network switching and communicate by using a standby network of the traction & braking network. If the switching succeeds, the active gateway stops operating, and transmits an active gateway stop heartbeat packet over the active-standby gateway communications network. If the switching fails, the standby gateway switches to an abnormity-2 state, and requests, over the active-standby gateway communications network, the active gateway to get into the abnormity-2 state.

(4) The active gateway keeps alive if it is detected that the receiving of data from both the external network of the compartment and the traction & braking network, or both the comfort network and the traction & braking network, is abnormal.

(5) If it is detected that the receiving of data from only the comfort network is abnormal, the active gateway requests, over the active-standby gateway communications network, the standby gateway to keep alive. The standby gateway goes alive, and attempts to perform redundant network switching and communicate by using a standby network of the comfort network. If the switching succeeds, the active gateway stops operating, and transmits an active gateway stop heartbeat packet over the active-standby gateway communications network. If the switching fails, the standby gateway switches to an abnormity-3 state, and requests, over the active-standby gateway communications network, the active gateway to get into the abnormity-3 state.

(6) If it is detected that the receiving of data from the external network of the compartment and the comfort network is abnormal, the active gateway switches to an abnormity-4 state, and requests, over the active-standby gateway communications network, the standby gateway to get into the abnormity-4 state.

(7) If it is detected that the receiving of data from all the three networks is abnormal, the active gateway keeps alive.

S305. The active gateway keeps alive if no heartbeat packet of the standby gateway is detected within the preset heartbeat period, and if the heartbeat packet of the active gateway is successfully transmitted on the active-standby gateway communications network.

S306. If the heartbeat packet of the active gateway fails to be transmitted on the active-standby gateway communications network, the active gateway requests, over the second in-vehicle communications network, the standby gateway to keep alive.

S307. The active gateway keeps alive if no response is received from the standby gateway in the second in-vehicle communications network.

S308. If a response is received from the standby gateway on the second in-vehicle communications network, monitor the receiving status of data received by the standby gateway from each network, and perform corresponding processing based on the receiving status of data from each network.

Specifically, the active gateway keeps alive if no heartbeat packet of the standby gateway is detected in continuous 500 ms, and if the heartbeat packet of the active gateway is successfully transmitted on the active-standby gateway communications network. If the transmission fails, the active gateway requests, over the comfort network, the standby gateway to go alive. In this case, the active gateway keeps alive if no response is received from the standby gateway in the comfort network. If a response is received from the standby gateway on the comfort network, the active gateway monitors the receiving status of data received by the standby gateway from each network. Each different receiving state decides a specific operating state of the active gateway and the standby gateway.

(1) If it is detected that the data from all the three networks is received normally, the active gateway stops operating, and transmits an active gateway stop heartbeat packet over the comfort network.

(2) If it is detected that the receiving of data from only the external network of the compartment is abnormal, the active gateway switches to an abnormity-8 state, and requests, over the comfort network, the standby gateway to get into the abnormity-8 state.

(3) If it is detected that the receiving of data from only the traction & braking network is abnormal, the standby gateway keeps alive, and attempts to perform redundant network switching and communicate by using a standby network of the traction & braking network. If the switching succeeds, the active gateway stops operating, and transmits an active gateway stop heartbeat packet over the comfort network. If the switching fails, the standby gateway switches to an abnormity-2 state, and requests, over the comfort network, the active gateway to get into the abnormity-2 state.

(4) If it is detected that the receiving of data from both the external network of the compartment and the traction & braking network is abnormal, the active gateway keeps alive, and requests, over the comfort network, the standby gateway to stop operating.

Figure 7A:
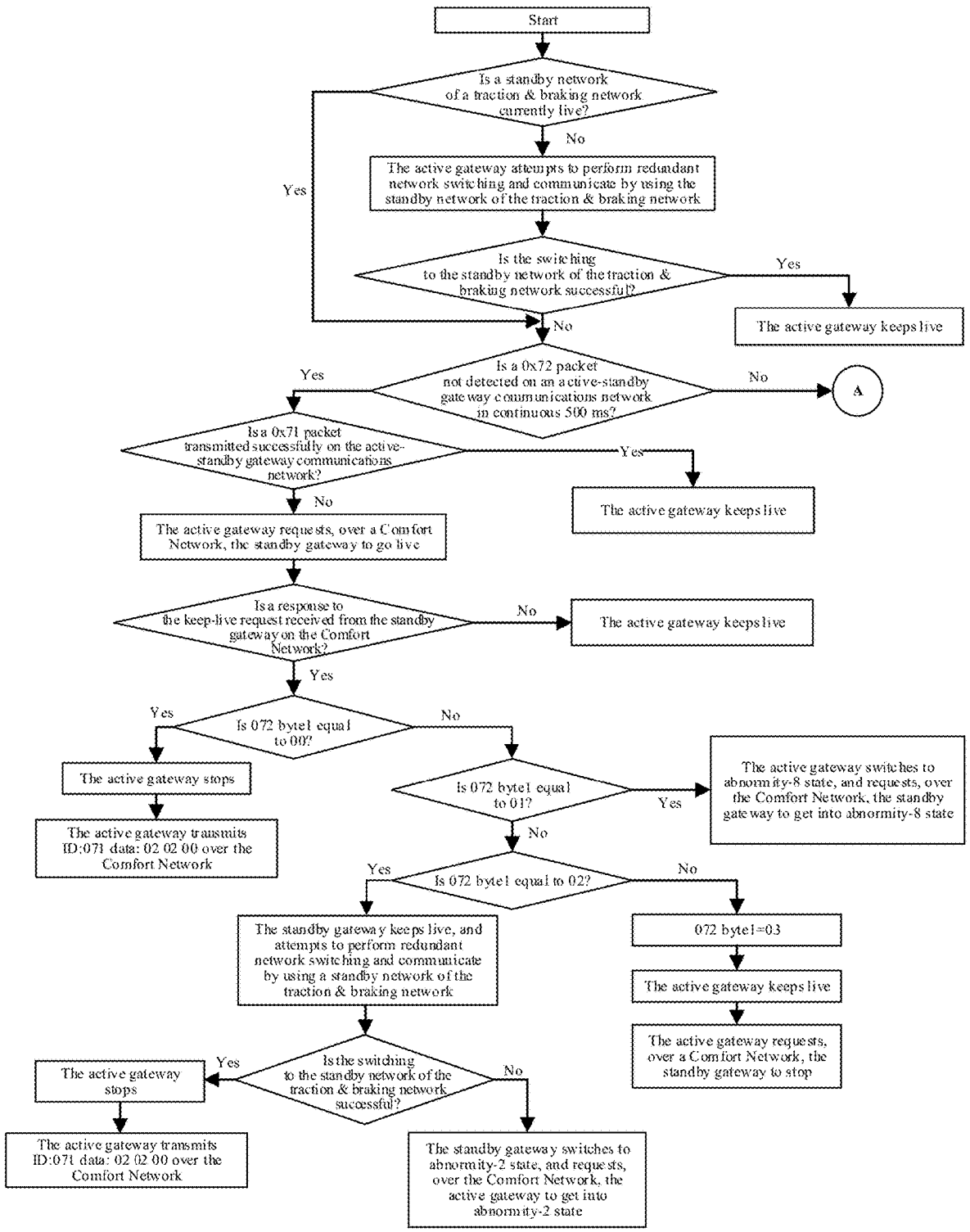
FIG. 7A is a processing flowchart according to an embodiment of the present disclosure where only traction & braking data fails to be received.
Figure 7B:
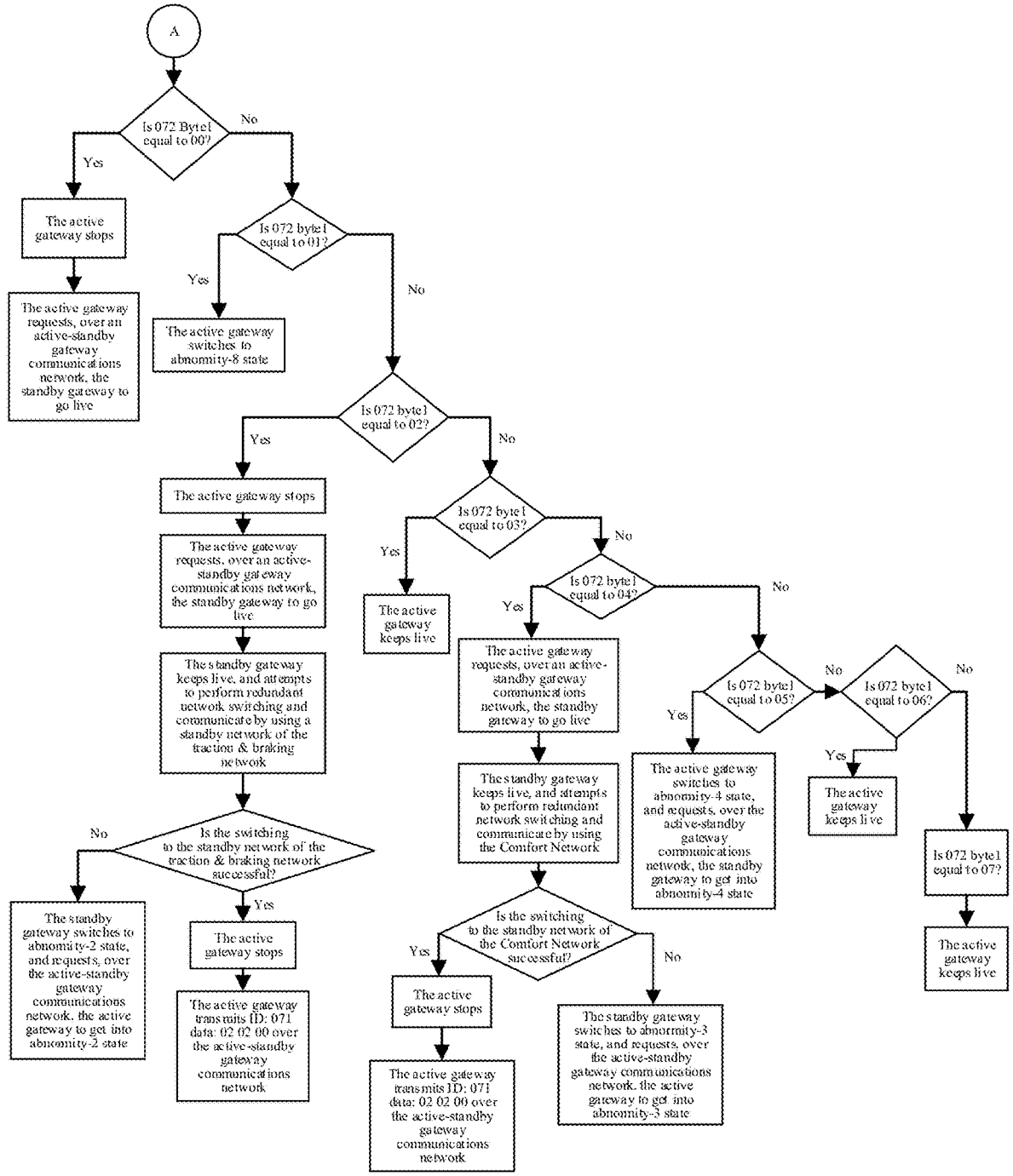
FIG. 7B is a processing flowchart of a branch A in FIG. 7A according to an embodiment of the present disclosure.

In order for a person skilled in the art to better understand an embodiment process in scenario 2, reference may be made to the processing flowchart in FIG. 7A and FIG. 7B in which only the traction & braking data fails to be received, where FIG. 7B is a flowchart of a branch A shown in FIG. 7A.

Figure 8:
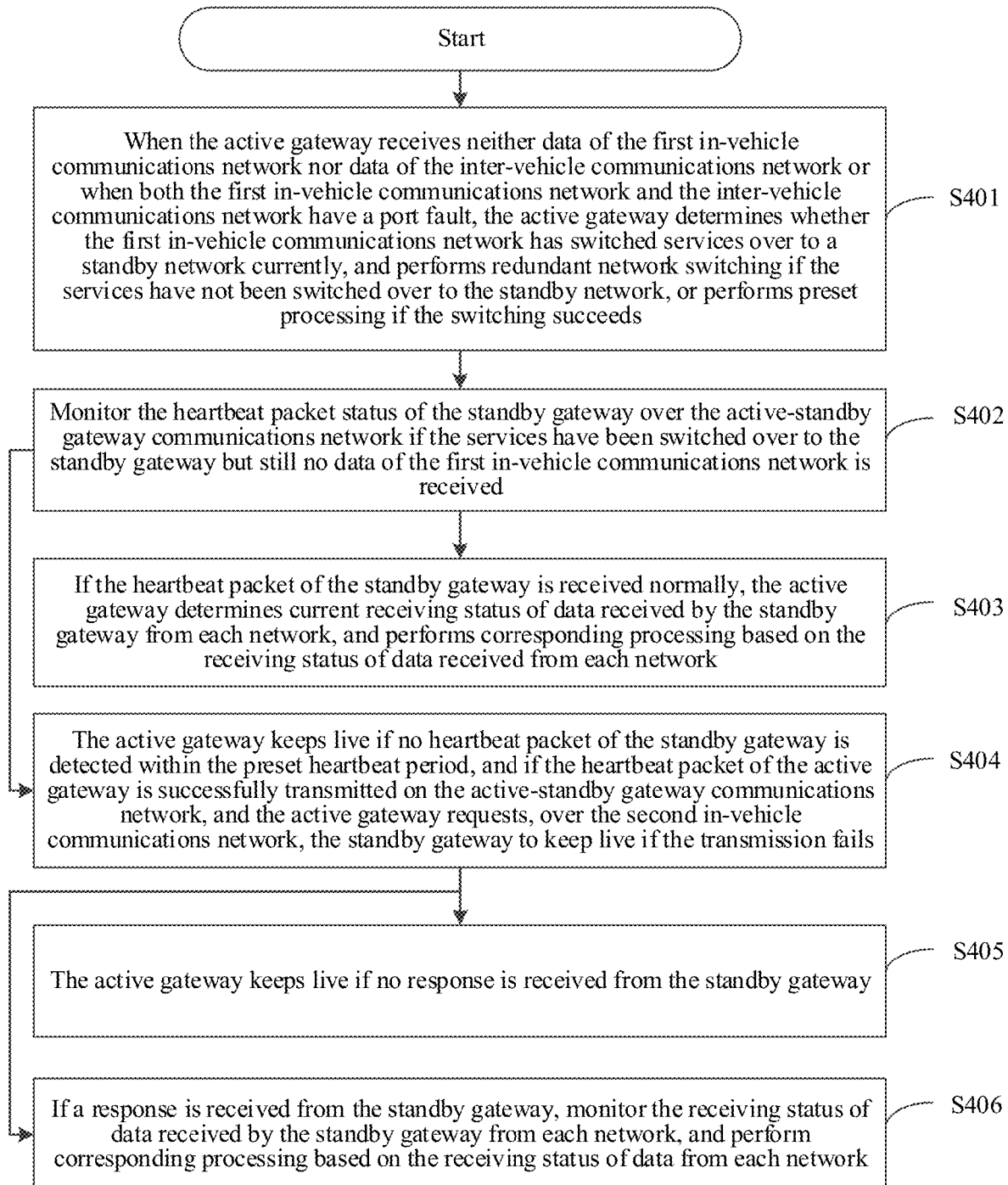
FIG. 8 is a flowchart of a CANopen-based data transmission gateway changeover method according to a fourth embodiment of the present disclosure.

Scenario 3: Data of the inter-vehicle communications network (Ethernet) and the first in-vehicle communications network (traction & braking network) fails to be received (071 byte1=03):

FIG. 8 is a flowchart of a CANopen-based data transmission gateway changeover method according to a fourth embodiment of the present disclosure. As shown in FIG. 8, the method further includes the following steps.

S401. When the active gateway receives neither data of the first in-vehicle communications network nor data of the inter-vehicle communications network or when both the first in-vehicle communications network and the inter-vehicle communications network have a port fault, the active gateway determines whether the first in-vehicle communications network has switched services over to a standby network currently, and performs redundant network switching if the services have not been switched over to the standby network, or performs preset processing if the switching succeeds.

S402. Monitor the heartbeat packet status of the standby gateway over the active-standby gateway communications network if the services have been switched over to the standby gateway but still no data of the first in-vehicle communications network is received.

Specifically, when the active gateway and the standby gateway fail to receive data of both the traction & braking network and the Ethernet or both the traction & braking network and the Ethernet have a port fault, the active gateway first determines whether the traction & braking network has switched services over to a standby network currently. If the services have not been switched over to the standby network, the active gateway performs redundant network switching; if the switching succeeds, the active gateway proceeds to the processing process in FIG. 9B. If the services have been switched over to the standby network but still no data of the traction & braking network is received, the active gateway monitors the heartbeat packet status of the standby gateway over the active-standby gateway communications network.

S403. If the heartbeat packet of the standby gateway is received normally, the active gateway determines current receiving status of data received by the standby gateway from each network, and performs corresponding processing based on the receiving status of data received from each network.

Specifically, if the heartbeat packet of the standby gateway is received normally, the active gateway determines the current receiving status of data received by the standby gateway from each network. Each different receiving state decides a specific operating state of the active gateway and the standby gateway.

(1) If it is detected that the data from the three networks is received normally, or that the receiving of data from only the external network of the compartment or the traction & braking network is abnormal, the active gateway stops operating and requests, over the active-standby gateway communications network, the standby gateway to keep alive.

(2) The active gateway keeps alive if it is detected that the receiving of data from the external network of the compartment and the traction & braking network is abnormal, or that the receiving of data from all the three networks is abnormal.

(3) If it is detected that the receiving of data from only the comfort network is abnormal, the active gateway requests, over the active-standby gateway communications network, the standby gateway to keep alive. The standby gateway goes alive, and attempts to perform redundant network switching and communicate by using a standby network of the comfort network. If the switching succeeds, the active gateway stops operating, and transmits an active gateway stop heartbeat packet over the active-standby gateway communications network. If the switching fails, the standby gateway switches to an abnormity-5 state, and requests, over the active-standby gateway communications network, the active gateway to get into the abnormity-5 state.

(4) If it is detected that the receiving of data from the external network of the compartment and the comfort network is abnormal, the active gateway switches to an abnormity-6 state, and requests, over the active-standby gateway communications network, the standby gateway to get into the abnormity-6 state.

(5) If it is detected that the receiving of data from the traction & braking network and the comfort network is abnormal, the active gateway switches to an abnormity-7 state, and requests, over the active-standby gateway communications network, the standby gateway to get into the abnormity-7 state.

S404. The active gateway keeps alive if no heartbeat packet of the standby gateway is detected within the preset heartbeat period, and if the heartbeat packet of the active gateway is successfully transmitted on the active-standby gateway communications network, and the active gateway requests, over the second in-vehicle communications network, the standby gateway to keep alive if the transmission fails.

S405. The active gateway keeps alive if no response is received from the standby gateway.

S406. If a response is received from the standby gateway, monitor the receiving status of data received by the standby gateway from each network, and perform corresponding processing based on the receiving status of data from each network.

In the embodiment of the present disclosure, the active gateway keeps alive if no heartbeat packet of the standby gateway is detected in continuous 500 ms, for example, and if the heartbeat packet of the active gateway is successfully transmitted on the active-standby gateway communications network. If the transmission fails, the active gateway requests, over the comfort network, the standby gateway to go alive. In this case, the active gateway keeps alive if no response is received from the standby gateway. If a response is received from the standby gateway, the active gateway monitors the receiving status of data received by the standby gateway from each network.

(1) If it is detected that the data from all the three networks is received normally, the active gateway keeps alive, and transmits an active gateway keep-alive heartbeat packet over the comfort network.

(2) If it is detected that the receiving of data from only the external network of the compartment is abnormal, the active gateway keeps alive, and requests, over the comfort network, the standby gateway to stop operating.

(3) If it is detected that the receiving of data from only the traction & braking network is abnormal, the active gateway stops operating and transmits an active gateway stop heartbeat packet over the comfort network. The standby gateway keeps alive, and attempts to perform redundant network switching and communicate by using a standby network of the traction & braking network.

(4) If it is detected that the receiving of data from both the external network of the compartment and the traction & braking network is abnormal, the active gateway keeps alive, and requests, over the comfort network, the standby gateway to stop operating.

Figure 9A:
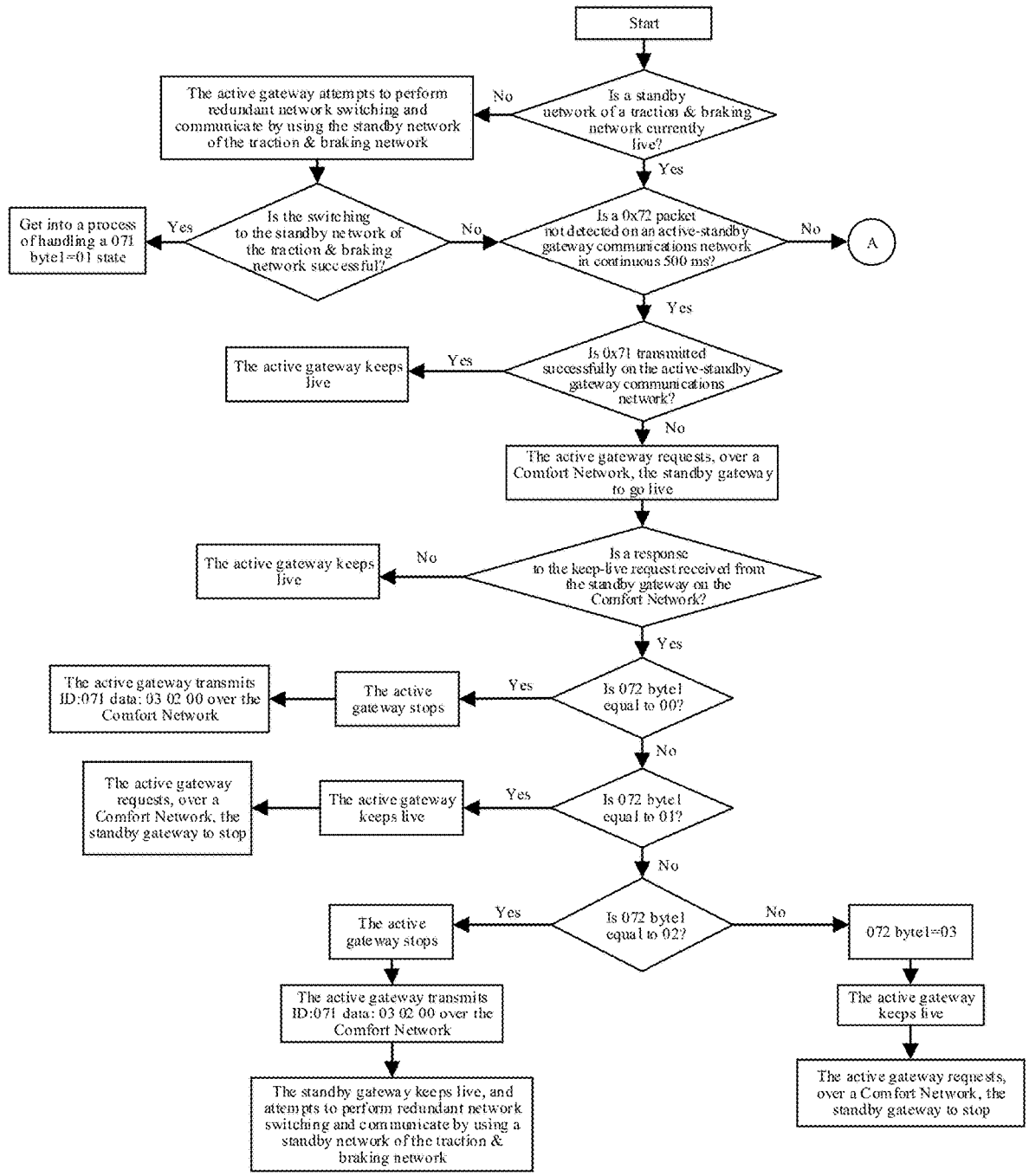
FIG. 9A is a processing flowchart according to an embodiment of the present disclosure where Ethernet data and traction & braking data fail to be received.
Figure 9B:
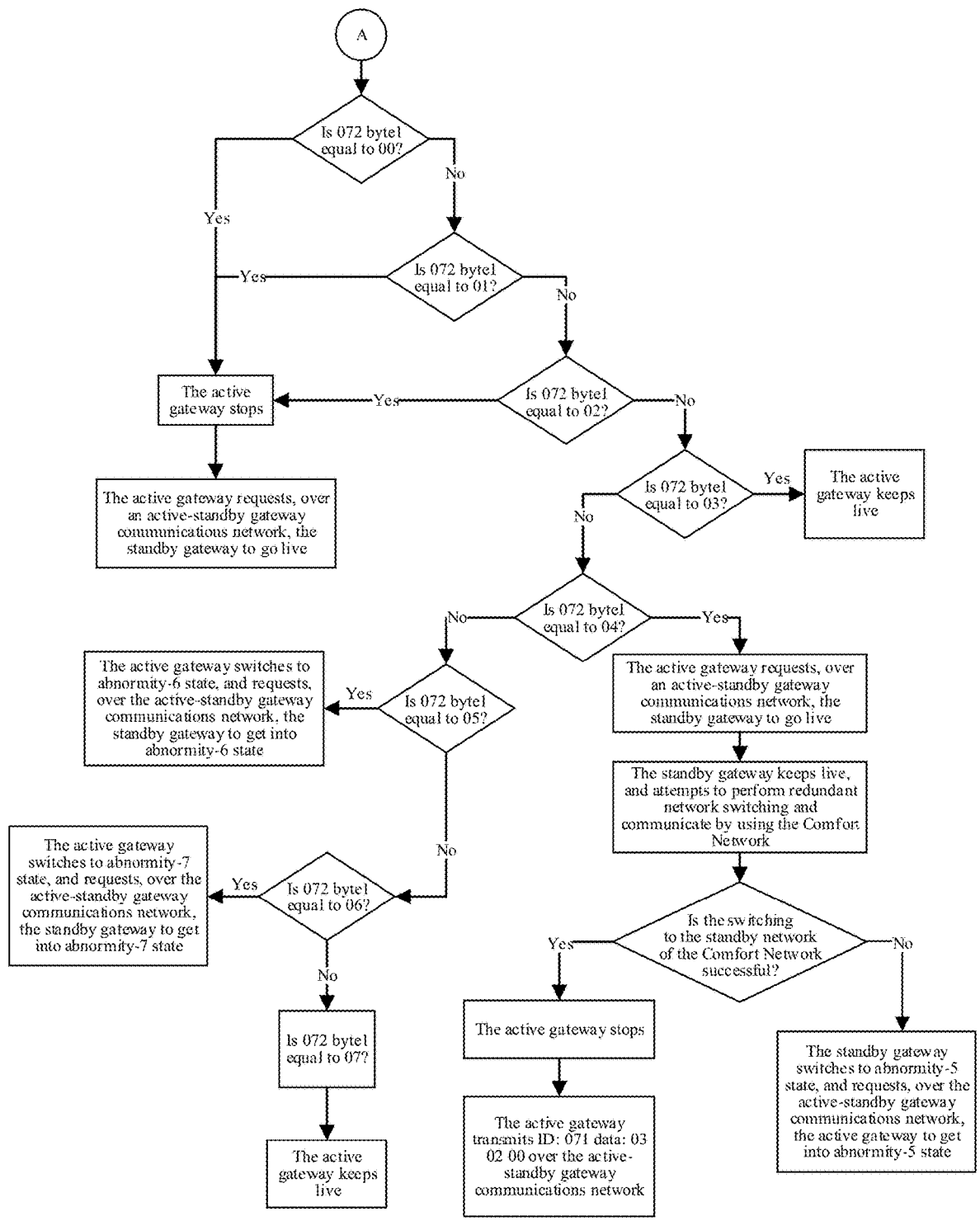
FIG. 9B is a processing flowchart of a branch A in FIG. 9A according to an embodiment of the present disclosure.

In order for a person skilled in the art to better understand an embodiment process in scenario 3, reference may be made to the processing flowchart in FIG. 9A and FIG. 9B in which the Ethernet data and the traction & braking data fail to be received, where FIG. 9B is a flowchart of a branch A shown in FIG. 9A.

Figure 10:
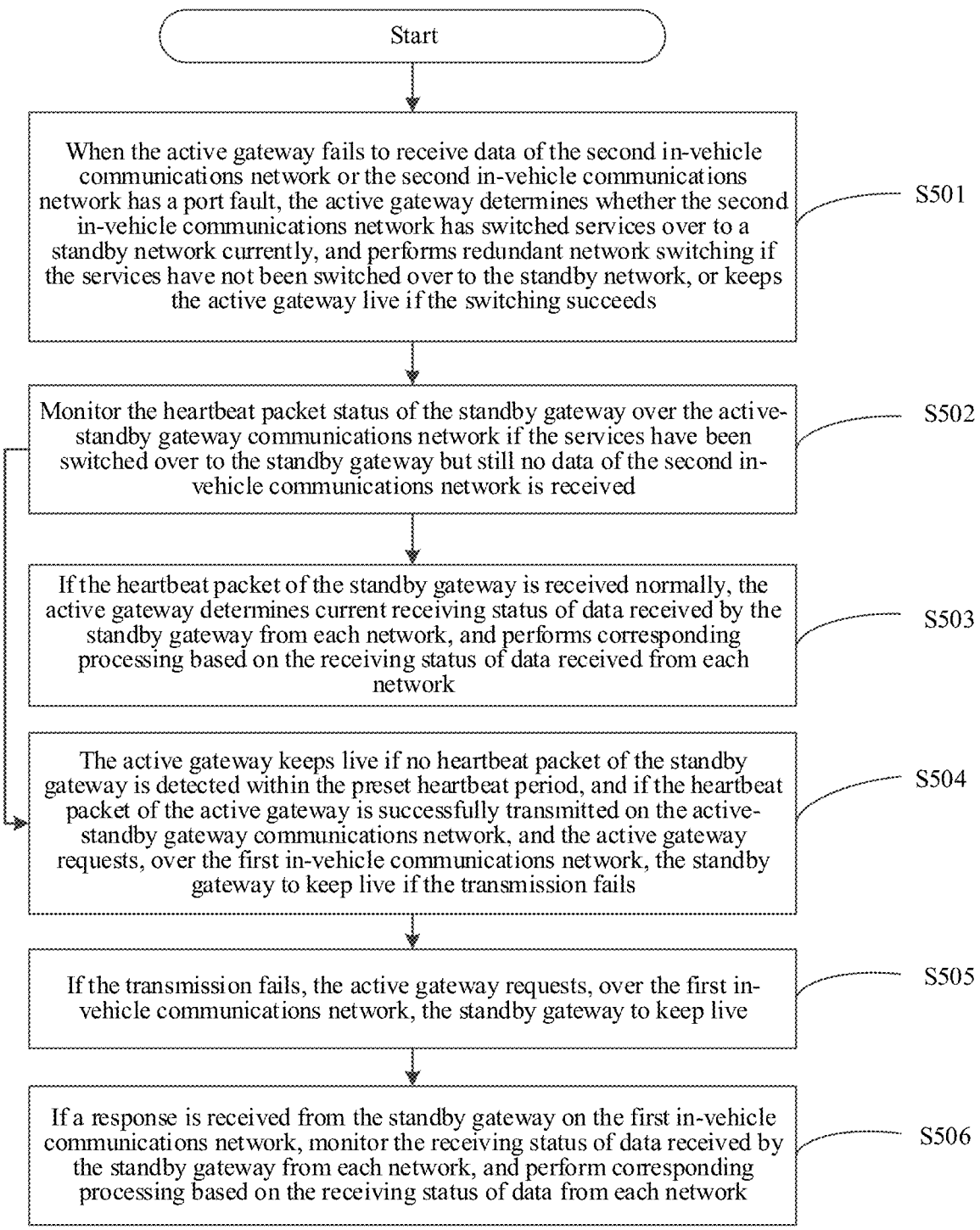
FIG. 10 is a flowchart of a CANopen-based data transmission gateway changeover method according to a fifth embodiment of the present disclosure.

Scenario 4: Only data of the second in-vehicle communications network (comfort network) fails to be received (071 byte1=04):

FIG. 10 is a flowchart of a CANopen-based data transmission gateway changeover method according to a fifth embodiment of the present disclosure. As shown in FIG. 10, the method further includes the following steps.

S501. When the active gateway fails to receive data of the second in-vehicle communications network or the second in-vehicle communications network has a port fault, the active gateway determines whether the second in-vehicle communications network has switched services over to a standby network currently, and performs redundant network switching if the services have not been switched over to the standby network, or keeps the active gateway alive if the switching succeeds.

S502. Monitor the heartbeat packet status of the standby gateway over the active-standby gateway communications network if the services have been switched over to the standby gateway but still no data of the second in-vehicle communications network is received.

S503. If the heartbeat packet of the standby gateway is received normally, the active gateway determines current receiving status of data received by the standby gateway from each network, and performs corresponding processing based on the receiving status of data received from each network.

In this embodiment, when the active gateway fails to receive data of the comfort network or the comfort network has a port fault, the active gateway first determines whether the comfort network has switched services over to a standby network currently. The active gateway performs redundant network switching if the services have not been switched over to the standby network, or keeps alive if the switching succeeds. If the services have been switched over to the standby network of the comfort network but still no data of the comfort network is received, the active gateway monitors the heartbeat packet status of the standby gateway over the active-standby gateway communications network.

If the heartbeat packet of the standby gateway is received normally, the active gateway determines the current receiving status of data received by the standby gateway from each network. Each different receiving state decides a specific operating state of the active gateway and the standby gateway.

(1) If it is detected that the data from all the three networks is received normally, the active gateway stops operating and requests, over the active-standby gateway communications network, the standby gateway to keep alive.

(2) If it is detected that the receiving of data from only the external network of the compartment is abnormal, the active gateway switches to an abnormity-9 state, and requests, over the active-standby gateway communications network, the standby gateway to get into the abnormity-9 state.

(3) If it is detected that the receiving of data from only the traction & braking network is abnormal, the active gateway switches to an abnormity-10 state, and requests, over the active-standby gateway communications network, the standby gateway to get into the abnormity-10 state.

(4) If it is detected that the receiving of data from the external network of the compartment and the traction & braking network is abnormal, the active gateway switches to an abnormity-11 state, and requests, over the active-standby gateway communications network, the standby gateway to get into the abnormity-11 state.

(5) If it is detected that the receiving of data from only the comfort network is abnormal, the active gateway stops operating and requests, over the active-standby gateway communications network, the standby gateway to keep alive. The standby gateway goes alive, and attempts to perform redundant network switching. If the switching succeeds, the active gateway transmits an active gateway stop heartbeat packet over the active-standby gateway communications network, and stops operating. If the switching fails, the standby gateway switches to a stop state, and transmits a standby gateway stop heartbeat packet over the active-standby gateway communications network.

(6) The active gateway keeps alive if it is detected that the receiving of data from both the external network of the compartment and the comfort network, or both the traction & braking network and the comfort network, or all the three networks, is abnormal.

S504. The active gateway keeps alive if no heartbeat packet of the standby gateway is detected within the preset heartbeat period, and if the heartbeat packet of the active gateway is successfully transmitted on the active-standby gateway communications network.

S505. If the transmission fails, the active gateway requests, over the first in-vehicle communications network, the standby gateway to keep alive.

S506. If a response is received from the standby gateway on the first in-vehicle communications network, monitor the receiving status of data received by the standby gateway from each network, and perform corresponding processing based on the receiving status of data from each network.

In this embodiment, the active gateway keeps alive if no heartbeat packet of the standby gateway is detected in continuous 500 ms, and if the heartbeat packet of the active gateway is successfully transmitted on the active-standby gateway communications network. If the transmission fails, the active gateway requests, over the traction & braking network, the standby gateway to keep alive. If a response to the keep-alive request is received from the standby gateway on the traction & braking network, the active gateway monitors the receiving status of data received by the standby gateway from each network.

(1) If it is detected that the data from all the three networks is received normally, the active gateway stops operating, and transmits an active gateway stop heartbeat packet over the comfort network.

(2) If it is detected that the receiving of data from only the external network of the compartment is abnormal, the active gateway switches to an abnormity-9 state, and requests, over the traction & braking network, the standby gateway to get into the abnormity-9 state.

(3) If it is detected that the receiving of data from only the comfort network is abnormal, the active gateway transmits an active gateway stop heartbeat packet over the comfort network, and determines whether services are successfully switched over to a standby network of the comfort network. If the services are successfully switched over to the standby network, the active gateway stops operating, and transmits an active gateway stop heartbeat packet over the traction & braking network. If the switching fails, the standby gateway switches to a stop state, and requests, over the traction & braking network, the active gateway to keep alive.

(4) If it is detected that the receiving of data from the external network of the compartment and the comfort network is abnormal, the active gateway keeps alive, and requests, over the comfort network, the standby gateway to stop operating.

By contrast, in the prior art, a switchover between an active gateway and a standby gateway is implemented depending only on whether a heartbeat packet of the active gateway is dropped, and when detecting a fault of its network, the active gateway stops transmitting the heartbeat packet. The standby gateway starts working when it fails to receive the heartbeat packet of the active gateway. However, if both the active gateway and the standby gateway have a network abnormality, the switching from the active gateway to the standby gateway alone can hardly maintain normal network communication, and operation of the entire train is affected.

Figure 11A:
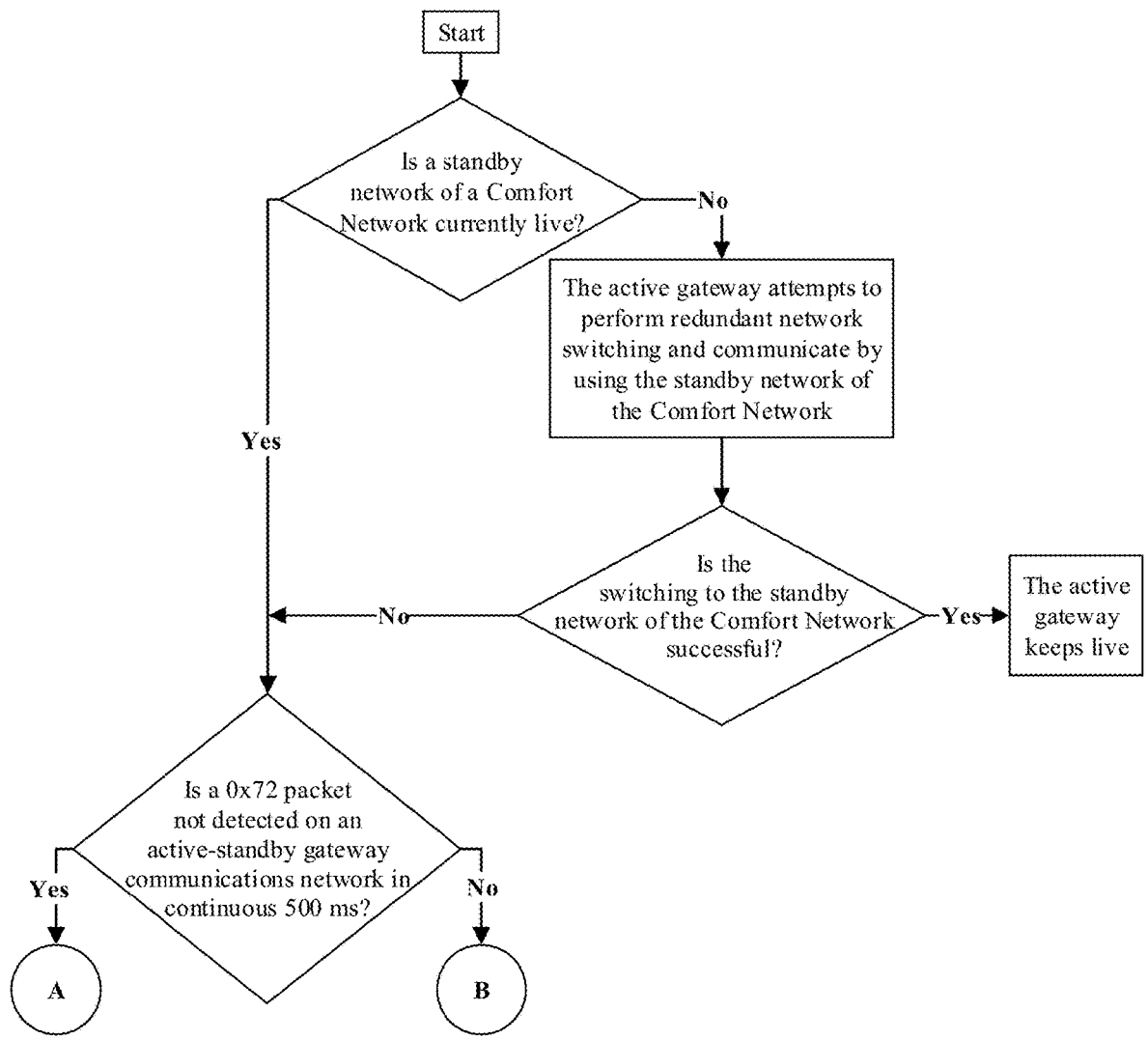
FIG. 11A is a processing flowchart according to an embodiment of the present disclosure where only comfort network data fails to be received.
Figure 11B:
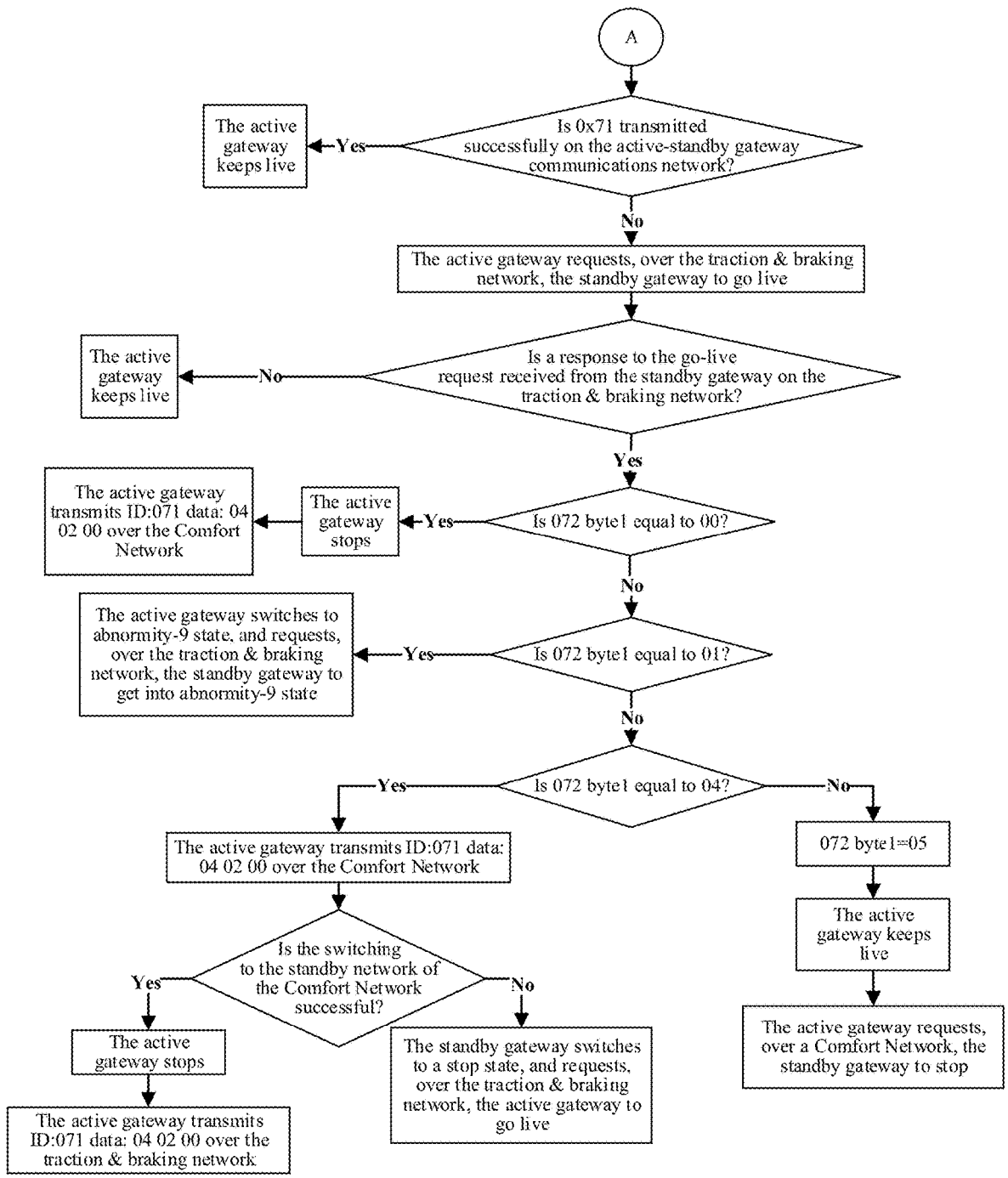
FIG. 11B is a processing flowchart of a branch A in FIG. 11A according to an embodiment of the present disclosure.
Figure 11C:
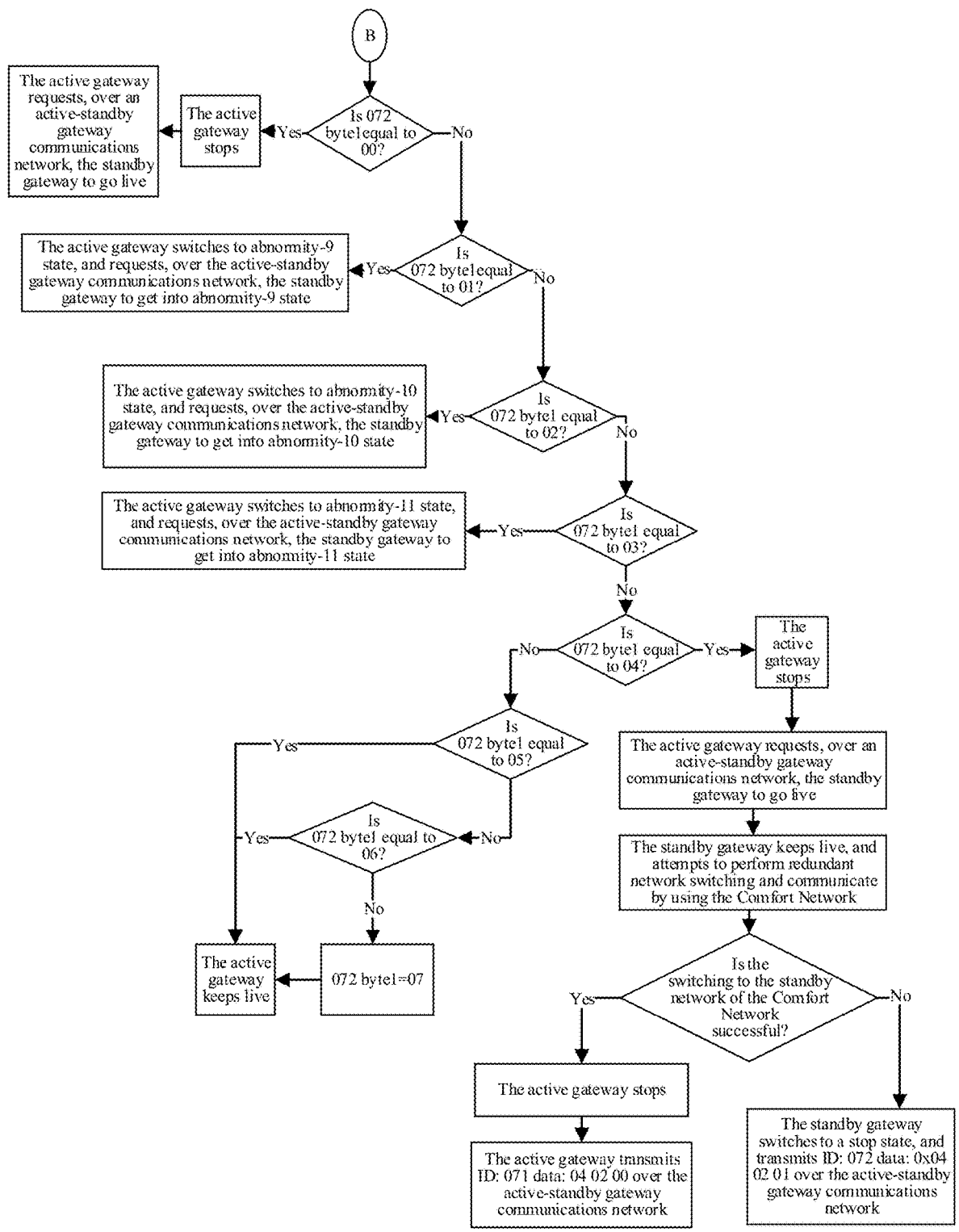
FIG. 11C is a processing flowchart of a branch B in FIG. 11A according to an embodiment of the present disclosure.

In order for a person skilled in the art to better understand an embodiment process in scenario 4, reference may be made to the processing flowchart in FIG. 11A, FIG. 11B, and FIG. 11C in which only the comfort network data fails to be received, where FIG. 11B is a flowchart of a branch A shown in FIG. 11A, and FIG. 11C is a flowchart of a branch B shown in FIG. 11A.

Figure 12:
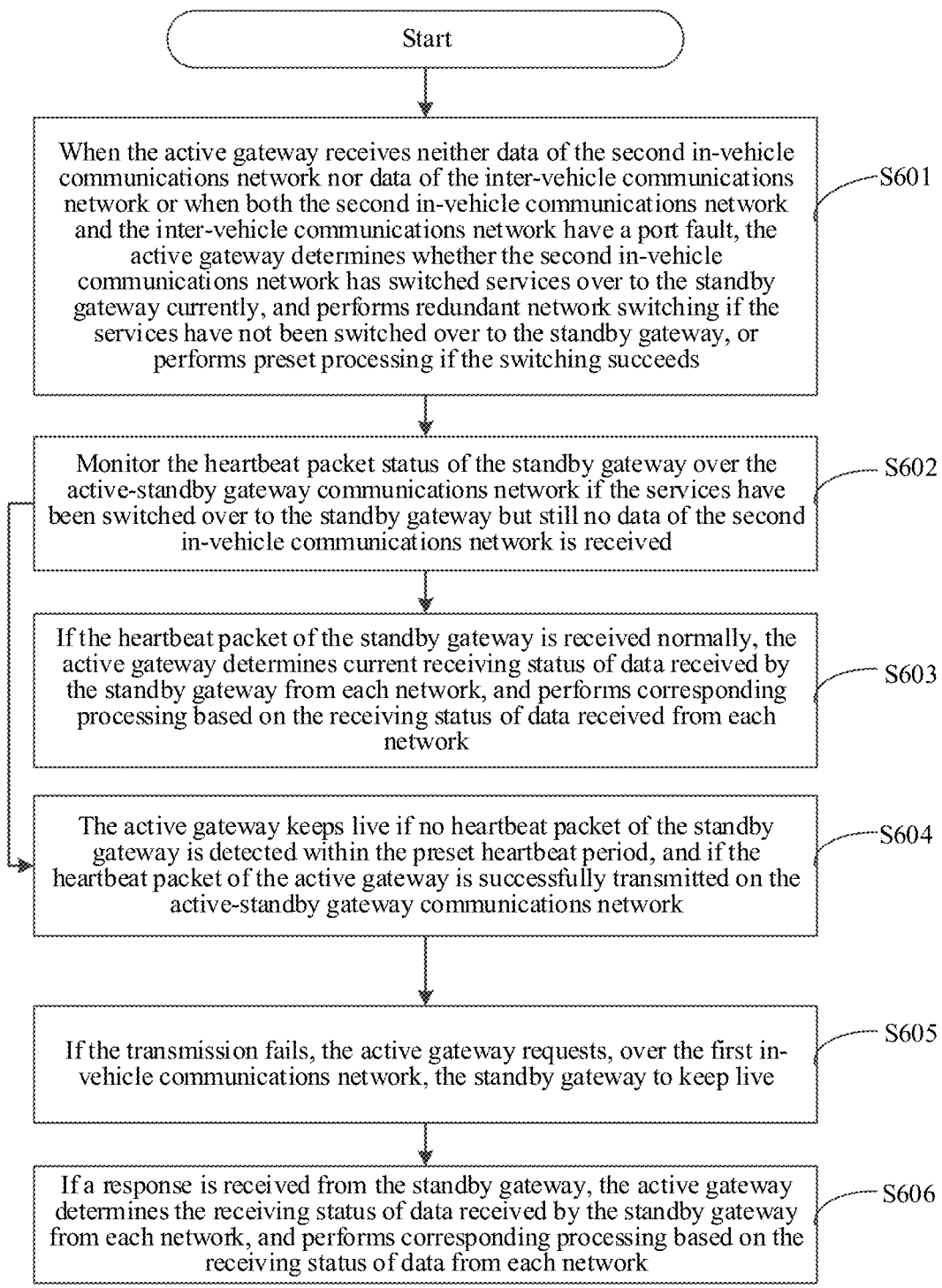
FIG. 12 is a flowchart of a CANopen-based data transmission gateway changeover method according to a sixth embodiment of the present disclosure.

Scenario 5: Data of the inter-vehicle communications network (Ethernet) and the second in-vehicle communications network (comfort network) fails to be received (071 byte1=05):

FIG. 12 is a flowchart of a CANopen-based data transmission gateway changeover method according to a sixth embodiment of the present disclosure. As shown in FIG. 12, the method further includes the following steps.

S601. When the active gateway receives neither data of the second in-vehicle communications network nor data of the inter-vehicle communications network or when both the second in-vehicle communications network and the inter-vehicle communications network have a port fault, the active gateway determines whether the second in-vehicle communications network has switched services over to the standby gateway currently, and performs redundant network switching if the services have not been switched over to the standby gateway, or performs preset processing if the switching succeeds.

S602. Monitor the heartbeat packet status of the standby gateway over the active-standby gateway communications network if the services have been switched over to the standby gateway but still no data of the second in-vehicle communications network is received.

S603. If the heartbeat packet of the standby gateway is received normally, the active gateway determines current receiving status of data received by the standby gateway from each network, and performs corresponding processing based on the receiving status of data received from each network.

Specifically, in this embodiment, when the active gateway fails to receive data of both the comfort network and the Ethernet or the comfort network and the Ethernet have a port fault, the active gateway first determines whether the comfort network has switched services over to a standby network currently. The active gateway performs redundant network switching if the services have not been switched over to the standby network, or proceeds to the processing process in FIG. 13B or FIG. 13C if the switching succeeds. If the services have been switched over to the standby network of the comfort network but still no data of the comfort network is received, the active gateway monitors the heartbeat packet status of the standby gateway over the active-standby gateway communications network.

If the heartbeat packet of the standby gateway is received normally, the active gateway determines the current receiving status of data received by the standby gateway from each network. Each different receiving state decides a specific operating state of the active gateway and the standby gateway.

S604. The active gateway keeps alive if no heartbeat packet of the standby gateway is detected within the preset heartbeat period, and if the heartbeat packet of the active gateway is successfully transmitted on the active-standby gateway communications network.

S605. If the transmission fails, the active gateway requests, over the first in-vehicle communications network, the standby gateway to keep alive.

S606. If a response is received from the standby gateway, the active gateway determines the receiving status of data received by the standby gateway from each network, and performs corresponding processing based on the receiving status of data from each network.

For example, the active gateway keeps alive if no heartbeat packet of the standby gateway is detected in continuous 500 ms, and if the heartbeat packet of the active gateway is successfully transmitted on the active-standby gateway communications network. If the transmission fails, the active gateway requests, over the traction & braking network, the standby gateway to keep alive. If a response to the keep-alive request is received from the standby gateway, the active gateway monitors status of each network of the standby gateway.

(1) If it is detected that the receiving of data from the three networks is abnormal, or that the receiving of data from only the external network of the compartment is abnormal, the active gateway stops operating, and transmits an active gateway stop heartbeat packet over the traction & braking network.

(2) If it is detected that the receiving of data from only the comfort network is abnormal, the active gateway stops operating and transmits an active gateway stop heartbeat packet over the traction & braking network. The standby gateway keeps alive, and attempts to perform redundant network switching and communicate by using a standby network of the comfort network.

(3) If it is detected that the receiving of data from the external network of the compartment and the comfort network is abnormal, the active gateway keeps alive, and requests, over the traction & braking network, the standby gateway to stop operating.

Figure 13A:
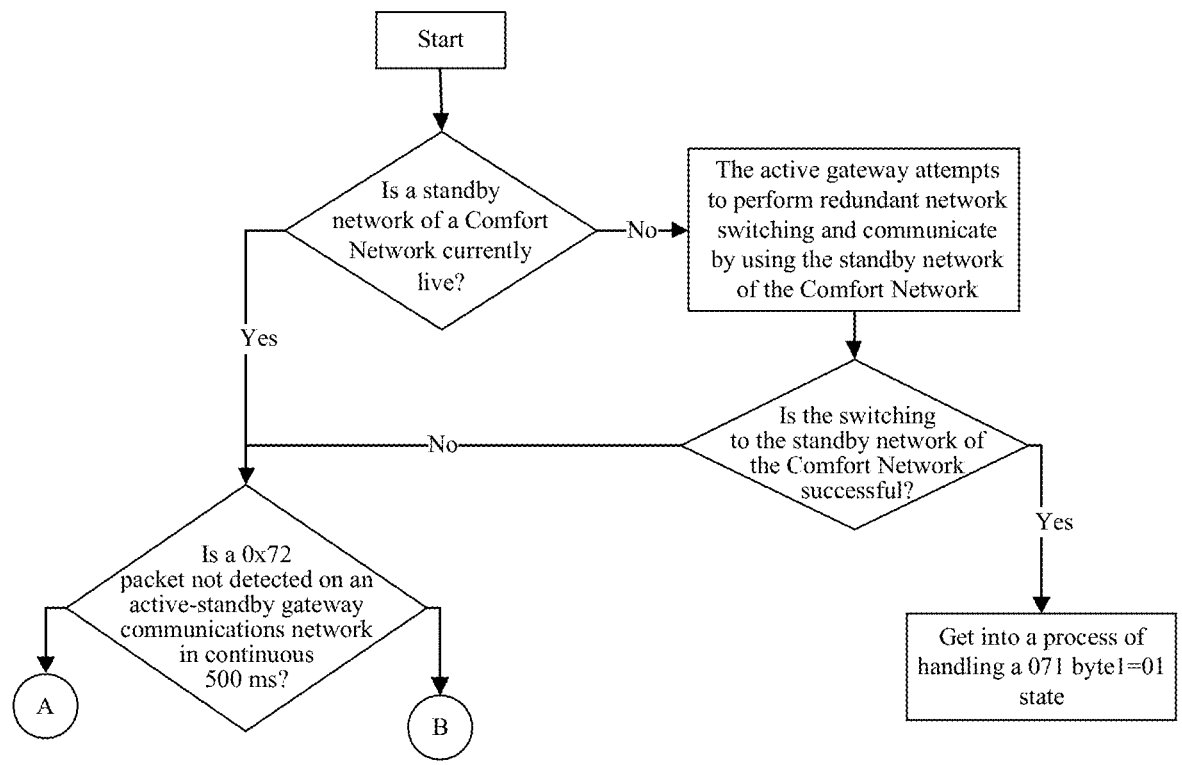
FIG. 13A is a processing flowchart according to an embodiment of the present disclosure where Ethernet data and comfort network data fail to be received.
Figure 13B:
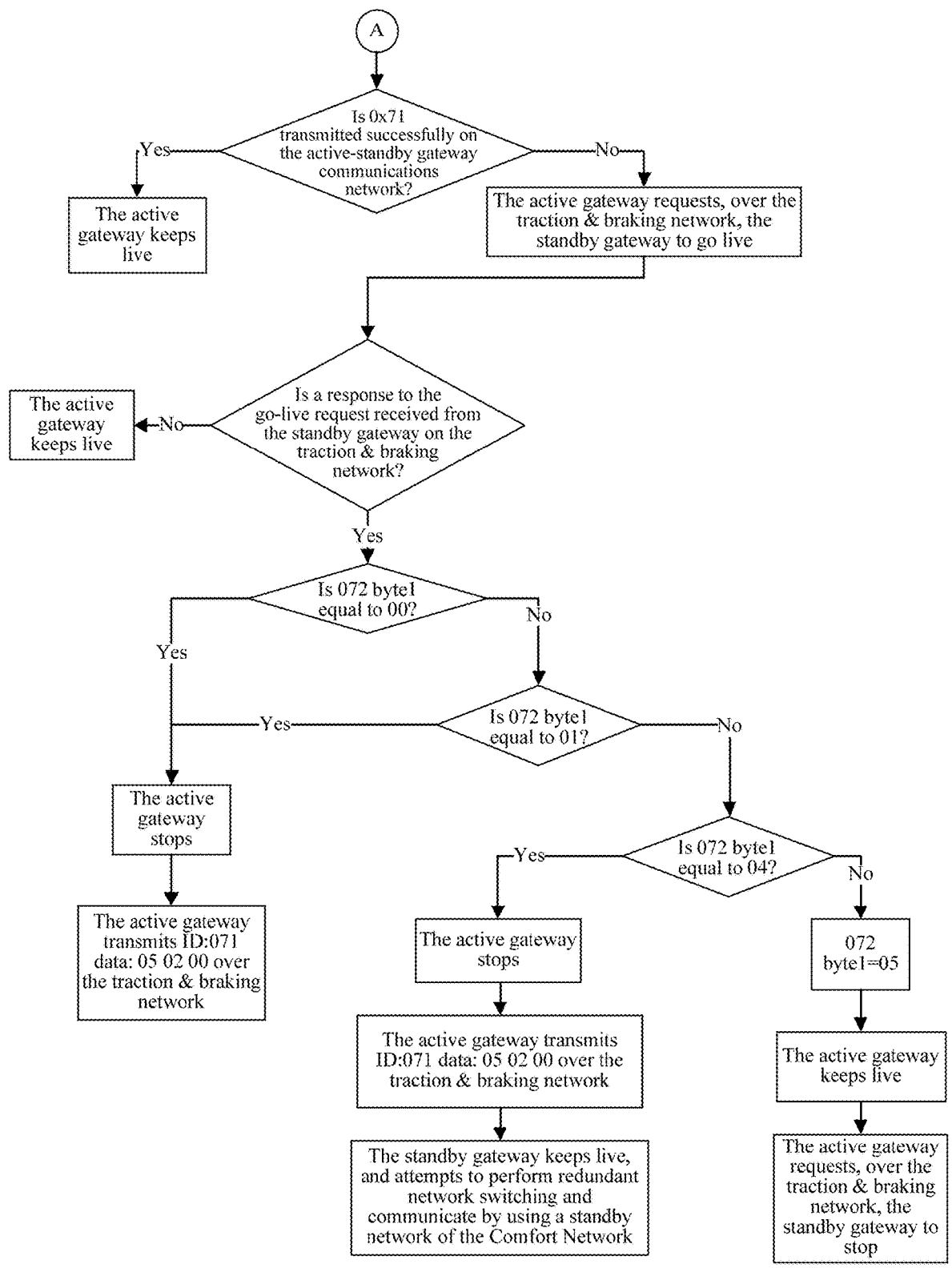
FIG. 13B is a processing flowchart of a branch A in FIG. 13A according to an embodiment of the present disclosure.
Figure 13C:
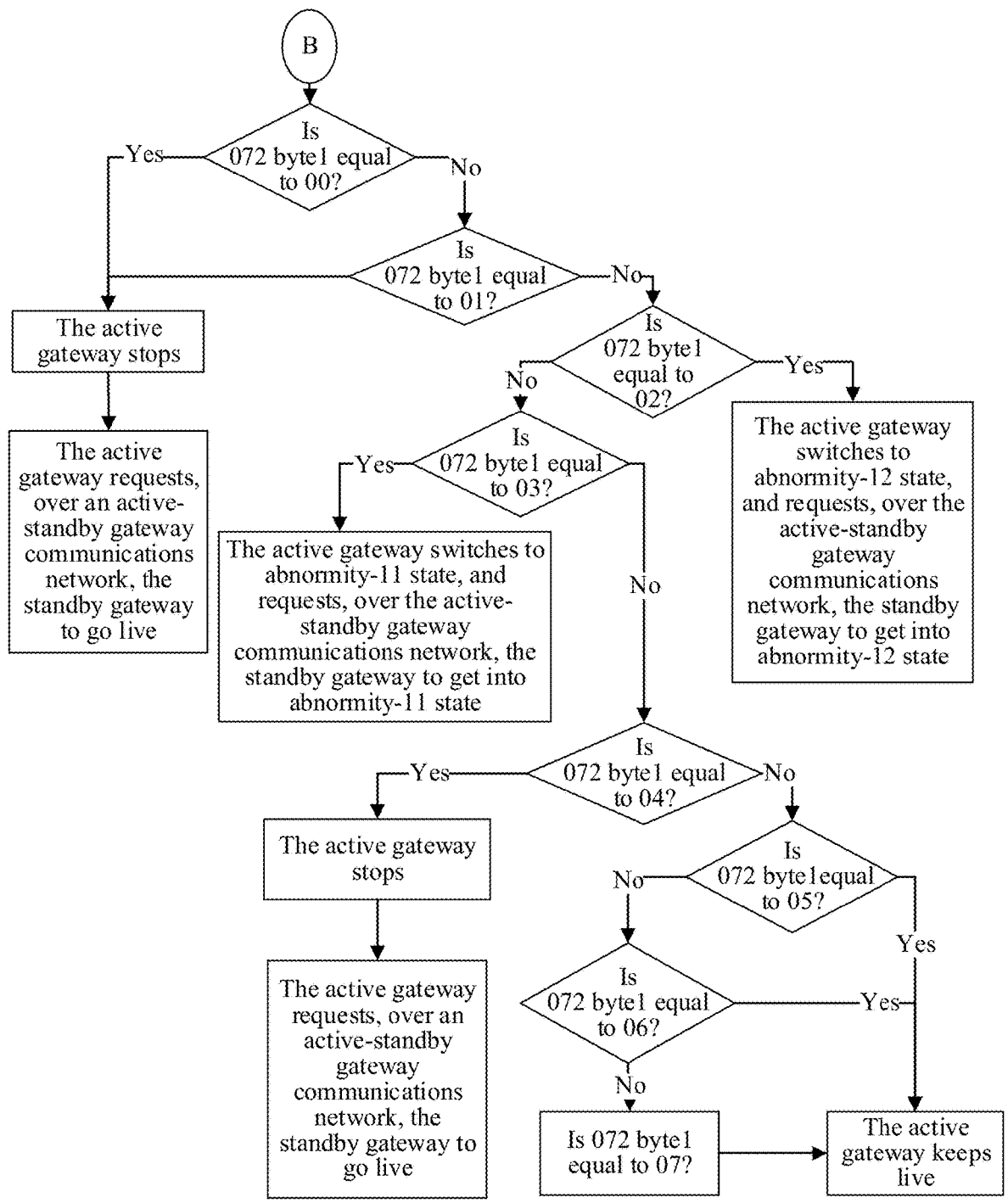
FIG. 13C is a processing flowchart of a branch B in FIG. 13A according to an embodiment of the present disclosure.

In order for a person skilled in the art to better understand an embodiment process in scenario 5, reference may be made to the processing flowchart in FIG. 13A, FIG. 13B, and FIG. 13C in which the Ethernet data and the comfort network data fail to be received, where FIG. 13B is a flowchart of a branch A shown in FIG. 13A, and FIG. 13C is a flowchart of a branch B shown in FIG. 13A.

Figure 14:
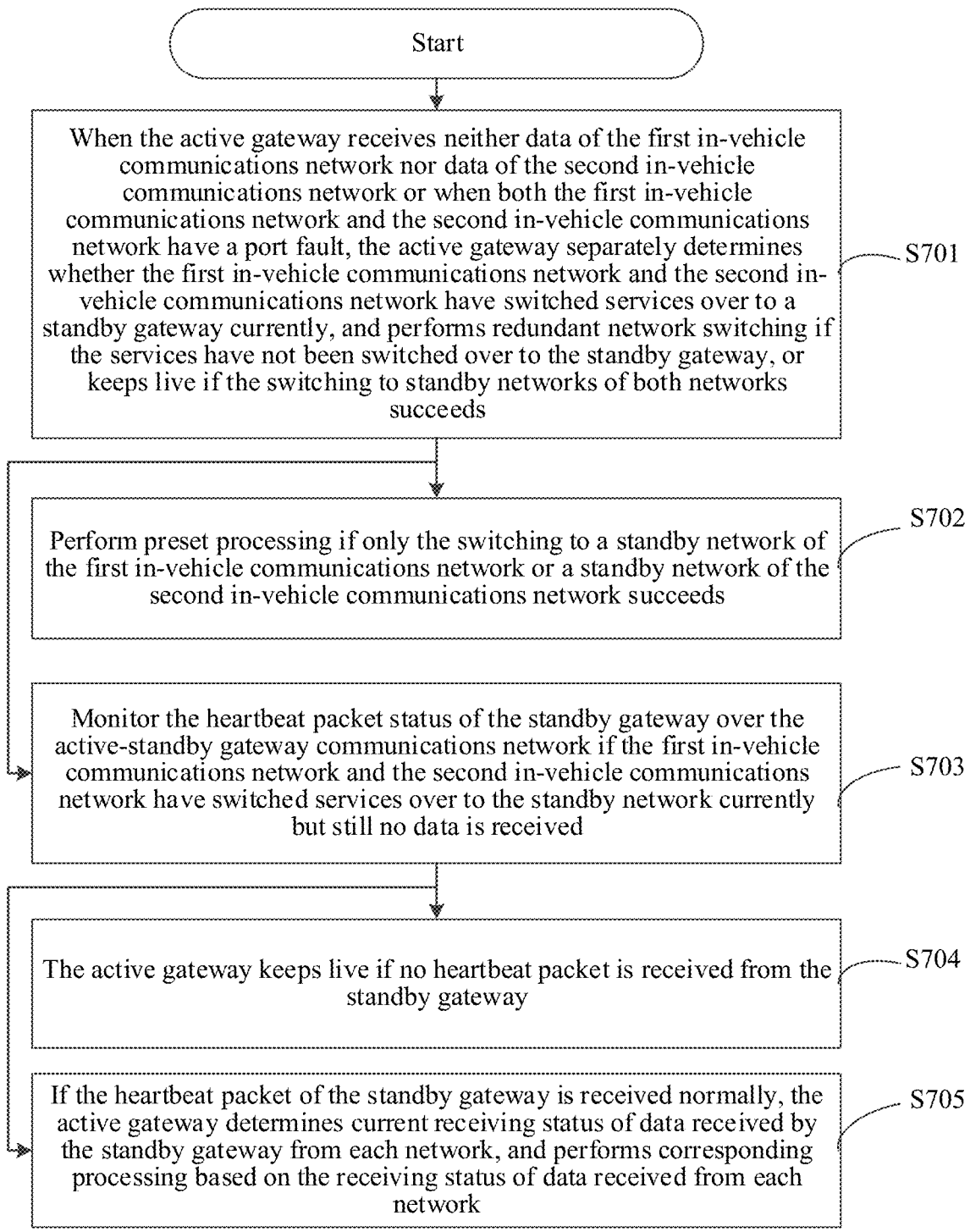
FIG. 14 is a flowchart of a CANopen-based data transmission gateway changeover method according to a seventh embodiment of the present disclosure.

Scenario 6: Data of the first in-vehicle communications network (traction & braking network) and the second in-vehicle communications network (comfort network) fails to be received (071 byte1=06):

FIG. 14 is a flowchart of a CANopen-based data transmission gateway changeover method according to a seventh embodiment of the present disclosure. As shown in FIG. 14, the method further includes the following steps.

S701. When the active gateway receives neither data of the first in-vehicle communications network nor data of the second in-vehicle communications network or when both the first in-vehicle communications network and the second in-vehicle communications network have a port fault, the active gateway separately determines whether the first in-vehicle communications network and the second in-vehicle communications network have switched services over to their standby gateways currently, and performs redundant network switching if the services have not been switched over to the standby gateways, or keeps alive if the services of both networks have been switched successfully.

S702. Perform preset processing if only the switching to the standby network of the first in-vehicle communications network or the standby network of the second in-vehicle communications network succeeds.

S703. Monitor the heartbeat packet status of the standby gateway over the active-standby gateway communications network if both the first in-vehicle communications network and the second in-vehicle communications network have switched services over to their standby networks currently but still no data is received.

S704. The active gateway keeps alive if no heartbeat packet is received from the standby gateway.

S705. If the heartbeat packet is received from the standby gateway normally, the active gateway determines current receiving status of data received by the standby gateway from each network, and performs corresponding processing based on the receiving status of data received from each network.

Specifically, when the active gateway fails to receive data of both the traction & braking network and the comfort network, or when both the traction & braking network and the comfort network have a port fault, the active gateway first determines separately whether the traction & braking network and the comfort network have switched services over to their standby networks currently. The active gateway performs redundant network switching if the services have not been switched over to either of standby networks, or keeps alive if the switching to the standby networks of both networks succeeds. If only the switching to the standby network of the traction & braking network succeeds, the active gateway proceeds to the processing process shown in FIG. 15C. If only the switching to the standby network of the comfort network succeeds, the active gateway proceeds to the processing process shown in FIG. 15B. If the switching to both the standby network of the traction & braking network and the standby network of the comfort network succeeds but still no data is received, the active gateway monitors the heartbeat packet status of the standby gateway over the active-standby gateway communications network.

In this way, if no heartbeat packet is received from the standby gateway, the active gateway keeps alive. If a heartbeat packet is received from the standby gateway normally, the active gateway determines the current receiving status of data received by the standby gateway from each network. Each different receiving state decides a specific operating state of the active gateway and the standby gateway.

(1) If it is detected that the data from all the three networks is received normally, the active gateway stops operating and requests, over the active-standby gateway communications network, the standby gateway to go alive.

(2) If it is detected that the receiving of data from only the external network of the compartment is abnormal, the active gateway switches to an abnormity-13 state, and requests, over the active-standby gateway communications network, the standby gateway to get into the abnormity-13 state.

(3) If it is detected that the receiving of data from only the traction & braking network is abnormal, the active gateway requests, over the active-standby gateway communications network, the standby gateway to keep alive.

(4) If it is detected that the receiving of data from the external network of the compartment and the traction & braking network is abnormal, the active gateway switches to an abnormity-14 state, and requests, over the active-standby gateway communications network, the standby gateway to get into the abnormity-14 state.

(5) If it is detected that the receiving of data from only the comfort network is abnormal, the active gateway requests, over the active-standby gateway communications network, the standby gateway to keep alive. The standby gateway goes alive, and attempts to perform redundant network switching and communicate by using a standby network of the comfort network.

(6) If it is detected that the receiving of data from the external network of the compartment and the comfort network is abnormal, the active gateway switches to an abnormity-15 state, and requests, over the active-standby gateway communications network, the standby gateway to get into the abnormity-15 state.

(7) If it is detected that the receiving of data from the traction & braking network and the comfort network, or from all the three networks, is abnormal, the active gateway keeps alive.

Figure 15A:
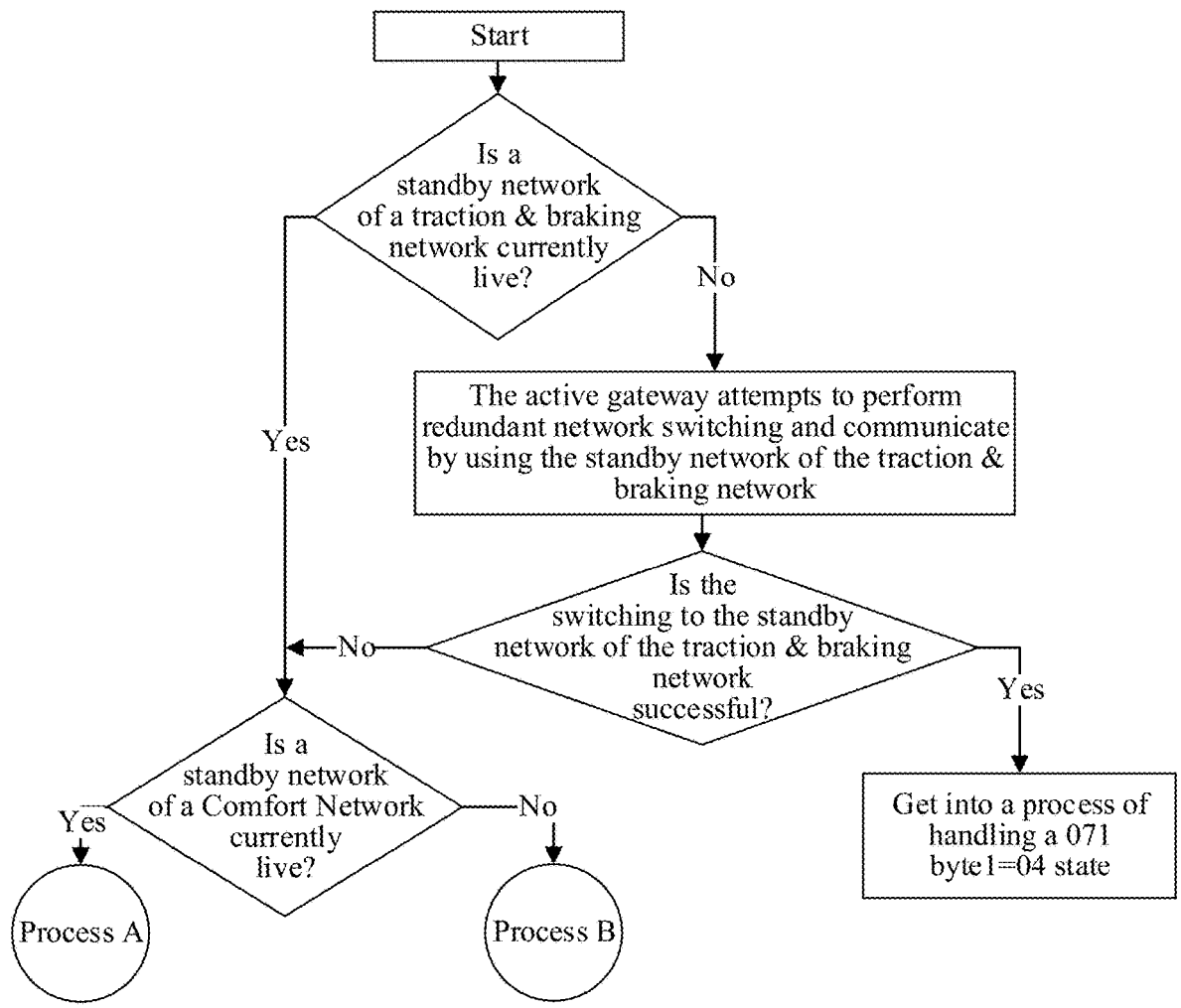
FIG. 15A is a processing flowchart according to an embodiment of the present disclosure where traction & braking network data and comfort network data fail to be received.
Figure 15B:
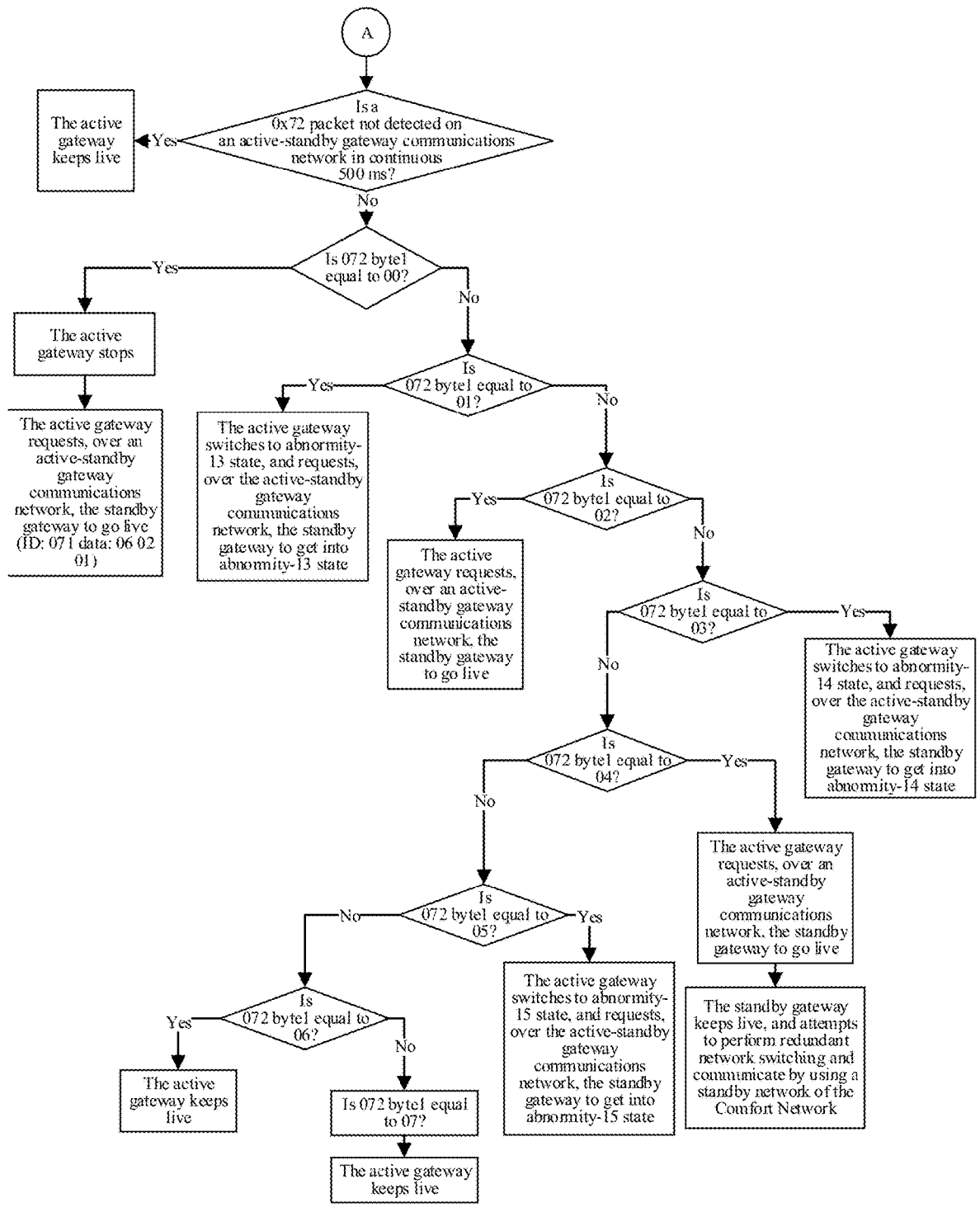
FIG. 15B is a processing flowchart of a branch A in FIG. 15A according to an embodiment of the present disclosure.
Figure 15C:
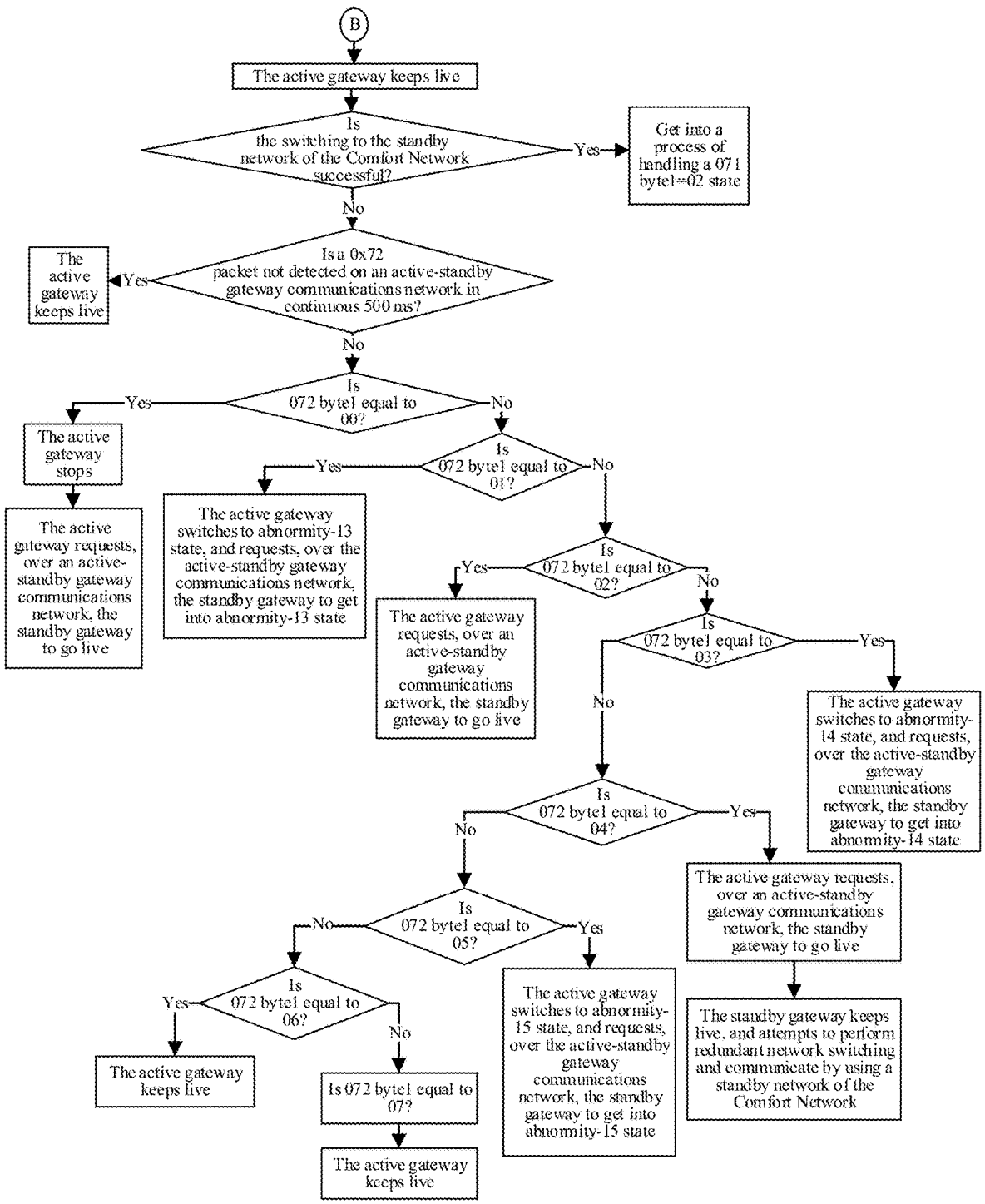
FIG. 15C is a processing flowchart of a branch B in FIG. 15A according to an embodiment of the present disclosure.

In order for a person skilled in the art to better understand an embodiment process in scenario 6, reference may be made to the processing flowchart in FIG. 15A, FIG. 15B, and FIG. 15C in which the traction & braking network data and the comfort network data fail to be received, where FIG. 15B is a flowchart of a branch A shown in FIG. 15A, and FIG. 15C is a flowchart of a branch B shown in FIG. 15A.

Figure 16:
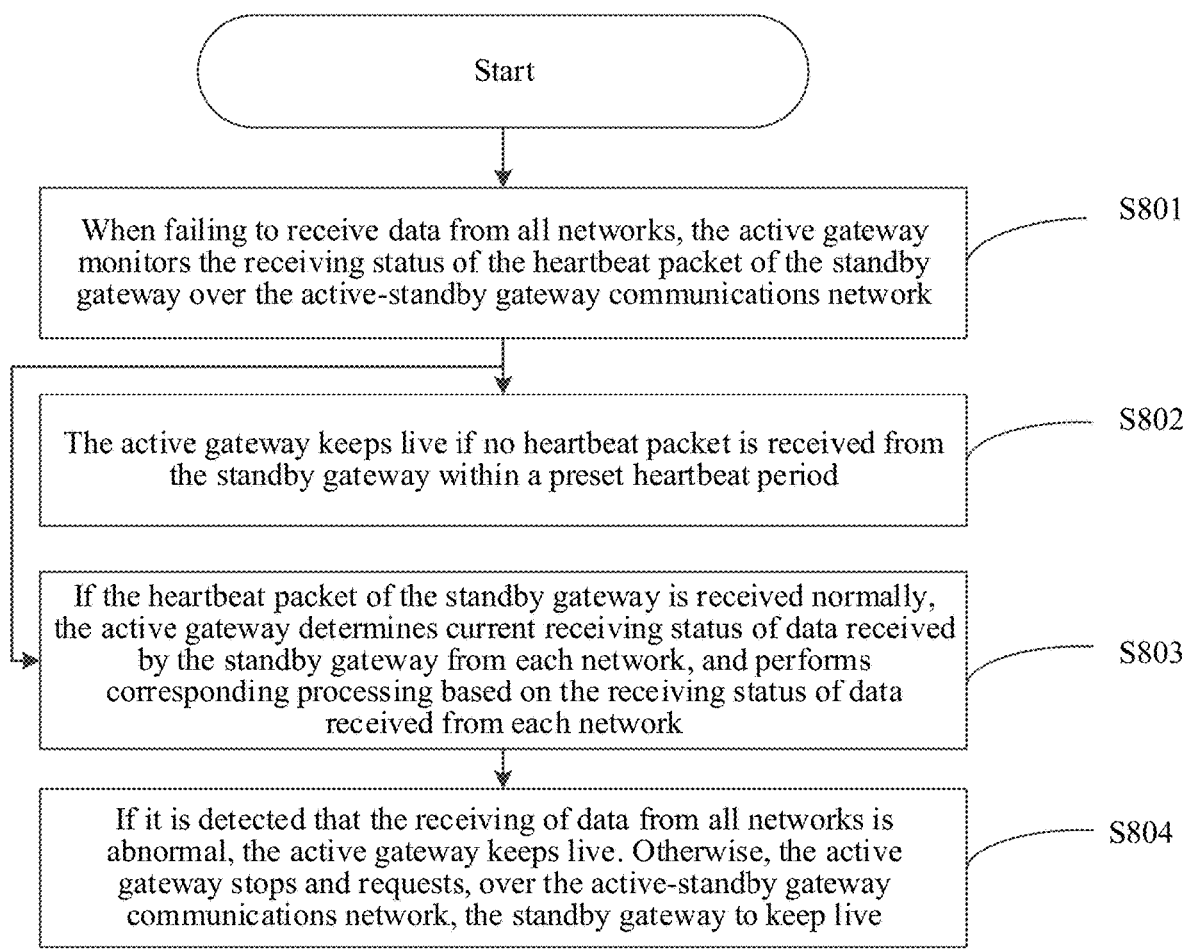
FIG. 16 is a flowchart of a CANopen-based data transmission gateway changeover method according to an eighth embodiment of the present disclosure.

Scenario 7: All data fails to be received (071 byte1=07):

FIG. 16 is a flowchart of a CANopen-based data transmission gateway changeover method according to an eighth embodiment of the present disclosure. As shown in FIG. 16, the method further includes the following steps.

S801. When failing to receive data from all networks, the active gateway monitors the receiving status of the heartbeat packet of the standby gateway over the active-standby gateway communications network.

S802. The active gateway keeps alive if no heartbeat packet is received from the standby gateway within a preset heartbeat period.

S803. If a heartbeat packet of the standby gateway is received normally, the active gateway determines current receiving status of data received by the standby gateway from each network, and performs corresponding processing based on the receiving status of data received from each network.

S804. If it is detected that the receiving of data from all networks is abnormal, the active gateway keeps alive. Otherwise, the active gateway stops and requests, over the active-standby gateway communications network, the standby gateway to keep alive.

In this embodiment, when failing to receive data from all networks, the active gateway monitors the receiving status of the heartbeat packet of the standby gateway over the active-standby gateway communications network. If no heartbeat packet of the standby gateway is detected within continuous 500 ms, the active gateway keeps alive. If the heartbeat packet of the standby gateway is received normally, the active gateway determines the current receiving status of data received by the standby gateway from each network. Each different receiving state decides a specific operating state of the active gateway and the standby gateway.

If it is detected that the receiving of data from all the three networks is abnormal, the active gateway keeps alive. Otherwise, the active gateway stops operating, and requests, over the active-standby gateway communications network, the standby gateway to keep alive.

Figure 17:
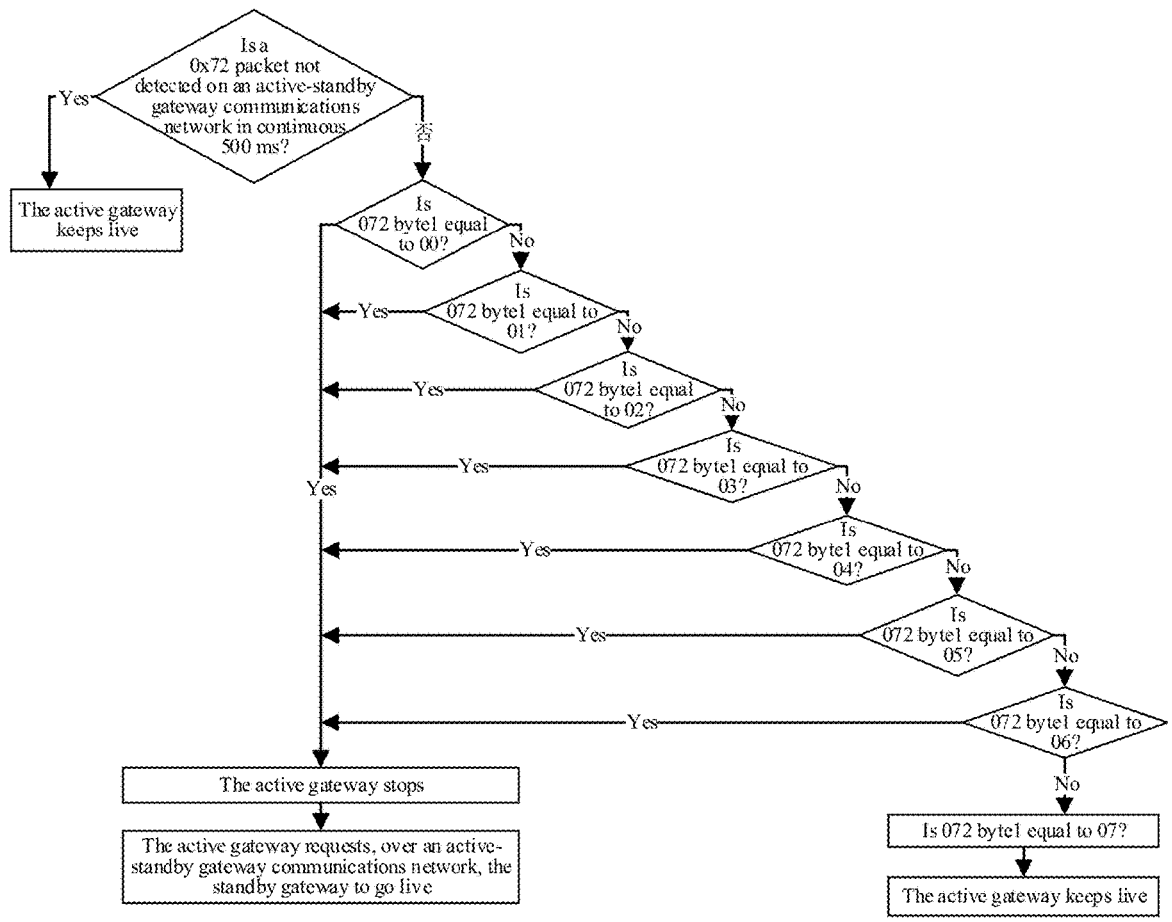
FIG. 17 is a data processing flowchart according to an embodiment of the present disclosure where all data fails to be received.

In order for a person skilled in the art to better understand an embodiment process in scenario 7, reference may be made to the data processing flowchart in FIG. 17 in which all data fails to be received.

Accordingly, the CANopen-based data transmission gateway changeover method provided in this embodiment of the present disclosure optimizes software implementation policies on the basis of an existing network redundancy design architecture. When both the active gateway and the standby gateway fail to receive data due to a network abnormality, the active gateway and the standby gateway perform coordination based on different operating states, thereby effectively ensuring normal communication even when a network is in an abnormal state, avoiding abnormal network communication caused by occurrence of a network fault in both an active node and a standby node, and improving network redundancy effects of a train.

To further clarify the CANopen-based data transmission gateway changeover method provided in an embodiment of the present disclosure, the following describes the method from a perspective of a standby gateway side.

Figure 18:
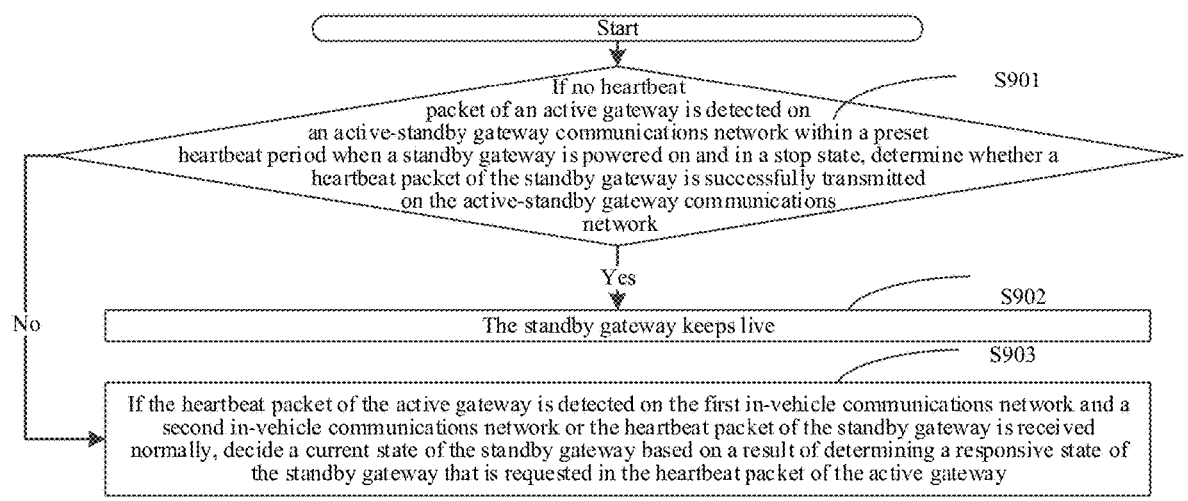
FIG. 18 is a flowchart of a CANopen-based data transmission gateway changeover method according to a ninth embodiment of the present disclosure.

FIG. 18 is a flowchart of a CANopen-based data transmission gateway changeover method according to a ninth embodiment of the present disclosure. As shown in FIG. 18, the method includes the following steps.

S901. If no heartbeat packet of an active gateway is detected over an active-standby gateway communications network within a preset heartbeat period when a standby gateway is powered on and in a stop state, determine whether a heartbeat packet of the standby gateway is successfully transmitted on the active-standby gateway communications network.

S902. Keep the standby gateway alive if the heartbeat packet of the standby gateway is successfully transmitted.

S903. If the heartbeat packet of the standby gateway fails to be transmitted but the heartbeat packet of the active gateway is detected on the first in-vehicle communications network and a second in-vehicle communications network or the heartbeat packet of the standby gateway is received normally, decide a current state of the standby gateway based on a result of determining a responsive state of the standby gateway that is requested in the heartbeat packet of the active gateway.

For example, if no heartbeat packet of the active gateway is detected over an active-standby gateway communications network within continuous 500 ms when the standby gateway is powered on and in a stop state, it is determined whether the heartbeat packet of the standby gateway is successfully transmitted on the active-standby gateway communications network. The standby gateway keeps alive if the heartbeat packet of the standby gateway is successfully transmitted. If the heartbeat packet of the standby gateway fails to be transmitted but the heartbeat packet of the active gateway is detected over the traction & braking network and the comfort network or the heartbeat packet of the standby gateway is received normally, decide a current state of the standby gateway based on a result of determining a responsive state of the standby gateway that is requested in the heartbeat packet byte3 of the active gateway.

(1) If it is detected that the heartbeat packet of the active gateway requests to disable the standby gateway, the standby gateway stops operating.

(2) If it is detected that the heartbeat packet of the active gateway requests to keep the standby gateway alive, the standby gateway keeps alive, and depending on its status of receiving data from the Ethernet, the traction & braking network, and the comfort network, determines whether it requires collaboration from the active gateway. If the standby gateway requires collaboration from the active gateway, the standby gateway keeps alive, and is in a process of handling abnormities 1 to 15. If the standby gateway requires no collaboration from the active gateway, the standby gateway keeps alive.

(3) If it is detected that the heartbeat packet of the active gateway requests to stop the standby gateway, the standby gateway keeps stopping.

(4) If it is detected that the heartbeat packet of the active gateway requests the standby gateway to get into one of abnormity-3 to abnormity-11, the standby gateway keeps alive, and is in a process of handling abnormities 1 to 15.

Figure 19:
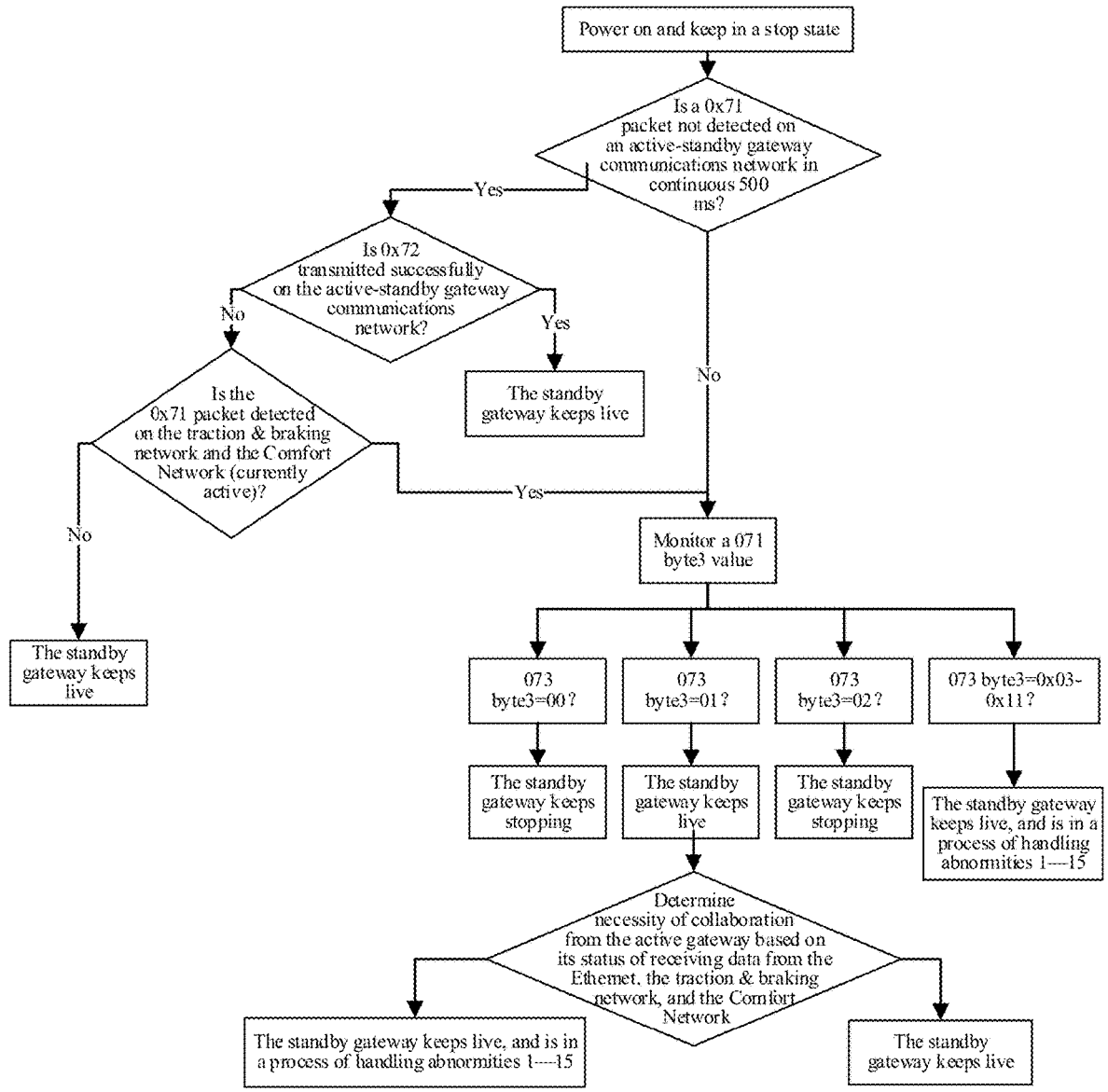
FIG. 19 is a flowchart of operation policies of a standby gateway according to an embodiment of the present disclosure.

In order for a person skilled in the art to better understand the embodiment process of the present disclosure, reference may be made to the flowchart of operation policies of a standby gateway in FIG. 19.

Accordingly, the CANopen-based data transmission gateway changeover method provided in this embodiment of the present disclosure optimizes software implementation policies on the basis of an existing network redundancy design architecture. When both the active gateway and the standby gateway fail to receive data due to a network abnormality, the active gateway and the standby gateway perform coordination based on different operating states, thereby effectively ensuring normal communication even when a network is in an abnormal state, avoiding abnormal network communication caused by occurrence of a network fault in both an active node and a standby node, and improving network redundancy effects of a train.

Figure 20:
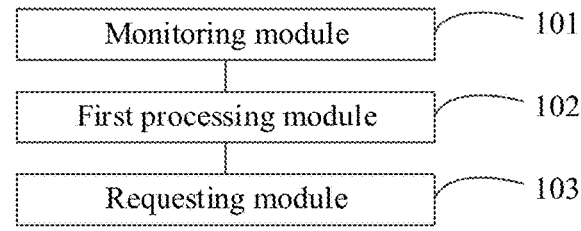
FIG. 20 is a schematic structural diagram of an active gateway according to a first embodiment of the present disclosure.

To implement the foregoing embodiments, the present disclosure also provides an active gateway. FIG. 20 is a schematic structural diagram of an active gateway according to a first embodiment of the present disclosure. As shown in FIG. 20, the active gateway includes a monitoring module 101, a first processing module 102, and a requesting module 103.

The monitoring module 101 is configured to mutually monitor heartbeat packet status together with a standby gateway over an active-standby gateway communications network when the active gateway is powered on to go alive.

The first processing module 102 is configured to keep alive and record a breakdown of the standby gateway when no heartbeat packet of the standby gateway is detected within a preset heartbeat period and a heartbeat packet of the active gateway is successfully transmitted on the active-standby gateway communications network.

The requesting module 103 is configured to request, over any in-vehicle communications network, the standby gateway to go alive when the heartbeat packet of the active gateway fails to be transmitted on the active-standby gateway communications network.

In an embodiment of the present disclosure, the requesting module 103 is further configured to stop requesting the standby gateway in a first in-vehicle communications network to go alive and also request, over another in-vehicle communications network, the standby gateway to go alive when no response is received from the standby gateway on the first in-vehicle communications network.

In an embodiment of the present disclosure, the first processing module 102 is further configured to keep alive and record a breakdown of the standby gateway when still no response is received from the standby gateway on a second in-vehicle communications network.

It should be noted that the CANopen-based data transmission gateway changeover method described above from a perspective of an active gateway side is also applicable to the active gateway provided in this embodiment of the present disclosure, and is based on similar implementation principles, which are omitted herein.

Accordingly, with respect to the active gateway provided in this embodiment of the present disclosure, the active gateway is powered on to go alive, and monitors the heartbeat packet status of the standby gateway over the active-standby gateway communications network. If no heartbeat packet of the standby gateway is detected in the preset heartbeat period, and if the heartbeat packet of the active gateway is successfully transmitted on the active-standby gateway communications network, the active gateway keeps alive and records a breakdown of the standby gateway. If the heartbeat packet of the active gateway fails to be transmitted on the active-standby gateway communications network, the active gateway requests, over the first in-vehicle communications network, the standby gateway to go alive. If no response is received from the standby gateway on the first in-vehicle communications network, the active gateway stops requesting the standby gateway in the first in-vehicle communications network to go alive, and also requests, over the second in-vehicle communications network, the standby gateway to go alive. If still no response is received from the standby gateway on the second in-vehicle communications network, the active gateway keeps alive and records a breakdown of the standby gateway. In this way, coordination is performed based on different operating states of an active gateway and a standby gateway, thereby effectively ensuring normal communication even when a network is in an abnormal state, and avoiding abnormal network communication caused by occurrence of a network fault in both an active node and a standby node.

Figure 21:
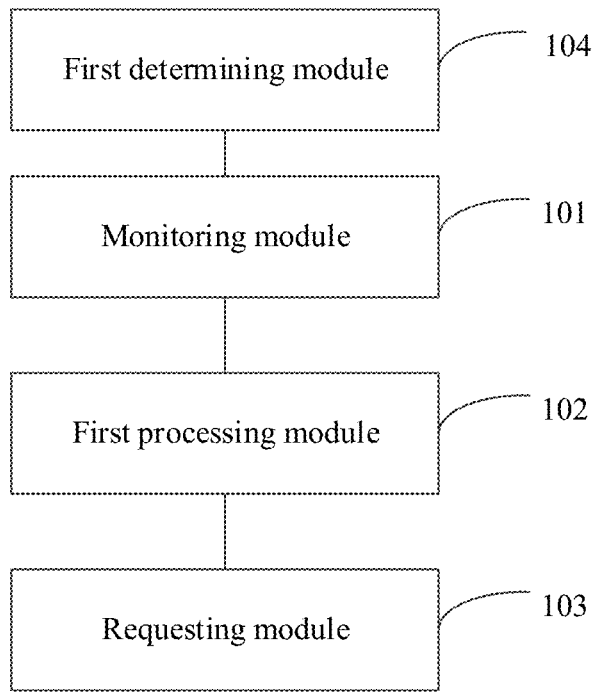
FIG. 21 is a schematic structural diagram of an active gateway according to a second embodiment of the present disclosure.

FIG. 21 is a schematic structural diagram of an active gateway according to a second embodiment of the present disclosure. As shown in FIG. 21, on the basis of what is shown in FIG. 20, the active gateway further includes a first determining module 104. The monitoring module 101 is further configured to monitor, over the active-standby gateway communications network, the heartbeat packet status of the standby gateway when the active gateway fails to receive Ethernet data or when an Ethernet port is faulty.

The first determining module 104 is configured to determine, when no heartbeat packet of the standby gateway is detected within the preset heartbeat period, whether the heartbeat packet of the active gateway can be successfully transmitted on the active-standby gateway communications network.

The first processing module 102 is further configured to control the active gateway to keep alive and record a breakdown of the standby gateway when the heartbeat packet of the active gateway is successfully transmitted.

The requesting module 103 is further configured to request, over the second in-vehicle communications network, the standby gateway to keep alive when the transmission fails.

The first processing module 102 is configured to determine, when a response is received from the standby gateway on the second in-vehicle communications network, the current receiving status of data received by the standby gateway from each network, and perform corresponding processing based on the receiving status.

In another embodiment of the present disclosure, the requesting module 103 is further configured to stop requesting the standby gateway in the first in-vehicle communications network to keep alive and further request, over the second in-vehicle communications network, the standby gateway to keep alive when no response is received from the standby gateway on the second in-vehicle communications network.

The first processing module 102 is configured to control the active gateway to keep alive and request, over the second in-vehicle communications network, the standby gateway to stop when no response is received from the standby gateway.

The first processing module 102 is configured to determine, when a response is received from the standby gateway, current receiving status of data received by the standby gateway from each network, and perform corresponding processing based on the receiving status.

In an embodiment of the present disclosure, the first processing module 102 is configured to determine, when a heartbeat packet is received from the standby gateway normally, current receiving status of data received by the standby gateway from each network, and perform corresponding processing based on the receiving status.

Figure 22:
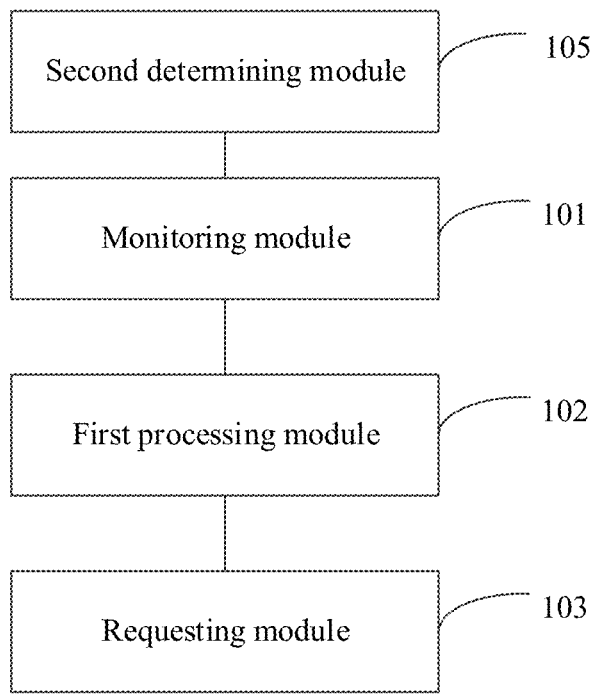
FIG. 22 is a schematic structural diagram of an active gateway according to a third embodiment of the present disclosure.

FIG. 22 is a schematic structural diagram of an active gateway according to a third embodiment of the present disclosure. As shown in FIG. 22, on the basis of what is shown in FIG. 20, the active gateway further includes a second determining module 105.

The second determining module 105 is configured to determine, when the active gateway fails to receive data of the first in-vehicle communications network or the first in-vehicle communications network has a port fault, whether the first in-vehicle communications network has switched services over to the standby gateway currently.

The first processing module 102 is configured to perform redundant network switching when the services have not been switched over to the standby gateway, or control the active gateway to keep alive if the switching succeeds.

The monitoring module 101 is configured to monitor the heartbeat packet status of the standby gateway over the active-standby gateway communications network when the services have been switched over to the standby gateway but still no data of the second in-vehicle communications network is received.

The first processing module 102 is configured to determine, when a heartbeat packet is received from the standby gateway normally, current receiving status of data received by the standby gateway from each network, and perform corresponding processing based on the receiving status of data from each network.

In an embodiment of the present disclosure, the first processing module 102 is configured to control the active gateway to keep alive when no heartbeat packet of the standby gateway is detected within the preset heartbeat period, and if the heartbeat packet of the active gateway is successfully transmitted on the active-standby gateway communications network.

Figure 23:
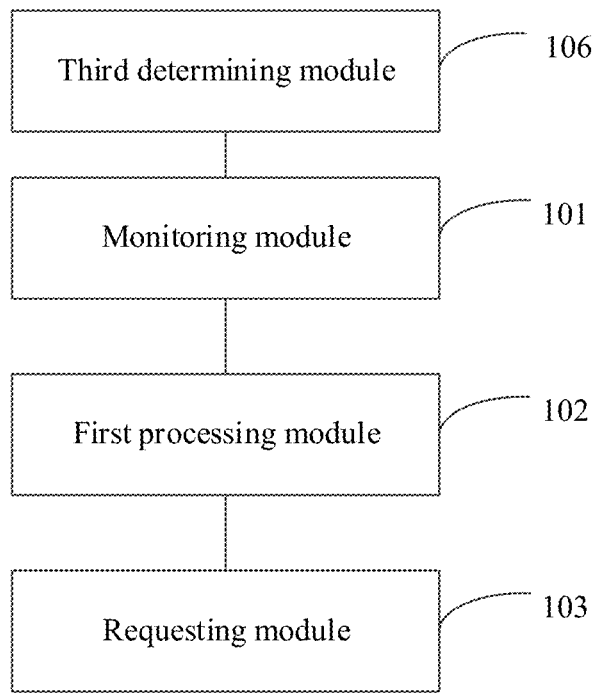
FIG. 23 is a schematic structural diagram of an active gateway according to a fourth embodiment of the present disclosure.

FIG. 23 is a schematic structural diagram of an active gateway according to a fourth embodiment of the present disclosure. As shown in FIG. 23, on the basis of what is shown in FIG. 20, the active gateway further includes a third determining module 106.

The third determining module 106 is configured to determine, when the active gateway receives neither data of the first in-vehicle communications network nor data of the inter-vehicle communications network or when both the first in-vehicle communications network and the inter-vehicle communications network have a port fault, whether the first in-vehicle communications network has switched services over to a standby network currently.

The first processing module 102 is configured to perform redundant network switching when the services have not been switched over to the standby gateway, or perform preset processing when the switching succeeds.

The monitoring module 101 is configured to monitor the heartbeat packet status of the standby gateway over the active-standby gateway communications network when the services have been switched over to the standby gateway but still no data of the first in-vehicle communications network is received.

The first processing module 102 is configured to determine, when a heartbeat packet is received from the standby gateway normally, current receiving status of data received by the standby gateway from each network, and perform corresponding processing based on the receiving status of data from each network.

In an embodiment of the present disclosure, the first processing module 102 is configured to control the active gateway to keep alive if no heartbeat packet of the standby gateway is detected within the preset heartbeat period, and if the heartbeat packet of the active gateway is successfully transmitted on the active-standby gateway communications network, and request, over the second in-vehicle communications network, the standby gateway to keep alive if the transmission fails.

The first processing module 102 is configured to keep alive when no response is received from the standby gateway.

The first processing module 102 is configured to monitor, when a response is received from the standby gateway, the receiving status of data received by the standby gateway from each network, and perform corresponding processing based on the receiving status of data from each network.

Figure 24:
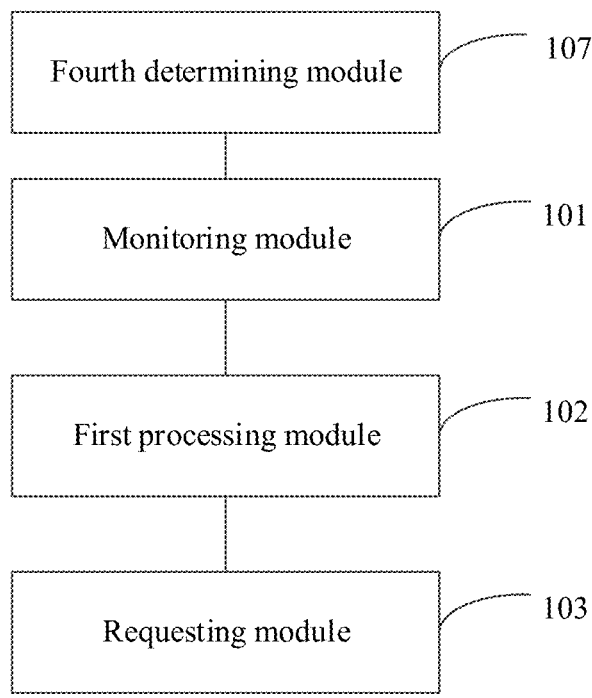
FIG. 24 is a schematic structural diagram of an active gateway according to a fifth embodiment of the present disclosure.

FIG. 24 is a schematic structural diagram of an active gateway according to a fifth embodiment of the present disclosure. As shown in FIG. 24, on the basis of what is shown in FIG. 20, the active gateway further includes a fourth determining module 107.

In this embodiment, the fourth determining module 107 is configured to determine, when the active gateway fails to receive data of the second in-vehicle communications network or the comfort network has a port fault, whether the second in-vehicle communications network has switched services over to a standby network currently.

The first processing module 102 is configured to perform redundant network switching when the services have not been switched over to the standby network, or control the active gateway to keep alive when the switching succeeds.

The monitoring module 101 is configured to monitor the heartbeat packet status of the standby gateway over the active-standby gateway communications network when the services have been switched over to the standby gateway but still no data of the second in-vehicle communications network is received.

The first processing module 102 is configured to determine, when a heartbeat packet is received from the standby gateway normally, current receiving status of data received by the standby gateway from each network, and perform corresponding processing based on the receiving status of data from each network.

In an embodiment of the present disclosure, the first processing module 102 is configured to control the active gateway to keep alive when no heartbeat packet of the standby gateway is detected within the preset heartbeat period, and when the heartbeat packet of the active gateway is successfully transmitted on the active-standby gateway communications network.

The requesting module 103 is configured to request, over the first in-vehicle communications network, the standby gateway to keep alive when the transmission fails.

The first processing module 102 is configured to monitor, when a response is received from the standby gateway on the first in-vehicle communications network, the receiving status of data received by the standby gateway from each network, and perform corresponding processing based on the receiving status of data from each network.

Figure 25:
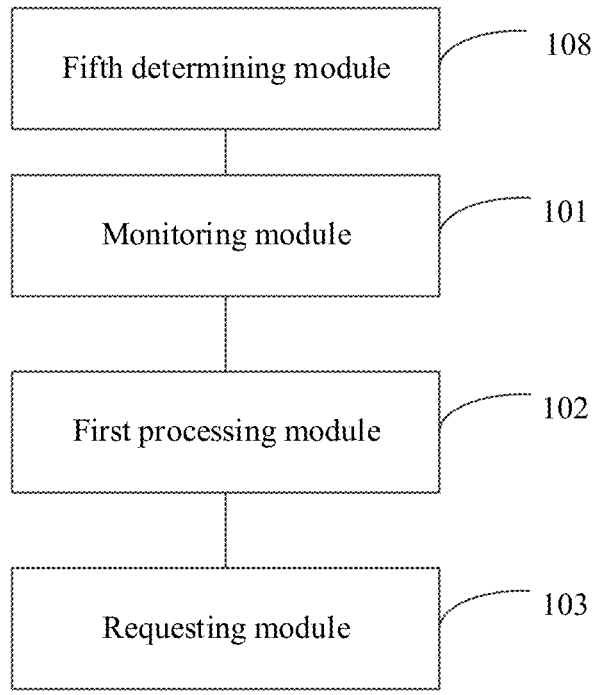
FIG. 25 is a schematic structural diagram of an active gateway according to a sixth embodiment of the present disclosure.

FIG. 25 is a schematic structural diagram of an active gateway according to a sixth embodiment of the present disclosure. As shown in FIG. 25, on the basis of what is shown in FIG. 20, the active gateway further includes a fifth determining module 108.

The fifth determining module 108 is configured to determine, when the active gateway receives neither data of the second in-vehicle communications network nor data of the inter-vehicle communications network or when both the second in-vehicle communications network and the inter-vehicle communications network have a port fault, whether the second in-vehicle communications network has switched services over to a standby gateway currently.

The first processing module 102 is configured to perform redundant network switching when the services have not been switched over to the standby gateway, or perform preset processing when the switching succeeds.

The monitoring module 101 is configured to monitor the heartbeat packet status of the standby gateway over the active-standby gateway communications network when the services have been switched over to the standby gateway but still no data of the second in-vehicle communications network is received.

The first processing module 102 is configured to determine, when a heartbeat packet is received from the standby gateway normally, current receiving status of data received by the standby gateway from each network, and perform corresponding processing based on the receiving status of data from each network.

In an embodiment of the present disclosure, the first processing module 102 is configured to control the active gateway to keep alive when no heartbeat packet of the standby gateway is detected within the preset heartbeat period, and when the heartbeat packet of the active gateway is successfully transmitted on the active-standby gateway communications network.

The requesting module 103 is configured to request, over the first in-vehicle communications network, the standby gateway to keep alive when the transmission fails.

The first processing module 102 is configured to determine, when a response is received from the standby gateway, the current receiving status of data received by the standby gateway from each network, and perform corresponding processing based on the receiving status of data from each network.

Figure 26:
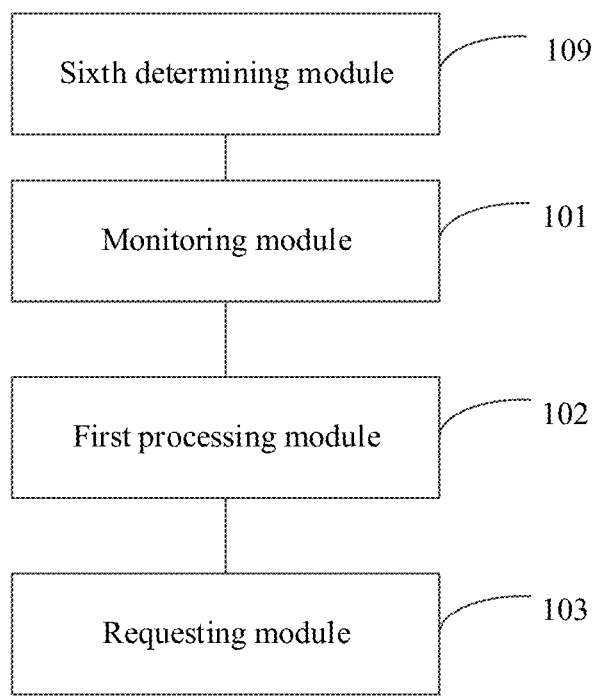
FIG. 26 is a schematic structural diagram of an active gateway according to a seventh embodiment of the present disclosure.

FIG. 26 is a schematic structural diagram of an active gateway according to a seventh embodiment of the present disclosure. As shown in FIG. 26, on the basis of what is shown in FIG. 20, the active gateway further includes a sixth determining module 109.

The sixth determining module 109 is configured to determine, when the active gateway receives neither data of the first in-vehicle communications network nor data of the second in-vehicle communications network or when both the first in-vehicle communications network and the second in-vehicle communications network have a port fault, whether the first in-vehicle communications network and the second in-vehicle communications network have switched services over to the standby gateway currently.

The first processing module 102 is configured to perform redundant network switching when the services have not been switched over to the standby gateway, or control the active gateway to keep alive when the switching to standby networks of both networks succeeds.

The first processing module 102 is configured to perform preset processing when only the switching to a standby network of the first in-vehicle communications network or a standby network of the second in-vehicle communications network succeeds.

The monitoring module 101 is configured to monitor the heartbeat packet status of the standby gateway over the active-standby gateway communications network when both the first in-vehicle communications network and the second in-vehicle communications network have switched services over to their standby networks currently but still no data is received.

The first processing module 102 is configured to control the active gateway to keep alive when no heartbeat packet is received from the standby gateway.

In an embodiment of the present disclosure, the first processing module 102 is configured to determine, when a heartbeat packet is received from the standby gateway normally, current receiving status of data received by the standby gateway from each network, and perform corresponding processing based on the receiving status of data from each network.

In an embodiment of the present disclosure, the monitoring module 101 is configured to monitor the receiving status of the heartbeat packet of the standby gateway over the active-standby gateway communications network when data from all networks fails to be received.

The first processing module 102 is configured to control the active gateway to keep alive when no heartbeat packet of the standby gateway is detected within the preset heartbeat period.

The first processing module 102 is configured to determine, when a heartbeat packet is received from the standby gateway normally, current receiving status of data received by the standby gateway from each network, and perform corresponding processing based on the receiving status of data from each network.

The first processing module 102 is configured to control the active gateway to keep alive when it is detected that the receiving of data from all networks is abnormal; otherwise, control the active gateway to stop operation and request, over the active-standby gateway communications network, the standby gateway to keep alive.

Accordingly, the active gateway provided in this embodiment of the present disclosure optimizes software implementation policies on the basis of an existing network redundancy design architecture. When both the active gateway and the standby gateway fail to receive data due to a network abnormity, the active gateway and the standby gateway perform coordination based on different operating states, thereby effectively ensuring normal communication even when a network is in an abnormal state, avoiding abnormal network communication caused by occurrence of a network fault in both an active node and a standby node, and improving network redundancy effects of a train.

To implement the foregoing embodiments, the present disclosure also provides a standby gateway.

Figure 27:
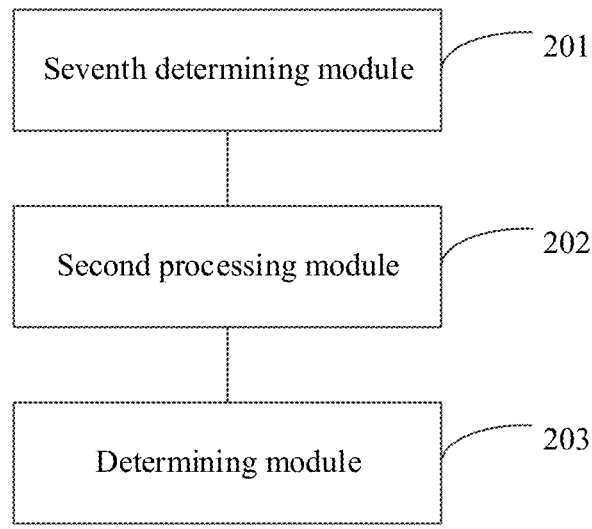
FIG. 27 is a schematic structural diagram of a standby gateway according to an embodiment of the present disclosure.

FIG. 27 is a schematic structural diagram of a standby gateway according to an embodiment of the present disclosure. As shown in FIG. 27, the standby gateway includes a seventh determining module 201, a second processing module 202, and a deciding module 203.

The seventh determining module 201 is configured to determine, if no heartbeat packet of the active gateway is detected on the active-standby gateway communications network within a preset heartbeat period when the standby gateway is powered on and in a stop state, whether a heartbeat packet of the standby gateway is successfully transmitted on the active-standby gateway communications network.

The second processing module 202 is configured to control the standby gateway to keep alive when the heartbeat packet of the standby gateway is successfully transmitted.

The deciding module 203 is configured to: when the heartbeat packet of the standby gateway fails to be transmitted but the heartbeat packet of the active gateway is detected on the first in-vehicle communications network and a second in-vehicle communications network or the heartbeat packet of the standby gateway is received normally, decide a current state of the standby gateway based on a result of determining a responsive state of the standby gateway that is requested in the heartbeat packet of the active gateway.

It should be noted that the CANopen-based data transmission gateway changeover method described above from a perspective of a standby gateway side is also applicable to the standby gateway provided in this embodiment of the present disclosure, and is based on similar implementation principles, which are omitted herein.

Accordingly, the standby gateway provided in this embodiment of the present disclosure optimizes software implementation policies on the basis of an existing network redundancy design architecture. When both the active gateway and the standby gateway fail to receive data due to a network abnormity, the active gateway and the standby gateway perform coordination based on different operating states, thereby effectively ensuring normal communication even when a network is in an abnormal state, avoiding abnormal network communication caused by occurrence of a network fault in both an active node and a standby node, and improving network redundancy effects of a train.

Figure 28:
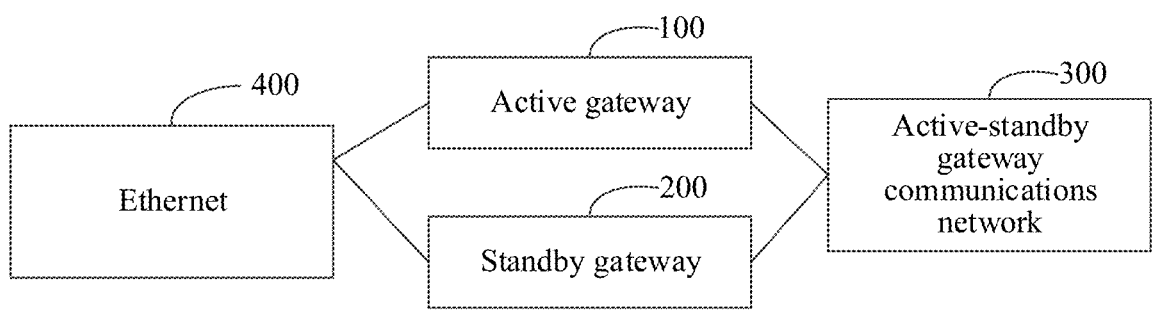
FIG. 28 is a schematic structural diagram of a CANopen-based data transmission gateway changeover system according to an embodiment of the present disclosure.

To implement the foregoing embodiments, the present disclosure also provides a CANopen-based data transmission gateway changeover system. FIG. 28 is a schematic structural diagram of a CANopen-based data transmission gateway changeover system according to an embodiment of the present disclosure. As shown in FIG. 28, the CANopen-based data transmission gateway changeover system includes an active gateway 100, a standby gateway 200, an active-standby gateway communications network 300, and an Ethernet 400.

The active gateway 100 can be understood with reference to and is based on implementation principles similar to the active gateway described above, and the standby gateway 200 can be understood with reference to and is based on implementation principles similar to the standby gateway described above, and they are not described in detail herein again.

To better clarify a working process of the CANopen-based data transmission gateway changeover system provided in this embodiment of the present disclosure, the following gives an example. In this example, only data of a second in-vehicle communications network (a traction & braking network) fails to be received.

In this example, a network includes two master nodes, and both master nodes are gateways, of which one is an active gateway and the other is a standby gateway. When the active gateway operates normally, the standby gateway is in a silent state. That is, only one active master node exists in the network. When the active gateway fails to receive data of the traction & braking network or the traction & braking network has a port fault, the active gateway first determines whether the traction & braking network has switched services over to a standby network currently, and then performs redundant network switching if the services have not been switched over to the standby network, or keeps alive if the switching succeeds. The active gateway monitors heartbeat packet status of the standby gateway over an active-standby gateway communications network if the services have been switched over to the standby network but still no data of the traction & braking network is received.

The active gateway keeps alive if no heartbeat packet of the standby gateway is detected in continuous 500 ms, and if the heartbeat packet of the active gateway is successfully transmitted on the active-standby gateway communications network. If the transmission fails, the active gateway transmits an active gateway heartbeat packet 071:02 01 02 over a comfort network to request the standby gateway to keep alive. The active gateway keeps alive if no response is received from the standby gateway in the comfort network. If a response 072:** 01 00 is received, the active gateway monitors the receiving status of data received by the standby gateway from each network. Each different receiving state decides a specific operating state of the active gateway and the standby gateway.

(1) If a heartbeat packet 072 byte1=00 of the standby gateway is detected, it indicates that the receiving of data from all three networks is normal currently, and therefore, the active gateway stops operating, and transmits an active gateway stop heartbeat packet 071:02 02 00 over the comfort network.

(2) If a heartbeat packet 072 byte1=01 of the standby gateway is detected, it indicates that the receiving of data from only an external network of a compartment is abnormal currently, and therefore, the active gateway switches to an abnormity-8 state, and transmits a heartbeat packet 071:02 0A of the active gateway over the comfort network to request the standby gateway to get into the abnormity-8 state.

(3) If a heartbeat packet 072 byte1=02 of the standby gateway is detected, it indicates that the receiving of data from only the traction & braking network is abnormal currently, and therefore, the standby gateway keeps alive, and attempts to perform redundant network switching and communicate by using a standby network of the traction & braking network. If the switching succeeds, the active gateway stops operating, and transmits an active gateway stop heartbeat packet 071:02 02 00 over the comfort network. If the switching fails, the standby gateway switches to an abnormity-2 state, and transmits a heartbeat packet 072:02 04 04 of the standby gateway over the comfort network to request the active gateway to get into the abnormity-2 state.

(4) If a heartbeat packet 072 byte1=03 of the standby gateway is detected, it indicates that the receiving of data from both the external network of the compartment and the traction & braking network is abnormal currently, and therefore, the active gateway keeps alive, and transmits a heartbeat packet 071:02 01 02 of the active gateway over the comfort network to request the standby gateway to stop operating.

If the heartbeat packet of the standby gateway is received normally, the active gateway determines the current receiving status of data received by the standby gateway from each network. Each different receiving state decides a specific operating state of the active gateway and the standby gateway.

(1) If a heartbeat packet 072 byte1=00 of the standby gateway is detected, it indicates that the receiving of data from all three networks is normal currently, and therefore, the active gateway stops operating, and transmits a heartbeat packet 071:01 02 01 of the active gateway over the active-standby gateway communications network to request the standby gateway to keep alive.

(2) If a heartbeat packet 072 byte1=01 of the standby gateway is detected, it indicates that the receiving of data from only the external network of the compartment is abnormal, and therefore, the active gateway switches to an abnormity-8 state.

(3) If a heartbeat packet 072 byte1=02 of the standby gateway is detected, it indicates that the receiving of data from only the traction & braking network is abnormal currently, and therefore, the active gateway stops operating, and transmits a heartbeat packet 071:02 02 01 of the active gateway over the active-standby gateway communications network to request the standby gateway to keep alive. The standby gateway keeps alive, and attempts to perform redundant network switching and communicate by using a standby network of the traction & braking network. If the switching succeeds, the active gateway stops operating, and transmits an active gateway stop heartbeat packet 071:02 02 00 over the active-standby gateway communications network. If the switching fails, the standby gateway switches to an abnormity-2 state, and transmits a heartbeat packet 072: 02 04 04 of the standby gateway over the active-standby gateway communications network to request the active gateway to get into the abnormity-2 state.

(4) If a heartbeat packet 072 byte1=03/06 of the standby gateway is detected, it indicates that the receiving of data from the external network of the compartment and the traction & braking network, or the comfort network and the traction & braking network, is abnormal currently, and therefore, the active gateway keeps alive.

(5) If a heartbeat packet 072 byte1=04 of the standby gateway is detected, it indicates that the receiving of data from the comfort network is abnormal currently, and therefore, the active gateway transmits a heartbeat packet 071:02 01 01 of the active gateway over the active-standby gateway communications network to request the standby gateway to keep alive. The standby gateway keeps alive, and attempts to perform redundant network switching and communicate by using a standby network of the comfort network. If the switching succeeds, the active gateway stops operating, and transmits an active gateway stop heartbeat packet 071:02 02 00 over the active-standby gateway communications network. If the switching fails, the standby gateway switches to an abnormity-3 state, and transmits a heartbeat packet 072: 02 05 05 of the standby gateway over the active-standby gateway communications network to request the active gateway to get into the abnormity-3 state.

(6) If a heartbeat packet 072 byte1=05 of the standby gateway is detected, it indicates that the receiving of data from both the external network of the compartment and the comfort network is abnormal currently, and therefore, the active gateway switches to an abnormity-4 state, and transmits a heartbeat packet 071:02 06 06 of the active gateway over the active-standby gateway communications network to request the standby gateway to get into the abnormity-4 state.

(7) If a heartbeat packet 072 byte1=07 of the standby gateway is detected, it indicates that the receiving of data from all the three networks is abnormal currently, and therefore, the active gateway keeps alive.

Accordingly, the CANopen-based data transmission gateway changeover system provided in this embodiment of the present invention performs coordination based on different operating states of an active gateway and a standby gateway, thereby effectively ensuring normal communication even when a network is in an abnormal state, and avoiding abnormal network communication caused by occurrence of a network fault in both an active node and a standby node.

In description of the present disclosure, description of reference terms such as "one embodiment", "some embodiments", "example", "specific example" or "some examples" means including specific features, structures, materials, or features described in the embodiment or example in at least one embodiment or example of the present disclosure. In this specification, schematic descriptions of the foregoing terms do not necessarily directed at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

Although the embodiments of the present disclosure are shown and described above, it can be understood that, the foregoing embodiments are exemplary, and cannot be construed as a limitation to the present disclosure. Within the scope of the present disclosure, a person of ordinary skill in the art may make changes, modifications, replacement, and variations to the foregoing embodiments.

What is claimed is:

1. A CANopen-based data transmission gateway changeover method, comprising:
   powering on an active gateway to go alive, and mutually monitoring heartbeat packet status together with a standby gateway over an active-standby gateway communications network;
   keeping the active gateway alive and recording a breakdown of the standby gateway if no heartbeat packet of the standby gateway is detected within a preset heartbeat period and a heartbeat packet of the active gateway is successfully transmitted on the active-standby gateway communications network;
   requesting, by the active gateway over any in-vehicle communications network, the standby gateway to go alive if the heartbeat packet of the active gateway fails to be transmitted on the active-standby gateway communications network;
   stopping requesting, by the active gateway, the standby gateway in a first in-vehicle communications network to go alive and also requesting, over another in-vehicle communications network, the standby gateway to go alive if no response is received from the standby gateway on the first in-vehicle communications network; and
   keeping the active gateway alive and recording a breakdown of the standby gateway if still no response is received from the standby gateway on a second in-vehicle communications network.

2. The method according to claim 1, further comprising:
   monitoring heartbeat packet status of the standby gateway over the active-standby gateway communications network when the active gateway fails to receive data of an inter-vehicle communications network or the inter-vehicle communications network has a port fault;
   determining, if no heartbeat packet of the standby gateway is detected within the preset heartbeat period, whether the heartbeat packet of the active gateway can be successfully transmitted on the active-standby gateway communications network;
   keeping the active gateway alive and recording a breakdown of the standby gateway if the heartbeat packet of the active gateway is successfully transmitted; or
   requesting, by the active gateway over the second in-vehicle communications network, the standby gateway to keep alive if the transmission fails; and
   determining, if a response is received from the standby gateway on the second in-vehicle communications network, current receiving status of data received by the standby gateway from each network, and performing corresponding processing based on the receiving status.

3. The method according to claim 2, further comprising:
   stopping requesting, by the active gateway, the standby gateway in the first in-vehicle communications network to keep alive and further requesting, on the second in-vehicle communications network, the standby gateway to keep alive if no response is received from the standby gateway on the second in-vehicle communications network;
   keeping the active gateway alive and requesting, over the second in-vehicle communications network, the standby gateway to stop operating if no response is received from the standby gateway; and
   determining, if a response is received from the standby gateway, current receiving status of data received by the standby gateway from each network, and performing corresponding processing based on the receiving status.

4. The method according to claim 2, further comprising:
determining, by the active gateway if the heartbeat packet of the standby gateway is received normally, current receiving status of data received by the standby gateway from each network, and performing corresponding processing based on the receiving status.

5. The method according to claim 1, further comprising:
determining, by the active gateway when the active gateway fails to receive data of the first in-vehicle communications network or the first in-vehicle communications network has a port fault, whether the first in-vehicle communications network has switched services over to the standby gateway currently;
performing redundant network switching if the services have not been switched over to the standby gateway, or keeping the active gateway alive if the switching succeeds;
monitoring the heartbeat packet status of the standby gateway over the active-standby gateway communications network if the services have been switched over to the standby gateway but still no data of the first in-vehicle communications network is received; and
determining, by the active gateway if the heartbeat packet of the standby gateway is received normally, current receiving status of data received by the standby gateway from each network, and performing corresponding processing based on the receiving status of data received from each network.

6. The method according to claim 5, further comprising:
keeping the active gateway alive if no heartbeat packet of the standby gateway is detected within the preset heartbeat period, and if the heartbeat packet of the active gateway is successfully transmitted on the active-standby gateway communications network;
requesting, by the active gateway over the second in-vehicle communications network, the standby gateway to keep alive if the heartbeat packet of the active gateway fails to be transmitted on the active-standby gateway communications network;
keeping the active gateway alive if no response is received from the standby gateway in the second in-vehicle communications network; and
monitoring, if a response is received from the standby gateway on the second in-vehicle communications network, receiving status of data received by the standby gateway from each network, and performing corresponding processing based on the receiving status of data from each network.

7. The method according to claim 1, further comprising:
determining, by the active gateway when the active gateway receives neither data of the first in-vehicle communications network nor data of the inter-vehicle communications network or when both the first in-vehicle communications network and the inter-vehicle communications network have a port fault, whether the first in-vehicle communications network has switched services over to a standby network currently, and performing redundant network switching if the services have not been switched over to the standby network, or performing preset processing if the switching succeeds;
monitoring the heartbeat packet status of the standby gateway over the active-standby gateway communications network if the services have been switched over to the standby gateway but still no data of the first in-vehicle communications network is received; and
determining, by the active gateway if the heartbeat packet of the standby gateway is received normally, current receiving status of data received by the standby gateway from each network, and performing corresponding processing based on the receiving status of data received from each network.

8. The method according to claim 7, further comprising:
keeping the active gateway alive if no heartbeat packet of the standby gateway is detected within the preset heartbeat period, and if the heartbeat packet of the active gateway is successfully transmitted on the active-standby gateway communications network, and requesting, by the active gateway over the second in-vehicle communications network, the standby gateway to keep alive if the transmission fails;
keeping the active gateway alive if no response is received from the standby gateway; and
monitoring, if a response is received from the standby gateway, receiving status of data received by the standby gateway from each network, and performing corresponding processing based on the receiving status of data from each network.

9. The method according to claim 1, further comprising:
determining, by the active gateway when the active gateway fails to receive data of the second in-vehicle communications network or the second in-vehicle communications network has a port fault, whether the second in-vehicle communications network has switched services over to a standby network currently, and performing redundant network switching if the services have not been switched over to the standby network, or keeping the active gateway alive if the switching succeeds;
monitoring the heartbeat packet status of the standby gateway over the active-standby gateway communications network if the services have been switched over to the standby gateway but still no data of the second in-vehicle communications network is received; and
determining, by the active gateway if the heartbeat packet of the standby gateway is received normally, current receiving status of data received by the standby gateway from each network, and performing corresponding processing based on the receiving status of data received from each network.

10. The method according to claim 9, further comprising:
keeping the active gateway alive if no heartbeat packet of the standby gateway is detected within the preset heartbeat period, and if the heartbeat packet of the active gateway is successfully transmitted on the active-standby gateway communications network;
requesting, by the active gateway over the first in-vehicle communications network, the standby gateway to keep alive if the transmission fails; and
monitoring, if a response is received from the standby gateway on the first in-vehicle communications network, receiving status of data received by the standby gateway from each network, and performing corresponding processing based on the receiving status of data from each network.

11. The method according to claim 1, further comprising:
determining, by the active gateway when the active gateway receives neither data of the second in-vehicle communications network nor data of the inter-vehicle communications network or when both the second in-vehicle communications network and the inter-vehicle communications network have a port fault, whether the second in-vehicle communications network has switched services over to the standby gateway currently, and performing redundant network switching if the services have not been switched over to the standby gateway, or performing preset processing if the switching succeeds;

monitoring the heartbeat packet status of the standby gateway over the active-standby gateway communications network if the services have been switched over to the standby gateway but still no data of the second in-vehicle communications network is received; and determining, by the active gateway if the heartbeat packet of the standby gateway is received normally, current receiving status of data received by the standby gateway from each network, and performing corresponding processing based on the receiving status of data received from each network.

12. The method according to claim 11, further comprising:

keeping the active gateway alive if no heartbeat packet of the standby gateway is detected within the preset heartbeat period, and if the heartbeat packet of the active gateway is successfully transmitted on the active-standby gateway communications network;

requesting, by the active gateway over the first in-vehicle communications network, the standby gateway to keep alive if the transmission fails; and determining, by the active gateway if a response is received from the standby gateway, current receiving status of data received by the standby gateway from each network, and performing corresponding processing based on the receiving status of data from each network.

13. An active gateway, comprising:

a monitoring module, configured to mutually monitor heartbeat packet status together with a standby gateway over an active-standby gateway communications network when the active gateway is powered on to go alive;

a first processing module, configured to keep alive and record a breakdown of the standby gateway when no heartbeat packet of the standby gateway is detected within a preset heartbeat period and a heartbeat packet of the active gateway is successfully transmitted on the active-standby gateway communications network;

a requesting module, configured to request, over any in-vehicle communications network, the standby gateway to go alive when the heartbeat packet of the active gateway fails to be transmitted on the active-standby gateway communications network, wherein the requesting module is further configured to stop requesting the standby gateway in a first in-vehicle communications network to go alive and also request, over another in-vehicle communications network, the standby gateway to go alive when no response is received from the standby gateway on the first in-vehicle communications network; and the first processing module is further configured to keep alive and record a breakdown of the standby gateway when still no response is received from the standby gateway on a second in-vehicle communications network.

14. The active gateway according to claim 13, wherein the monitoring module is further configured to monitor heartbeat packet status of the standby gateway over the active-standby gateway communications network when the active gateway fails to receive data of an inter-vehicle communications network or the inter-vehicle communications network has a port fault;

a first determining module, configured to determine, when no heartbeat packet of the standby gateway is detected within the preset heartbeat period, whether the heartbeat packet of the active gateway can be successfully transmitted on the active-standby gateway communications network;

the first processing module is further configured to control the active gateway to keep alive and record a breakdown of the standby gateway when the heartbeat packet of the active gateway is successfully transmitted; or the requesting module is further configured to request, over the second in-vehicle communications network, the standby gateway to keep alive when the transmission fails; and the first processing module is configured to determine, when a response is received from the standby gateway on the second in-vehicle communications network, current receiving status of data received by the standby gateway from each network, and perform corresponding processing based on the receiving status.

15. The active gateway according to claim 14, wherein the requesting module is further configured to stop requesting the standby gateway in the first in-vehicle communications network to keep alive and further request, over the second in-vehicle communications network, the standby gateway to keep alive when no response is received from the standby gateway on the second in-vehicle communications network;

the first processing module is configured to control the active gateway to keep alive and request, over the second in-vehicle communications network, the standby gateway to stop when no response is received from the standby gateway; and the first processing module is configured to determine, when a response is received from the standby gateway, current receiving status of data received by the standby gateway from each network, and perform corresponding processing based on the receiving status.

16. The active gateway according to claim 14, wherein the first processing module is configured to determine, when a heartbeat packet is received from the standby gateway normally, current receiving status of data received by the standby gateway from each network, and perform corresponding processing based on the receiving status.

17. The active gateway according to claim 13, further comprising:

a second determining module, configured to determine, when the active gateway fails to receive data of the first in-vehicle communications network or the first in-vehicle communications network has a port fault, whether the first in-vehicle communications network has switched services over to the standby gateway currently, wherein the first processing module is configured to perform redundant network switching when the services have not been switched over to the standby gateway, or control the active gateway to keep alive if the switching succeeds;

the monitoring module is configured to monitor the heartbeat packet status of the standby gateway over the active-standby gateway communications network when the services have been switched over to the standby gateway but still no data of the first in-vehicle communications network is received; and the first processing module is configured to determine, when a heartbeat packet is received from the standby gateway normally, current receiving status of data received by the standby gateway from each network, and perform corresponding processing based on the receiving status of data from each network.

18. The active gateway according to claim 17, wherein
the first processing module is configured to control the active gateway to keep alive when no heartbeat packet of the standby gateway is detected within the preset heartbeat period, and if the heartbeat packet of the active gateway is successfully transmitted on the active-standby gateway communications network;
the requesting module is configured to request, over the second in-vehicle communications network, the standby gateway to keep alive when the heartbeat packet of the active gateway fails to be transmitted on the active-standby gateway communications network;
the first processing module is configured to control the active gateway to keep alive when no response is received from the standby gateway in the second in-vehicle communications network; and
the first processing module is configured to monitor, when a response is received from the standby gateway on the second in-vehicle communications network, receiving status of data received by the standby gateway from each network, and perform corresponding processing based on the receiving status of data from each network.

19. The active gateway according to claim 13, further comprising:
a third determining module, configured to determine, when the active gateway receives neither data of the first in-vehicle communications network nor data of the inter-vehicle communications network or when both the first in-vehicle communications network and the inter-vehicle communications network have a port fault, whether the first in-vehicle communications network has switched services over to a standby network currently, wherein
the first processing module is configured to perform redundant network switching when the services have not been switched over to the standby gateway, or perform preset processing when the switching succeeds;
the monitoring module is configured to monitor the heartbeat packet status of the standby gateway over the active-standby gateway communications network when if the services have been switched over to the standby gateway but still no data of the first in-vehicle communications network is received; and
the first processing module is configured to determine, when a heartbeat packet is received from the standby gateway normally, current receiving status of data received by the standby gateway from each network, and perform corresponding processing based on the receiving status of data from each network.

20. A CANopen-based data transmission gateway changeover system including the active gateway according to claim 17, comprising:
a standby gateway, wherein the standby gateway comprises: a seventh determining module, configured to determine, if no heartbeat packet of the active gateway is detected on the active-standby gateway communications network within a preset heartbeat period when the standby gateway is powered on and in a stop state, whether a heartbeat packet of the standby gateway is successfully transmitted on the active-standby gateway communications network; a second processing module, configured to control the standby gateway to keep alive when the heartbeat packet of the standby gateway is successfully transmitted; and a deciding module, configured to: when the heartbeat packet of the standby gateway fails to be transmitted but the heartbeat packet of the active gateway is detected on the first in-vehicle communications network and a second in-vehicle communications network or the heartbeat packet of the standby gateway is received normally, decide a current state of the standby gateway based on a result of determining a responsive state of the standby gateway that is requested in the heartbeat packet of the active gateway;
an active-standby gateway communications network; and
an inter-vehicle communications network.

* * * * *